(12) United States Patent
Nishimoto et al.

(10) Patent No.: US 11,614,165 B2
(45) Date of Patent: Mar. 28, 2023

(54) SHIFT-DRUM SPEED CHANGE OPERATION MECHANISM

(71) Applicant: KANZAKI KOKYUKOKI MFG. CO., LTD., Amagasaki (JP)

(72) Inventors: Shuji Nishimoto, Amagasaki (JP); Yasuhito Nakai, Amagasaki (JP); Tatsuya Kamada, Amagasaki (JP)

(73) Assignee: KANZAKI KOKYUKOKI MFG. CO., LTD.

( * ) Notice: Subject to any disclaimer, the term of this patent is extended or adjusted under 35 U.S.C. 154(b) by 0 days.

(21) Appl. No.: 17/645,680

(22) Filed: Dec. 22, 2021

(65) Prior Publication Data
US 2022/0163111 A1 May 26, 2022

Related U.S. Application Data

(63) Continuation-in-part of application No. 15/818,188, filed on Nov. 20, 2017, now abandoned.

(30) Foreign Application Priority Data

| Dec. 1, 2016 | (JP) | ................. 2016-233991 |
| Dec. 1, 2016 | (JP) | ................. 2016-233992 |
| Dec. 27, 2016 | (JP) | ................. 2016-252928 |

(51) Int. Cl.
*F16H 63/18* (2006.01)
*F16H 63/32* (2006.01)
(Continued)

(52) U.S. Cl.
CPC ............ *F16H 63/32* (2013.01); *F16H 63/18* (2013.01); *F16H 63/36* (2013.01);
(Continued)

(58) Field of Classification Search
CPC ........ F16H 63/18; F16H 63/32; F16H 63/304; F16H 63/3466; F16H 63/3416; F16H 2063/3089; F16H 2063/3056
(Continued)

(56) References Cited

U.S. PATENT DOCUMENTS 9,334,955 B2 * 5/2016 Norita .................... F16H 63/18
2015/0090062 A1    4/2015 Norita et al.

FOREIGN PATENT DOCUMENTS

| JP | 54-084738 U | 11/1952 |
| JP | 03-000364 U | 1/1991 |

(Continued)

*Primary Examiner* — Victor L Macarthur
(74) *Attorney, Agent, or Firm* — Sterne, Kessler, Goldstein & Fox P.L.L.C.

(57) ABSTRACT

A fork guide groove of a drum member guides a shift fork so that a shifter member is in a reference position not engaged with first and second speed change members when the drum member is placed in a neutral position, is movable between a first speed-change position engaged with the first speed-change member and the reference position when the drum member is placed in a first operational position, and is movable between a second speed-change position engaged with the second speed-change member and the reference position when the drum member is placed in a second operational position. A slider guide groove of the drum member guides a slider member supported by a fork shaft in an axially movable manner so as not to obstruct movement of the shifter member between the reference position and the first speed-change position when the drum member is placed in the first operational position.

15 Claims, 29 Drawing Sheets

(51) Int. Cl.
    *F16H 63/36*     (2006.01)
    *F16H 63/30*     (2006.01)

(52) U.S. Cl.
    CPC ............ *F16H 2063/3089* (2013.01); *F16H 2063/321* (2013.01); *F16H 2063/322* (2013.01)

(58) Field of Classification Search
    USPC .......................................... 74/337.5, 473.37
    See application file for complete search history.

(56) References Cited

FOREIGN PATENT DOCUMENTS

| | | |
|---|---|---|
| JP | 11-303991 A | 11/1999 |
| JP | 5909400 B2 | 4/2015 |
| JP | 5750485 B2 | 5/2015 |
| JP | 2016-114227 | 6/2016 |

\* cited by examiner

SHIFT-DRUM SPEED CHANGE OPERATION MECHANISM

BACKGROUND OF THE INVENTION

Field of the Invention

The present invention relates to a shift-drum speed change operation mechanism.

Related Art

Shift-drum speed change apparatus have been proposed as speed change apparatus to be utilized in the travel-system power transmission path or the like of working vehicles such as utility vehicles and tractors.

The shift-drum speed change apparatuses have first and second speed change gears supported by a first power transmission rotating shaft so as to be relatively rotatable, first and second power transmission gears supported by a second power transmission rotating shaft so as to be incapable of relative rotation and directly or indirectly meshed with the first and second speed change gears, respectively, and a speed change operation mechanism selectively causing the first and second speed change gears to be incapable of relative rotation relative to the first power transmission rotating shaft. The shift-drum speed change apparatuses are configured to change the speed of rotary power transmitted between the first and second power transmission rotating shafts by selectively bringing a first gear train formed of the first speed change gear and the first power transmission gear and a second gear train formed of the second speed change gear and the second power transmission gear into a power transmitting state by the speed change operation mechanism.

The speed change operation mechanism includes a shifter member supported by the first power transmission rotating shaft so as to be incapable of relative rotation and so as to be axially movable between the first and second speed change gears, a fork shaft parallel to the first power transmission rotating shaft, a shift fork supported by the fork shaft so as to be axially movable and axially moving the shifter member in accordance with its own axial movement, a drum member having a fork guide groove receiving an engagement pin part of the shift fork and operated to rotate around the axis. The speed change operation mechanism is configured to axially move the shift fork guided by the fork guide groove in accordance with the rotation of the drum member and thereby selectively engage the shifter member with the first and second speed change gears.

Specifically, the opposing end faces of the shifter member and the speed change gears each have a depression and projection part. By the axial movement of the shifter member toward either speed change gear, the depression and projection part of the shifter member is engaged with the depression and projection part of the corresponding speed change gear, and both components rotate integrally.

Meanwhile, when the drum member is rotationally operated to axially move the shift fork and the shifter member to cause the shifter member to be depression and projection-engaged with the speed change gear, if the projection of the depression and projection part of the shifter member and the projection of the depression and projection part of the speed change gear abut against each other, a situation may arise where the depression and projection engagement of the shifter member and the speed change gear is not immediately completed (a projection abutment state).

When such a projection abutment state arises, it is not possible to rotationally operate the drum member to the intended operational position until the depression and projection engagement of the shifter member and the speed change gear is completed, and an operating force has to be continuously applied to the drum member.

In view of this point, a shift-drum speed change operation mechanism having a lost-motion function has been proposed (see JP-5750485B, hereinafter referred to as Patent Document 1).

The conventional shift-drum speed change operation mechanism with a lost-motion function described in Patent Document 1 includes a shifter member, a fork shaft, a shift fork, and a drum member, and is configured such that the fork shaft is axially movable, the drum member has a shaft guide groove in addition to a fork guide groove, the fork shaft has a spring receiving member that is prevented from having relative axial movement away from the shift fork by a locking member secured to the fork shaft, a lost motion spring (a wait spring) is interposed between the spring receiving member and the shift fork, the fork shaft is axially moved via the shaft guide groove in accordance with the rotation of the drum member, the lost motion spring is compressed by the axial movement of the fork shaft via the locking member and the spring receiving member, and thus the spring load of the compressed lost motion spring acts on the shift fork.

In the above conventional shift-drum speed change operation mechanism with a lost-motion function, even when the projection abutment state arises, the drum member can be operated to rotate to the intended speed change position in advance. At this time, the fork shaft is axially moved, and the lost motion spring is brought into a compressed state to have resilience.

Thanks to the resilience, the lost motion spring continues pressing the shift fork in a direction in which the shifter member is pressed toward the speed change gear, and when the projection abutment state is eliminated, the depression and projection engagement of the shifter member and the speed change gear is completed.

Thus, the above conventional shift-drum speed change operation mechanism with a lost-motion function is advantageous in that the drum member can be operated to rotate to the predetermined speed change position in advance even when the projection abutment state arises, and then the speed change movement can be completed by the resilience of the lost motion spring when the projection abutment state is eliminated. However, in order to attain such a lost-motion function, the entirety of the fork shaft that supports the shift fork, the locking member, and the spring receiving member has to be axially moved.

Accordingly, there is a problem in that a space for ensuring the range of axial movement of the fork shaft is necessary and, also, a large operational force for moving the entirety of the fork shaft is necessary.

SUMMARY OF THE INVENTION

The present invention has been conceived in view of the conventional art described above, and an object of the present invention is to provide a shift-drum speed change operation mechanism with a lost-motion function whose size in the axial direction and operational force during the speed change operation of a drum member can be reduced.

In order to achieve the object, a first aspect of the present invention provides a shift-drum speed change operation mechanism, including a shift-drum speed change operation mechanism, including: a power transmission shaft; a first speed change member disposed on the power transmission shaft so as to be capable of rotation relative to the power transmission shaft; a second speed change member disposed on the power transmission shaft so as to be capable of rotation relative to the power transmission shaft; a first shifter member disposed on the power transmission shaft so as to be incapable of rotation relative to the power transmission shaft and so as to be axially movable between the first speed change member and the second speed change member, wherein the first shifter member may be depression and projection-engaged with the first speed change member or the second speed change member, the engagement bringing the first speed change member or the second speed change member into a power transmitting state; a drum member having a first fork guide groove and operated to rotate around an axis; a fork shaft disposed parallel to the power transmission shaft; a first shift fork having a first boss part supported by the fork shaft so as to be axially movable, a first fork part engaged with the first shifter member and a first engagement pin part received by the first fork guide groove; a first shift fork pressing spring biasing the first shift fork toward a first side in the axial direction of the fork shaft; a slider member directly or indirectly supported by the fork shaft so as to be axially movable, with a moving end toward a second side in the axial direction of the fork shaft being defined by a stopper part provided on the first shift fork, wherein an axial position of the slider member is regulated by a slider guide groove provided in the drum member; a slider member pressing spring biasing the slider member toward the second side in the axial direction by a greater biasing force than the first shift fork pressing spring; the first shift fork and the first shifter member, with respect to axial positions, being capable of selectively taking a reference position where the first shifter member is not depression and projection-engaged with any of the first and second speed change members, and being capable of taking first and second speed change positions where the first shifter member is depression and projection-engaged with the first and second speed change members, respectively; the first fork guide groove having a groove shape securing the first shift fork in the reference position when the drum member is placed in a neutral position around the axis, allowing the first shift fork to move between the reference position and the first speed change position when the drum member is placed from the neutral position to a first operational position on one side around the axis of the fork shaft, and allowing the first shift fork to move between the reference position and a second speed change position when the drum member is placed from the neutral position to a second operational position on the other side around the axis; and the slider guide groove having a groove shape guiding the slider member so as not to obstruct movement of the first shift fork between the reference position and the first speed change position when the drum member is placed in the first operational position, and allowing axial movement of the slider member so that the slider member biased by the slider member pressing spring is capable of pressing the first shift fork from the reference position to the second speed change position when the drum member is placed in the second operational position.

The drum-shift speed change operation mechanism according to the first aspect of the present invention makes it possible to downsize the speed change operation mechanism with respect to the axial direction and reduce the operational force required in operating the drum member in comparison with a conventional configuration in which the lost-motion function is attained by axially moving the fork shaft.

In one example, the slider member is supported by the first boss part. In another example, the slider member is supported by the fork shaft.

In a first embodiment, when axial positions of the slider member, which is in contact with the stopper part, placed when the first shift fork is placed in the reference position, the first speed change position and the second speed change position, are referred to as a reference position, a first displaced position and a second displaced position, respectively, the slider guide groove has a groove shape securing the slider member in the reference position when the drum member is placed in the neutral position, securing the slider member in the first displaced position when the drum member is placed in the first operational position, and allowing the slider member to move between the reference position and the second displaced position when the drum member is placed in the second operational position.

In a second embodiment, the slider guide groove has a groove shape allowing the slider member biased toward the second side in the axial direction of the fork shaft by the slider member pressing spring to axially move by following axial movement of the first shift fork while remaining in contact with the stopper part, when the drum member is placed in positions other than the first operational position.

The shift-drum speed change operation mechanism according to any one of the above configurations of the first aspect may further include a third speed change member disposed on the power transmission shaft so as to be capable of rotation relative to the power transmission shaft; a second shifter member supported by the power transmission shaft so as to be incapable of relative rotation and so as to be axially movable, wherein the second shifter member is capable of depression and projection-engagement with the third speed change member; a second shift fork supported by the fork shaft so as to be axially movable, wherein the second shift fork has a second engagement pin part received by a second fork guide groove provided in the drum member and a second fork part engaged with the second shifter member; and a second shift fork pressing spring biasing the second shift fork in a direction in which the second shifter member is pressed toward the third speed change member.

The second shift fork and the second shifter member, with respect to axial positions, are capable of selectively taking a reference position where the second shifter member is not engaged with the third speed change member and a third speed change position where the second shifter member is depression and projection-engaged with the third speed change member. The first fork guide groove has a groove shape securing the first shift fork in the reference position when the drum member is placed in a third operational position displaced around the axis from the neutral position and the first and second operational positions. The second fork guide groove has a groove shape allowing the second shift fork to move between the reference position and the third speed change position when the drum member is placed in the third operational position, and securing the second shift fork in the reference position when the drum member is placed in operational positions other than the third operational position.

For example, the drum member is placed in the third operational position when the drum member is rotated predetermined degrees from the first operational position toward one side around the axis.

In a preferable embodiment, the slider guide groove has a groove shape securing the slider member in the reference position when the drum member is placed in the neutral position, securing the slider member in the first displaced position when the drum member is placed in the first operational position and the third operational position, and allowing the slider member to move between the reference position and the second displaced position when the drum member is placed in the second operational position. The reference position is the position of the first speed change position and the second speed change position, when the first shift fork is placed in a reference position.

The shift-drum speed change operation mechanism with the second shifter member preferably further includes a parking pressing member having a main body part fitted over the drum member so as to be relatively rotatable and a cam pressing part extending radially outward from the main body part; a parking coil spring fitted over the drum member, with one end side being operatively connected to the parking pressing member and the other end side being operatively connected to the drum member, wherein the parking coil spring connects the drum member and the parking pressing member so as to be incapable of relative rotation such that the parking pressing member is integrally rotated around the axis in accordance with rotation of the drum member around the axis when a circumferential load on the cam pressing part is equal to or less than a predetermined value, and, when the circumferential load on the cam pressing part exceeds the predetermined value, the parking coil spring is elastically deformed so as to allow the drum member to relatively rotate around the axis in advance relative to the parking pressing member; a parking operation arm capable of swinging around a swing axis parallel to the power transmission shaft and having an engagement part on a free end side, wherein the parking operation arm is capable of taking a parking position where the engagement part is engaged, around the swing axis, with a depression and projection part provided on the second shifter member so as to face radially outward, and the second shifter member is forcibly brought into a rotation suspended state; and a parking cancelling spring biasing the parking operation arm around the swing axis in a direction in which the engagement part is moved away from the depression and projection part. The cam pressing part is disposed so as to swing the parking operation arm to the parking position around the swing axis in accordance with rotational movement of the drum member to the parking position. When the engagement part of the parking operation arm is brought into contact with a projection of a depression and projection part of the second shifter member in a swinging movement of the parking operation arm by the cam pressing part toward the parking position in accordance with the rotational movement of the drum member to the parking position so that a circumferential load exceeding the predetermined value is applied to the cam pressing part, the drum member is relatively rotated to the parking operational position in advance relative to the parking pressing member while elastically deforming the parking coil spring. When the second shifter member is rotated around the axis so that the engagement part and the depression and projection part are positionally adjusted, the parking coil spring swings the parking operation arm to the parking position against the biasing force of the parking cancelling spring due to resilience resulting from elastic deformation so that engagement of the engagement part and the depression and projection part is completed.

In order to achieve the object, a second aspect of the present invention provides a shift-drum speed change operation mechanism, including a power transmission shaft; first and second speed change members disposed in series on the power transmission shaft so as to be capable of rotation relative to the power transmission shaft; a first shifter member disposed on the power transmission shaft so as to be incapable of rotation relative to the power transmission shaft and so as to be axially movable between the first speed change member and the second speed change member, wherein the first shifter member is depression and projection-engaged with the first and second speed change members in accordance with movement toward a first side on one side and a second side on the other side in an axial direction, respectively; a second shifter member disposed on the power transmission shaft so as to be incapable of relative rotation to the power transmission shaft and so as to be axially movable between the third and fourth speed change members, wherein the second shifter member is depression and projection-engaged with the third and fourth speed change members in accordance with movement toward the first side and the second side in the axial direction, respectively; a drum member having first and second fork guide grooves and operated to rotate around an axis; a fork shaft disposed parallel to the power transmission shaft; a first shift fork having a first boss part supported by the fork shaft so as to be axially movable, a first fork part engaged with the first shifter member and a first engagement pin part received by the first fork guide groove; a second shift fork having a second boss part supported by the fork shaft so as to be axially movable, a second fork part engaged with the second shifter member and a second engagement pin part received by the second fork guide groove; a first shift fork pressing spring biasing the first shift fork toward the second side in the axial direction; a second shift fork pressing spring biasing the second shift fork toward the first side in the axial direction; a first slider member directly or indirectly supported by the fork shaft so as to be axially movable, with a moving end toward the first side in the axial direction being defined by a stopper part provided on the first shift fork, wherein an axial position of the first slider member is regulated by a first slider guide groove provided in the drum member; a second slider member directly or indirectly supported by the fork shaft so as to be axially movable, with a moving end toward the second side in the axial direction being defined by a stopper part provided on the second shift fork, wherein an axial position of the second slider member is regulated by a second slider guide groove provided in the drum member; a first slider member pressing spring biasing the first slider member toward the first side in the axial direction by a greater biasing force than the first shift fork pressing spring; and a second slider member pressing spring biasing the second slider member toward the second side in the axial direction by a greater biasing force than the second shift fork pressing spring.

The first shift fork and the first shifter member, with respect to axial positions, are configured to be capable of selectively taking a reference position where the first shifter member is not depression and projection-engaged with any of the first and second speed change members, and being capable of taking first and second speed change positions where the first shifter member is depression and projection-engaged with the first and second speed change members, respectively. The second shift fork and the second shifter member, with respect to axial positions, are configured to be capable of selectively taking a reference position where the second shifter member is not depression and projection-engaged with any of the third and fourth speed change members, and being capable of taking third and fourth speed change positions where the second shifter member is depression and projection-engaged with the third and fourth speed change members, respectively.

The first fork guide groove is configured to have a groove shape securing the first shift fork in the reference position when the drum member is placed in a neutral position around the axis, allowing the first shift fork to move between the reference position and the first speed change position when the drum member is placed from the neutral position to a first operational position on one side around the axis, securing the first shift fork in the reference position when the drum member is placed from the first operational position to a third operational position on one side around the axis, allowing the first shift fork to move between the reference position and the second speed change position when the drum member is placed from the neutral position to a second operational position on the other side around the axis, and securing the first shift fork in the reference position when the drum member is placed from the second operational position to the fourth operational position on the other side around the axis. The first slider guide groove is configured to have a groove shape defining a movable range in the axial direction of the first slider member such that the first shift fork is capable of moving between the reference position and the first speed change position guided by the first fork guide groove, with the first slider member being in contact with the first stopper part by the first slider member pressing spring, when the drum member is placed in the first speed change position, and guiding the first slider member so as not to obstruct movement of the first shift fork between the reference position and the second speed change position when the drum member is placed in the second speed change position.

The second fork guide groove is configured to have a groove shape securing the second shift fork in the reference position when the drum member is placed in the first operational position, the neutral position and the second operational position, allowing the second shift fork to move between the reference position and the third speed change position when the drum member is placed in the third operational position, and allowing the second shift fork to move between the reference position and the fourth speed change position when the drum member is placed in the fourth operational position. The second slider guide groove is configured to have a groove shape guiding the second slider member so as not to obstruct movement of the second shift fork between the reference position and the third speed change position when the drum member is placed in the third operational position, and defining a movable range in the axial direction of the second slider member such that the second shift fork is capable of moving between the reference position and the fourth speed change position guided by the second fork guide groove, with the second slider member being in contact with the second stopper part by the second slider member pressing spring, when the drum member is placed in the fourth operational position.

The drum-shift speed change operation mechanism according to the second aspect of the present invention makes it possible to downsize the speed change operation mechanism with respect to the axial direction and reduce the operational force required in operating the drum member in comparison with a conventional configuration in which the lost-motion function is attained by axially moving the fork shaft.

In a preferable embodiment, the first and second slider member pressing springs are a single spring, one end side of which is engaged with the first slider member and the other end side of which is engaged with the second slider member.

In one example, when axial positions of the first slider member, which is in contact with the first stopper part, placed when the first shift fork is placed in the reference position, the first speed change position and the second speed change position, are referred to as a reference position, a first displaced position and a second displaced position, respectively, the first slider guide groove is configured to have a groove shape securing the first slider member in the reference position when the drum member is placed in the neutral position, allowing the first slider member to move between the reference position and the first displaced position when the drum member is placed in the first operational position, securing the first slider member in the reference position when the drum member is placed in the third operational position, securing the first slider member in the second displaced position when the drum member is placed in the second operational position, and securing the first slider member in the reference position when the drum member is placed in the fourth operational position.

Alternatively, in another example, the first slider guide groove may be configured to have a groove shape securing the first slider member in the second displaced position when the drum member is placed in the second operational position, and allowing the first slider member biased toward the first side in the axial direction by the first slider member pressing spring to axially move by following axial movement of the first shift fork while remaining in contact with the first stopper part, when the drum member is placed in positions other than the second operational position.

In one example, when axial positions of the second slider member, which is in contact with the second stopper part, placed when the second shift fork is placed in the reference position, the third speed change position and the fourth speed change position, are referred to as a reference position, a third displaced position and a fourth displaced position, respectively, the second slider guide groove is configured to have a groove shape securing the second slider member in the reference position when the drum member is placed between the first operational position and the second operational position across the neutral position, securing the second slider member in the third displaced position when the drum member is placed in the third operational position, and allowing the second slider member to move between the reference position and the fourth displaced position when the drum member is placed in the fourth operational position.

Alternatively, the second slider guide groove may be configured to have a groove shape securing the second slider member in the third displaced position when the drum member is placed in the third operational position, and allowing the second slider member biased toward the second side in the axial direction by the slider member pressing spring to axially move by following axial movement of the second shift fork while remaining in contact with the second stopper part when the drum member is placed in positions other than the third operational position.

Meanwhile, it has been desired that a shift-drum speed change apparatus can provide a parking state where rotation is forcibly suspended in addition to a power transmitting state achieved by a gear train.

In this regard, a conventional shift-drum speed change apparatus includes a speed change gear supported by a first power transmission rotating shaft so as to be relatively rotatable; a power transmission gear supported by a second power transmission rotating shaft so as to be incapable of relative rotation and directly or indirectly meshed with the speed change gear; a shifter member supported by the first power transmission rotating shaft so as to be incapable of relative rotation and so as to be axially movable; a drum member having a fork guide groove and operated to rotate around the axis; a fork shaft parallel to the drum member; a shift fork having a boss part supported by the fork shaft so as to be axially movable, an engagement pin part received by the fork guide groove, and a fork part engaged with the shifter member; in addition, a parking gear supported by the first power transmission rotating shaft so as to be incapable of relative rotation; and a parking locking mechanism for forcibly bringing the parking gear into a rotation suspended state in accordance with the rotational movement of the drum member around the axis to a parking position (see JP-5909400B, hereinafter referred to as Patent Document 2).

The parking locking mechanism includes a locking member provided on the drum member and a plate having a depression into which the locking member can enter. The parking locking mechanism is configured such that the locking member enters the depression as the drum member rotates around the axis to the parking position to thereby swing the plate, and the parking gear is locked by utilizing the swinging of the plate.

Although the conventional shift-drum speed change apparatus described in Patent Document 2 is advantageous in being capable of providing a parking state without requiring a dedicated actuator for providing the parking state, it is problematic in that the parking locking mechanism is complex, and thus the overall size of the apparatus including the parking locking mechanism and the cost are increased.

The above problems are solved by a shift-drum speed change apparatus including a speed change gear supported by a first power transmission rotating shaft so as to be relatively rotatable; a power transmission gear supported by a second power transmission rotating shaft so as to be incapable of relative rotation and directly or indirectly meshed with the speed change gear; a parking member having a parking depression and projection part and being incapable of relative rotation relative to the first or second power transmission rotating shaft; a shifter member supported by the first power transmission rotating shaft so as to be incapable of relative rotation and so as to be axially movable; a drum member having a fork guide groove and operated to rotate around the axis; a fork shaft parallel to the drum member; and a shift fork that is supported by the fork shaft so as to be axially movable, with its axial position being guided by the fork guide groove, and that axially moves the shifter member in accordance with its own axial movement, wherein the shifter member and the speed change gear each have a speed change depression and projection part on the mutually opposing end faces, and the shift fork together with the shifter member is axially moved via the fork guide groove in accordance with the rotation of the drum member to depression and projection-engage the shifter member and the speed change gear, the shift-drum speed change apparatus further including a parking operation arm that has an engagement part capable of engagement with the parking depression and projection part and that is capable of swinging around a swing axis parallel to the power transmission rotating shaft, wherein the parking operation arm is capable of taking a parking position around the swing axis where the engagement part is engaged with the parking depression and projection part so that the parking member is forcibly brought into a rotation suspended state; a parking cancelling spring biasing the parking operation arm around the swing axis in a parking cancelling direction in which the engagement part is moved away from the parking depression and projection part; and a parking pressing member having a main body part supported by the drum member and a cam pressing part extending radially outward from the main body part, wherein the cam pressing part does not act on the parking operation arm when the drum member is placed in a neutral position and a speed change position, and presses the parking operation arm toward a parking position against the biasing force of the parking cancelling spring in accordance with the rotational movement of the drum member to the parking position.

According to the shift-drum speed change apparatus having the above configuration, the structure for providing a parking state can be simplified and reduced in size.

Preferably, the main body is supported by the drum member so as to be relatively rotatable, and is operatively connected to the drum member via a parking coil spring fitted over the drum member.

The parking coil spring is configured to connect the drum member and the parking pressing member so as to be incapable of relative rotation such that the parking pressing member is integrally rotated in accordance with the rotation of the drum member around the axis when the circumferential load on the cam pressing part is equal to or less than a predetermined value, and, on the other hand, is configured to be elastically deformed so as to allow the drum member to relatively rotate around the axis in advance relative to the parking pressing member when the circumferential load on the cam pressing part exceeds the predetermined value.

In a case where the engagement part of the parking operation arm abuts against the projection of the parking depression and projection part when the cam pressing part swings the parking operation arm toward the parking position, and whereby the circumferential load on the cam pressing part exceeds the predetermined value, the drum member is relatively rotated around the axis to the parking position in advance relative to the parking pressing member while elastically deforming the parking coil spring.

In this situation, when the engagement part and the parking depression and projection part are positionally adjusted in the circumferential direction, an elastic force involved in the parking coil spring swings the parking operation arm to the parking position against the biasing force of the parking cancelling spring so that the engagement of the engagement part and the parking depression and projection part is completed.

The parking operation arm has a pressure receiving surface with which the cam pressing part engages, and the cam pressing part and the pressure receiving surface are preferably arranged so that a direction of a reaction force acting on the cam pressing part from the pressure receiving surface when the cam pressing part places the parking operation arm in the parking position is substantially opposite a direction in which the cam pressing part extends radially outward in reference to the axis of the drum member.

Preferably, the fork shaft is configured to be brought into contact with the parking operation arm, which is biased in the parking cancelling direction around the swing axis by the parking cancelling spring in a state where the cam pressing part is not engaged with the parking operation arm, to define the extent of swinging movement of the parking operation arm in the parking cancelling direction.

In one embodiment, the shifter member has the parking depression and projection part at an outer circumferential surface facing radially outward so that the shifter member also functions as the parking member.

In another embodiment, the parking member is formed by a parking gear that is separate from the shifter member and is supported by the first or second power transmission rotating shaft so as to be incapable of relative rotation.

Preferably, the parking operation arm has a boss part fitted over a pivotal support shaft defining the swing axis so as to be relatively rotatable and an arm part extending radially outward from the boss part and having the engagement part on a free end side.

The parking cancelling spring is a coil spring fitted over the boss part of the parking operation arm, and the coil spring has one end side being operatively connected to the pivotal support shaft and the other end side being operatively connected to the parking operation arm.

In a preferable embodiment, the shift-drum speed change apparatus may be provided with a shift fork pressing spring pressing the shift fork in a direction in which the shifter member is pressed toward the speed change gear.

In a case where axial positions of the shift fork and the shifter member placed when the shifter member is not depression and projection-engaged with the speed change gear member and is depression and projection-engaged with the speed change gear member are referred to as a reference position and a speed change position, respectively, the fork guide groove has a groove shape securing the shift fork in the reference position when the drum member is placed in a neutral position and a parking position around the axis, and allowing the shift fork to move between the reference position and the speed change position when the drum member is placed in a speed change position around the axis.

In the shift-drum speed change apparatus described in Patent Document 2, the parking gear, which is a component separate from the speed change gear and the shifter member supported by the first power transmission rotating shaft for transmitting power between the first and second power transmission rotating shafts, is supported by the first power transmission rotating shaft in a place axially displaced from the speed change gear and the shifter member.

The parking locking mechanism is configured to act on the parking gear that is axially displaced from the speed change gear and the shifter member.

Although the shift-drum speed change apparatus having such a configuration is advantageous in being capable of selectively providing a power transmitting state and a parking state, it is difficult to reduce the overall size of the apparatus in the axial direction of the power transmission rotating shafts.

The above problem is solved by a shift-drum speed change apparatus including a speed change gear supported by a first power transmission rotating shaft so as to be relatively rotatable; a power transmission gear supported by a second power transmission rotating shaft so as to be incapable of relative rotation and directly or indirectly meshed with the speed change gear; a shifter member supported by the first power transmission rotating shaft so as to be incapable of relative rotation and so as to be axially movable; a drum member operated to rotate around the axis; a fork shaft parallel to the drum member; and a shift fork which is supported by the fork shaft so as to be axially movable, an axial position of which is guided by a fork guide groove formed in the drum member, and which axially moves the shifter member in accordance with its own axial movement, wherein the shifter member and the speed change gear have a speed change depression and projection part on the mutually opposing end faces, and the shift fork axially moved via the fork guide groove in accordance with the rotation of the drum member axially moves the shifter member to depression and projection-engage the shifter member and the speed change gear, and moreover, in the shift-drum speed change apparatus, the shifter member has a parking depression and projection part facing radially outward, and a locking mechanism is provided that is depression and projection-engaged with the parking depression and projection part in accordance with the rotational movement of the drum member to the parking position so as to forcibly bring the shifter member into a rotation suspended state.

According to the shift-drum speed change apparatus having the above configuration, it is possible to reduce the size in the axial direction while providing a parking state in addition to a power transmitting state.

In a preferable embodiment, the locking mechanism may include a parking operation arm that is capable of swinging around a swing axis parallel to the first power transmission rotating shaft and has an engagement part capable of engaging with the parking depression and projection part, the parking operation arm being capable of taking a parking position around the swing axis where the engagement part is engaged with the parking depression and projection part so that the shifter member is forcibly brought into a rotation suspended state; a parking cancelling spring biasing the parking operation arm around the swing axis in a direction in which the engagement part is moved away from the parking depression and projection part; and a parking pressing member having a main body part supported by the drum member and a cam pressing part extending radially outward from the main body part.

The cam pressing part is configured not to act on the parking operation arm when the drum member is placed in the neutral position and the speed change position around the axis, and is configured to press the parking operation arm toward the parking position against the biasing force of the parking release spring in accordance with the rotational movement of the drum member to the parking position around the axis.

In a more preferable embodiment, the main body part is supported by the drum member so as to be relatively rotatable, and is operatively connected to the drum member via a parking coil spring fitted over the drum member.

The parking coil spring is configured to connect the drum member and the parking pressing member so as to be incapable of relative rotation such that the parking pressing member is integrally rotated in accordance with the rotation of the drum member around the axis when the circumferential load on the cam pressing part is equal to or less than a predetermined value, and, on the other hand, is configured to be elastically deformed so as to allow the drum member to relatively rotate around the axis in advance relative to the parking pressing member when the circumferential load on the cam pressing part exceeds the predetermined value.

In a case where the engagement part of the parking operation arm abuts against the projection of the parking depression and projection part when the cam pressing part swings the parking operation arm toward the parking position, and whereby the circumferential load on the cam pressing part exceeds the predetermined value, the drum member is relatively rotated around the axis to the parking position in advance relative to the parking pressing member while elastically deforming the parking coil spring.

In this situation, when the engagement part and the parking depression and projection part are positionally adjusted in the circumferential direction, an elastic force involved in the parking coil spring swings the parking operation arm to the parking position against the biasing force of the parking cancelling spring so that the engagement of the engagement part and the parking depression and projection part is completed.

In any one of the above configurations, the shifter member and the shift fork, with respect to axial positions, may be capable of selectively taking a reference position where the shifter member is not depression and projection-engaged with the speed change member, and a speed change position where the shifter member is depression and projection-engaged with the speed change member, the shifter member is pressed toward the speed change gear via the shift fork that is forced to one side in the axial direction by the shift fork pressing spring, and the fork guide groove may have a groove shape securing the shift fork in the reference position when the drum member is placed in a neutral position and a parking position, and allowing the shift fork to move between the reference position and the speed change position when the drum member is placed in a speed change position.

In a preferable embodiment, the shift fork and the shifter member are capable of taking, with respect to axial positions, a parking forcible cancellation position displaced from the reference position toward the other side in the axial direction, in addition to the reference position and the speed change position, and the fork guide groove has a groove shape guiding the shift fork so as to move from the reference position back to the reference position via the parking forcibly cancelling position during the course of operation of the drum member from the parking position toward an operation position adjacent to the parking position.

A depression of the parking depression and projection part provided in the shifter member has a pressing-side cam inclined surface that descends radially inward in reference to the center of the shifter member from one side toward the other side in the axial direction.

The pressing-side cam inclined surface and the follower-side cam inclined surface are disposed so as to be brought into contact with each other when the shift fork and the shifter member are placed in the reference position via the fork guide groove, and the parking operation arm is placed in the parking position around the swing axis via the parking pressing member, in accordance with the operation of the drum member to the parking position.

BRIEF DESCRIPTION OF THE DRAWINGS

The above, and other objects, features and advantages of the present invention will become apparent from the detailed description thereof in conjunction with the accompanying drawings therein.

DETAILED DESCRIPTION OF THE PREFERRED EMBODIMENTS

First Embodiment

Below, one embodiment of the present invention will now be described with reference to the attached drawings.

Figure 1:
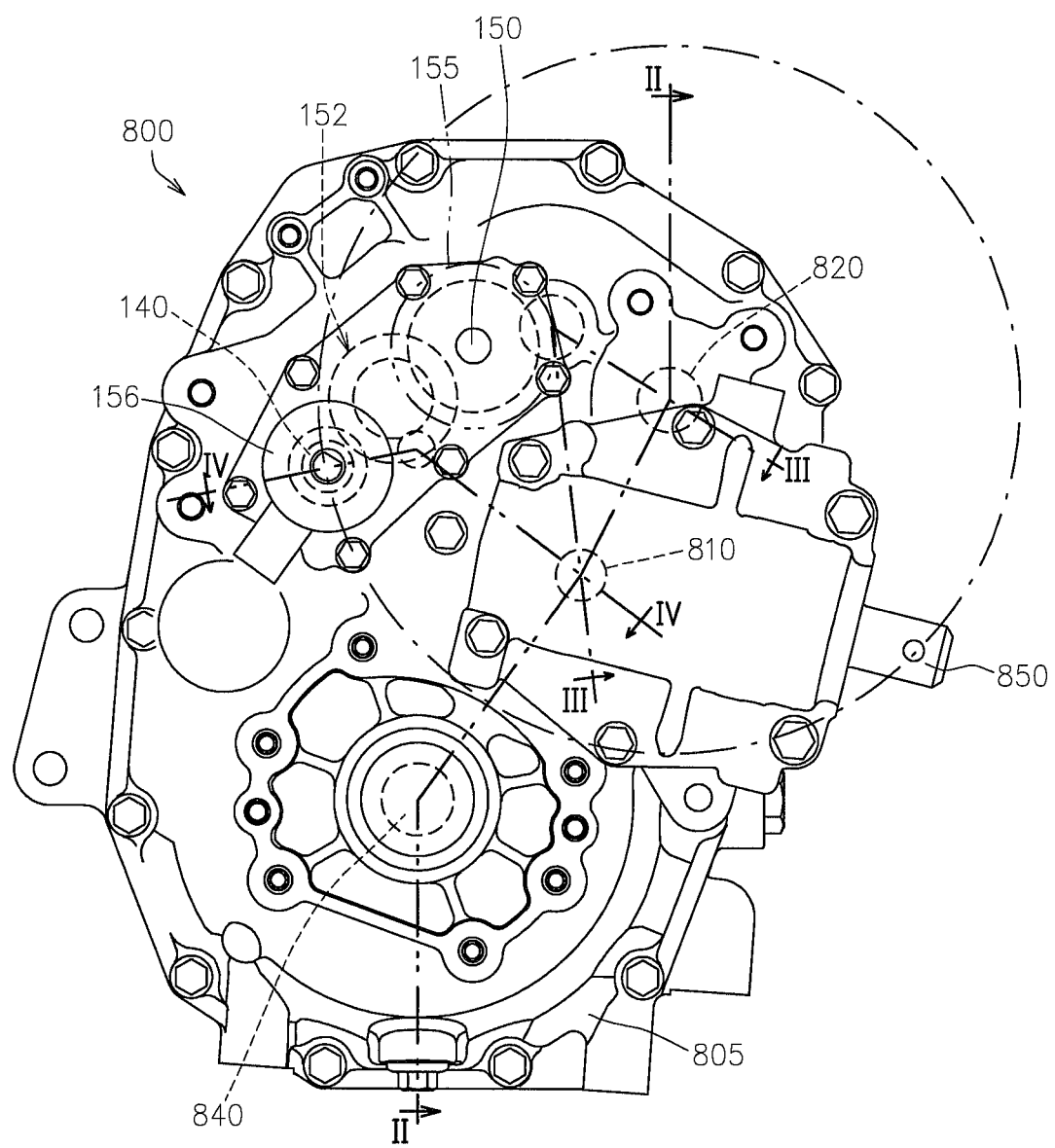
FIG. 1 is a side view of a transmission including a shift-drum speed change apparatus according to a first embodiment of the present invention.

FIG. 1 shows a side view of a transmission 800 including a shift-drum speed change apparatus 1A according to this embodiment.

Figure 2:
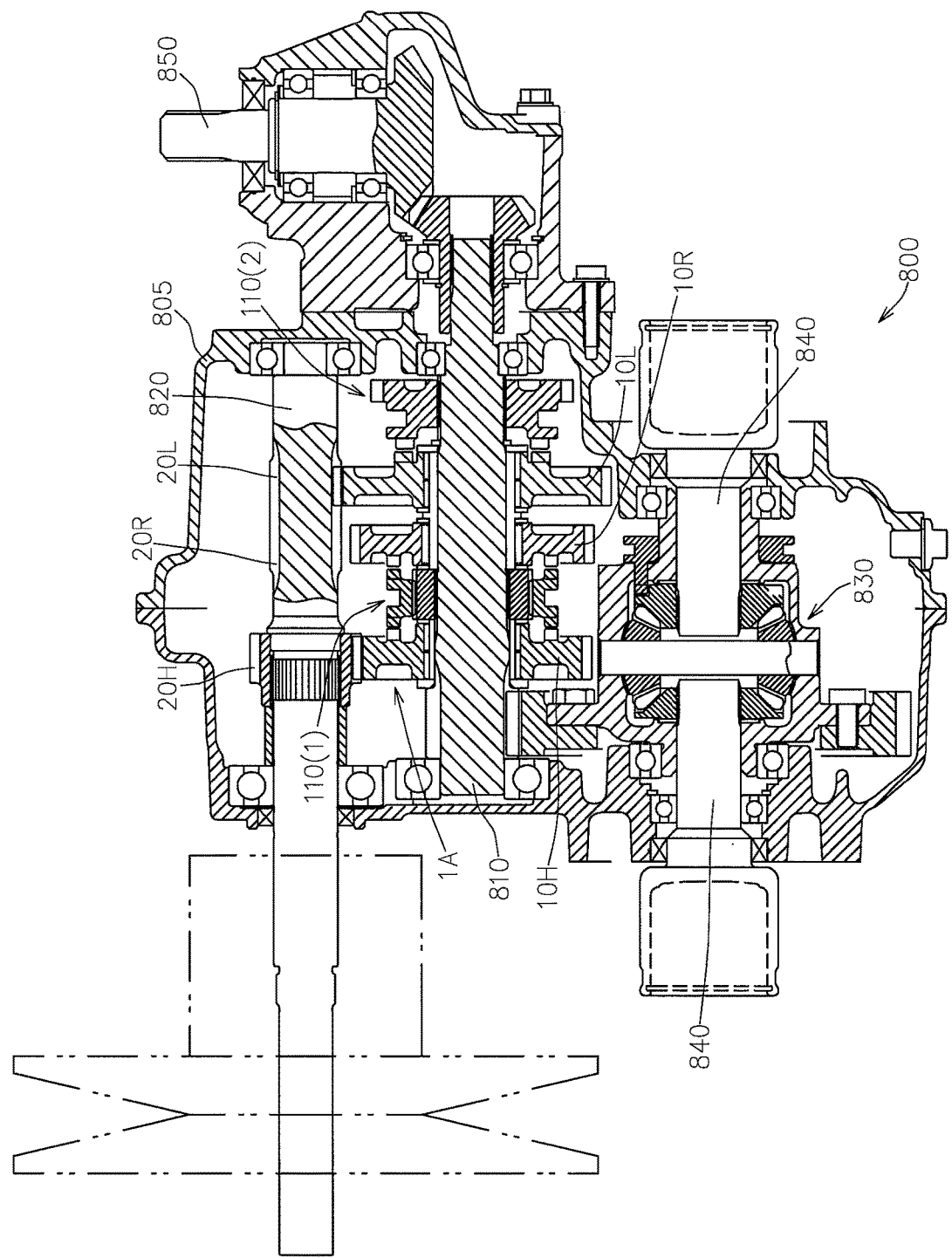
FIG. 2 is a cross-sectional view taken along the line II-II in FIG. 1, and partially shows a developed state.
Figure 3:
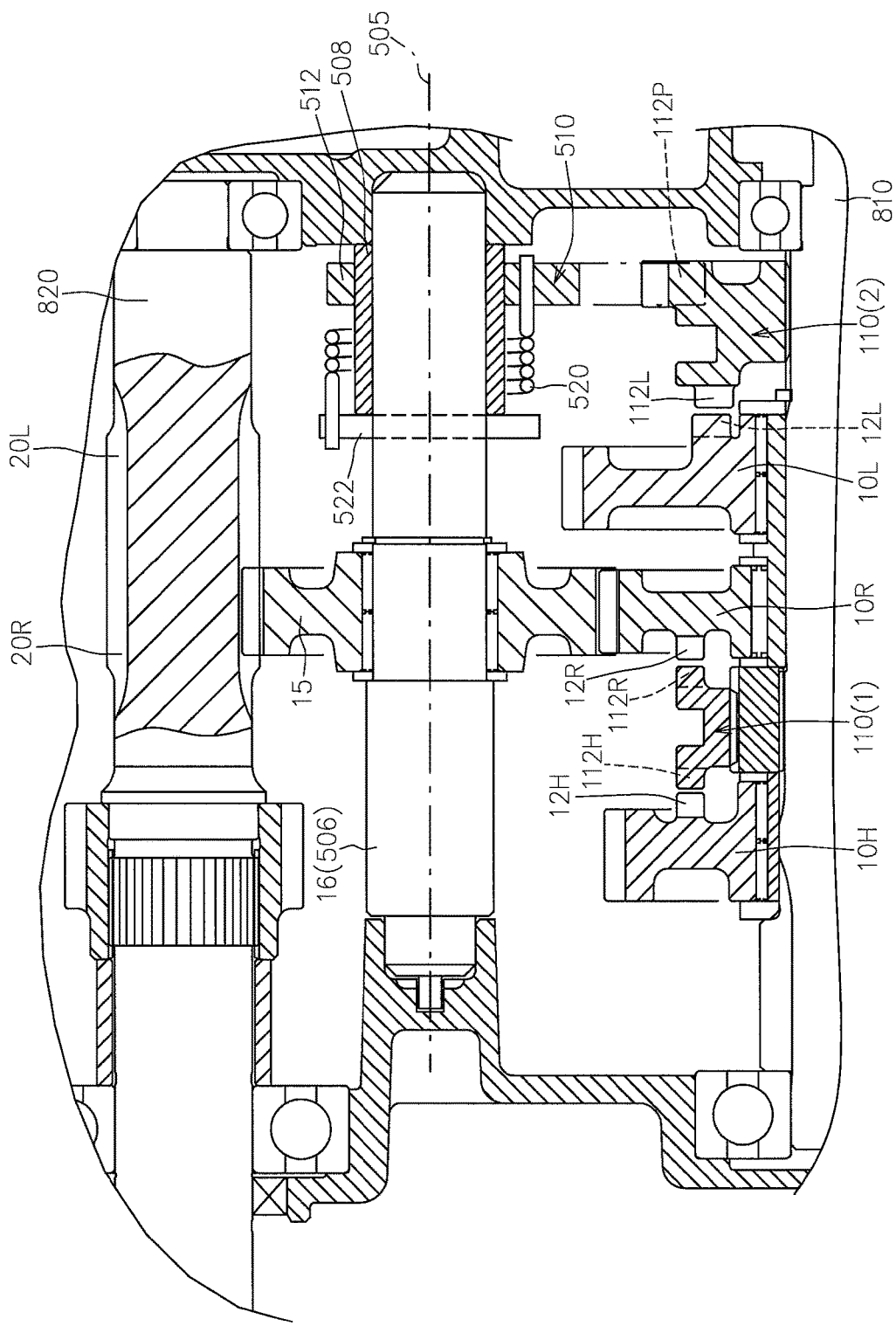
FIG. 3 is a cross-sectional view taken along the line III-III in FIG. 1.
Figure 4:
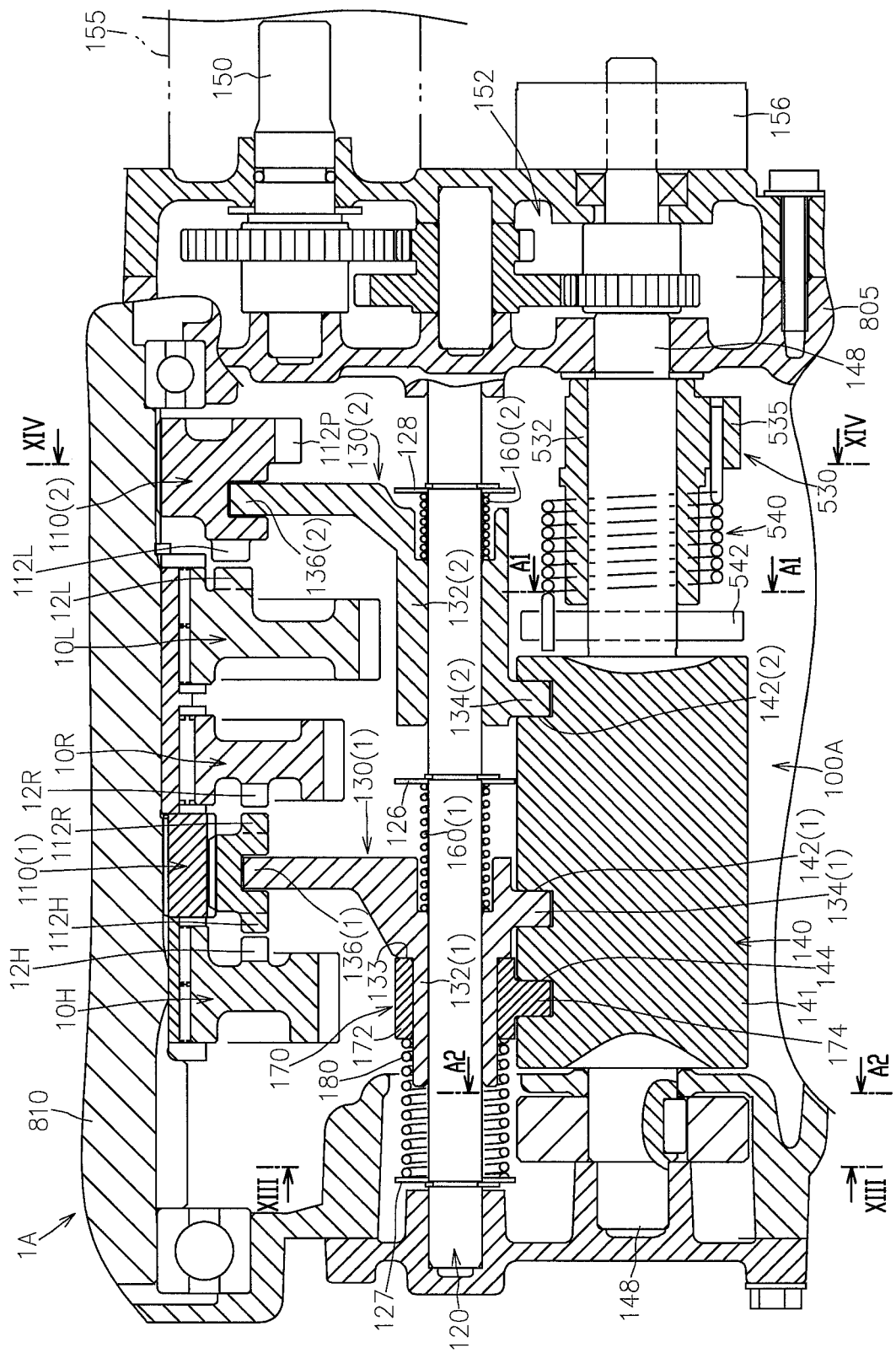
FIG. 4 is a cross-sectional view taken along the line IV-IV in FIG. 1, and shows a neutral state of the shift-drum speed change apparatus.

Also, FIGS. 2 to 4 respectively show cross-sectional views taken along the lines II-II, III-III, and IV-IV in FIG. 1.

FIG. 2 shows a sub output shaft 850 in a developed state, which will be described below.

The shift-drum speed change apparatus 1A is suitably utilized in the travel-system power transmission path of working vehicles such as tractors and utility vehicles.

The shift-drum speed change apparatus 1A is capable of changing the speed of rotary power and transmitting the resulting rotary power between first and second power transmission rotating shafts 810, 820.

Specifically, as shown in FIGS. 1 to 4, the shift-drum speed change apparatus 1A includes a speed change gear 10 supported by a first power transmission rotating shaft 810 so as to be relatively rotatable, a power transmission gear 20 supported by a second power transmission rotating shaft 820 so as to be incapable of relative rotation and meshed directly or indirectly with the speed change gear 10, and a shift-drum speed change operation mechanism 100A selectively bringing the speed change gear 10 into a power transmitting state.

In this embodiment, the speed change gear 10 includes a forward-high speed change gear 10H, a forward-low speed change gear 10L, and a reverse speed change gear 10R. The power transmission gear 20 includes a power transmission gear 20H meshed with the speed change gear 10H to form a forward-high gear train together with the speed change gear 10H, a power transmission gear 20L meshed with the speed change gear 10L to form a forward-low gear train together with the speed change gear 10L, and a power transmission gear 20R meshed with the speed change gear 10R via a reverse idle gear 15 (see FIG. 3) to form a reverse gear train together with the speed change gear 10R and the reverse idle gear 15.

In this embodiment, the second power transmission rotating shaft 820 acts as a speed change input shaft operatively receiving rotary power from a power source (not shown) such as an engine, and the first power transmission rotating shaft 810 acts as a speed change output shaft outputting the speed-changed rotary power to drive wheels.

That is to say, as shown in FIGS. 1 and 2, the transmission 800 includes a transmission case 805; the second power transmission rotating shaft 820 that is supported by the transmission case 805 so as to be rotatable around the axis, with one end extending outward so as to be operatively connected to the power source, and that acts as a speed change input shaft; the first power transmission rotating shaft 810 that is supported by the transmission case 805 so as to be axially rotatable around the axis, and that acts as a speed change output shaft; and the shift-drum speed change apparatus 1A that transmits rotary power from the second power transmission rotating shaft 820 to the first power transmission rotating shaft 810 at various speeds.

As shown in FIGS. 1 and 2, the transmission 800 further includes a pair of right and left main output shafts 840, a differential gear apparatus 830 differentially transmitting rotary power operatively input from the speed change output shaft (the first power transmission rotating shaft 810) to the pair of right and left main output shafts, and the sub output shaft 850 outputting rotary power of the speed change output shaft to a power transmission path different from the main output shafts 840.

When the transmission 800 is applied to the travel-system power transmission path of a working vehicle, for example, it is possible to cause the pair of main output shafts 840 to act as a pair of right and left rear wheel drive shafts and the sub output shaft 850 to act as a front wheel drive shaft.

The shift-drum speed change operation mechanism 100A is configured to selectively bring the plurality of speed change gears 10 into a power transmitting state and thus bring the speed change apparatus 1A into a desired speed change stage engaged state.

Specifically, as shown in FIGS. 2 to 4, the speed change operation mechanism 100A includes a shifter member 110 supported by the first power transmission rotating shaft 810 so as to be incapable of relative rotation and so as to be axially movable, and selectively depression and projection-engaged with the speed change gear 10 by axial movement; a fork shaft 120 parallel to the first power transmission rotating shaft 810; a shift fork 130 supported by the fork shaft 120 so as to be axially movable; and a drum member 140 operated to rotate around an axis parallel to the first power transmission rotating shaft 810.

Specifically, the opposing end faces of the shifter member 110 and the speed change gear 10 have speed change depression and projection parts 112, 12, respectively. By axially moving the shifter member 110 toward the speed change gear 10, the speed change depression and projection part 112 of the shifter member 110 is engaged with the speed change depression and projection part 12 of the speed change gear 10. Thereby, a power transmitting state is attained where the speed change gear 10 rotates integrally with the first power transmission rotating shaft 810 via the shifter member 110.

As shown in FIGS. 2 to 4, in this embodiment, the speed change gear 10H, the speed change gear 10R, and the speed change gear 10L are disposed on the first power transmission rotating shaft 810 in order from the first side toward the second side in the axial direction.

The speed change operation mechanism 100A has, as the shifter member 110, a first shifter member 110(1) supported by the first power transmission rotating shaft 810 so as to be incapable of relative rotation and so as to be axially movable between the speed change gear 10H and the speed change gear 10R and depression and projection-engaged with the speed change gear 10H and the speed change gear 10R in accordance with movement toward the first side and the second side in the axial direction, respectively, and a second shifter member 110(2) supported by the first power transmission rotating shaft 810 so as to be incapable of relative rotation and so as to be axially movable in a place where the second shifter member 110(2) faces the speed change gear 10L and depression and projection-engaged with the speed change gear 10L in accordance with axial movement toward the speed change gear 10L (toward the first side in the axial direction in the depicted embodiment).

The first shifter member 110(1) has a high speed depression and projection part 112H capable of depression and projection engagement with the speed change depression and projection part 12H of the speed change gear 10H on the end face on the first side in the axial direction where the end face faces the speed change gear 10H, and a reverse depression and projection part 112R capable of depression and projection engagement with the speed change depression and projection part 12R of the speed change gear 10R on the end face on the second side in the axial direction where the end face faces the speed change gear 10R.

The second shifter member 110(2) has a low speed depression and projection part 112L capable of depression and projection engagement with the speed change depression and projection part 12L of the speed change gear 10L on the end face on the first side in the axial direction where the end face faces the speed change gear 10L.

As shown in FIG. 4, the speed change operation mechanism 100A has, as the shift fork 130, first and second shift forks 130(1), 130(2) that axially move the first and second shifter members 110(1), 110(2), respectively.

As shown in, for example, FIG. 4, the first shift fork 130(1) has a first boss part 132(1) supported by the fork shaft 120 so as to be axially movable, a first engagement pin part 134(1) received by a first fork guide groove 142(1) formed in the drum member 140, and a first fork part 136(1) engaged with the first shifter member 110(1). The first shift fork 130(1) axially moves the first shifter member 110(1) on the first power transmission rotating shaft 810 in accordance with its own axial movement on the fork shaft 120.

Specifically, with respect to axial positions, the first shift fork 130(1) and the first shifter member 110(1) are capable of taking a reference position where the first shifter member 110(1) is not depression and projection-engaged with any of the speed change gear 10H and the speed change gear 10R, a high speed position where the first shifter member 110(1) is depression and projection-engaged with the speed change gear 10H, and a reverse position where the first shifter member 110(1) is depression and projection-engaged with the speed change gear 10R.

FIG. 4 shows a state where the first shift fork 130(1) and the first shifter member 110(1) are placed in the reference positions.

The second shift fork 130(2) has a second boss part 132(2) supported by the fork shaft 120 so as to be axially movable, a second engagement pin part 134(2) received by a second fork guide groove 142(2) formed in the drum member 140, and a second fork part 136(2) engaged with the second shifter member 110(2). The second shift fork 130(2) axially moves the second shifter member 110(2) on the first power transmission rotating shaft 810 in accordance with its own axial movement on the fork shaft 120.

Specifically, with respect to axial positions, the second shift fork 130(2) and the second shifter member 110(2) are capable of taking a reference position where the second shifter member 110(2) is not depression and projection-engaged with the speed change gear 10L and a low speed position where the second shifter member 110(2) is depression and projection-engaged with the speed change gear 10L.

FIG. 4 shows a state where the second shift fork 130(2) and the second shifter member 110(2) are placed in the reference positions.

The drum member 140 is rotated around the axis in accordance with a speed change operation.

In this embodiment, as shown in FIG. 4, the shift-drum speed change operation 100A has an operating shaft 150 that receives a speed change operation, and the drum member 140 is operatively connected to the operating shaft 150.

In this embodiment, the operating shaft 150 is operatively connected to the drum member 140 via a multiplying gear train 152.

The operating shaft 150 is supported by the housing (the transmission case 805 in this embodiment) so as to be rotatable around the axis, with one end extending outward.

As shown in FIGS. 1 and 4, the operating shaft 150 is rotated around the axis by, for example, an electric motor 155.

In this case, an angle sensor 156 that detects the position around the axis of the drum member 140 is provided.

Alternatively, it is also possible to rotate the operating shaft 150 around the axis manually. In this case, the electric motor 155 is removed, and an operating arm (not shown) is attached to one end of the operating shaft 150.

As shown in FIG. 4, the drum member 140 has a drum main body 141 having fork guide grooves (the first and second fork guide grooves 142(1), 142(2) in this embodiment) and a drum shaft 148 supporting the drum main body 141 coaxially with the drum main body 141.

As shown in FIG. 4, the shift-drum speed change operation mechanism 100A further includes a first shift fork pressing spring 160(1) pressing the first boss part 132(1) toward the first side in the axial direction, a slider member 170 fitted over and supported by the first boss part 132(1) so as to be axially movable, and a slider member pressing spring 180 pressing the slider member 170 toward the second side in the axial direction.

The first shift fork pressing spring 160(1), when the first shift fork 130(1) is in a free state, is set to press the first boss part 132(1) toward the first side in the axial direction by a biasing force capable of moving the first shifter member 110(1) to a high speed position where the first shifter member 110(1) is depression and projection-engaged with the speed change gear 10H.

Specifically, of the first shift fork pressing spring 160(1), the end on the second side in the axial direction is a fixed end locked with a locking member 126 provided on the fork shaft 120, and the end on the first side in the axial direction is a movable end engaged with the end face on the second side in the axial direction of the first boss part 132(1).

The slider member 170 is supported by the first boss part 132(1) so as to be axially movable, with the moving end toward the second side in the axial direction being defined by a stopper part 133 provided on the first boss part 132(1), and, moreover, the axial position is regulated by a slider guide groove 144 provided in the drum member 140.

Specifically, the slider member 170 has a slider main body 172 fitted over the first boss part 132(1) so as to be axially movable and a slider engagement pin part 174 received by the slider guide groove 144.

The slider member pressing spring 180 is configured to press the slider member 170 toward the second side in the axial direction by a larger biasing force than the first shift fork pressing spring 160(1).

That is to say, the slider member pressing spring 180, when the first shift fork 130(1) and the slider member 170 are in a free state, is configured to press the first boss part 132(1) toward the second side in the axial direction via the slider member 170 by a biasing force capable of moving the first shifter member 110(1) to a reverse position where the first shifter member 110(1) is depression and projection-engaged with the speed change gear 10R against the biasing force of the first shift fork pressing spring 160(1) biasing the first shift fork 130(1) toward the first side in the axial direction.

Specifically, of the slider member pressing spring 180, the end on the first side in the axial direction is a fixed end locked with a locking member 127 provided on the fork shaft, and the end on the second side in the axial direction is a movable end engaged with the end face on the first side in the axial direction of the slider member 170.

In this embodiment, as shown in FIG. 4, the shift-drum speed change operation mechanism 100A further includes a second shift fork pressing spring 160(2) pressing the second boss part 132(2) in a direction in which the second shifter member 110(2) is pressed toward the speed change gear 10L.

As described above, in this embodiment, the speed change gear 10L is placed on the first side in the axial direction of the second shifter member 110(2), and, accordingly, the second shift fork pressing spring 160(2) presses the second boss part 132(2) toward the first side in the axial direction.

Specifically, of the second shift fork pressing spring 160(2), the end on the second side in the axial direction is a fixed end locked with a locking member 128 provided on the fork shaft 120, and the end on the first side in the axial direction is a movable end engaged with the end face on the second side in the axial direction of the second boss part 132(2).

The second shift fork pressing spring 160(2), when the second shift fork 130(2) is in a free state, is set to press the second boss part 132(2) by a biasing force capable of moving the second shifter member 110(2) to a low speed position where the second shifter member 110(2) is depression and projection-engaged with the speed change gear 10L.

Here, the groove shapes of the first fork guide groove 142(1), the second fork guide groove 142(2), and the slider guide groove 144 will now be described.

Figure 5:
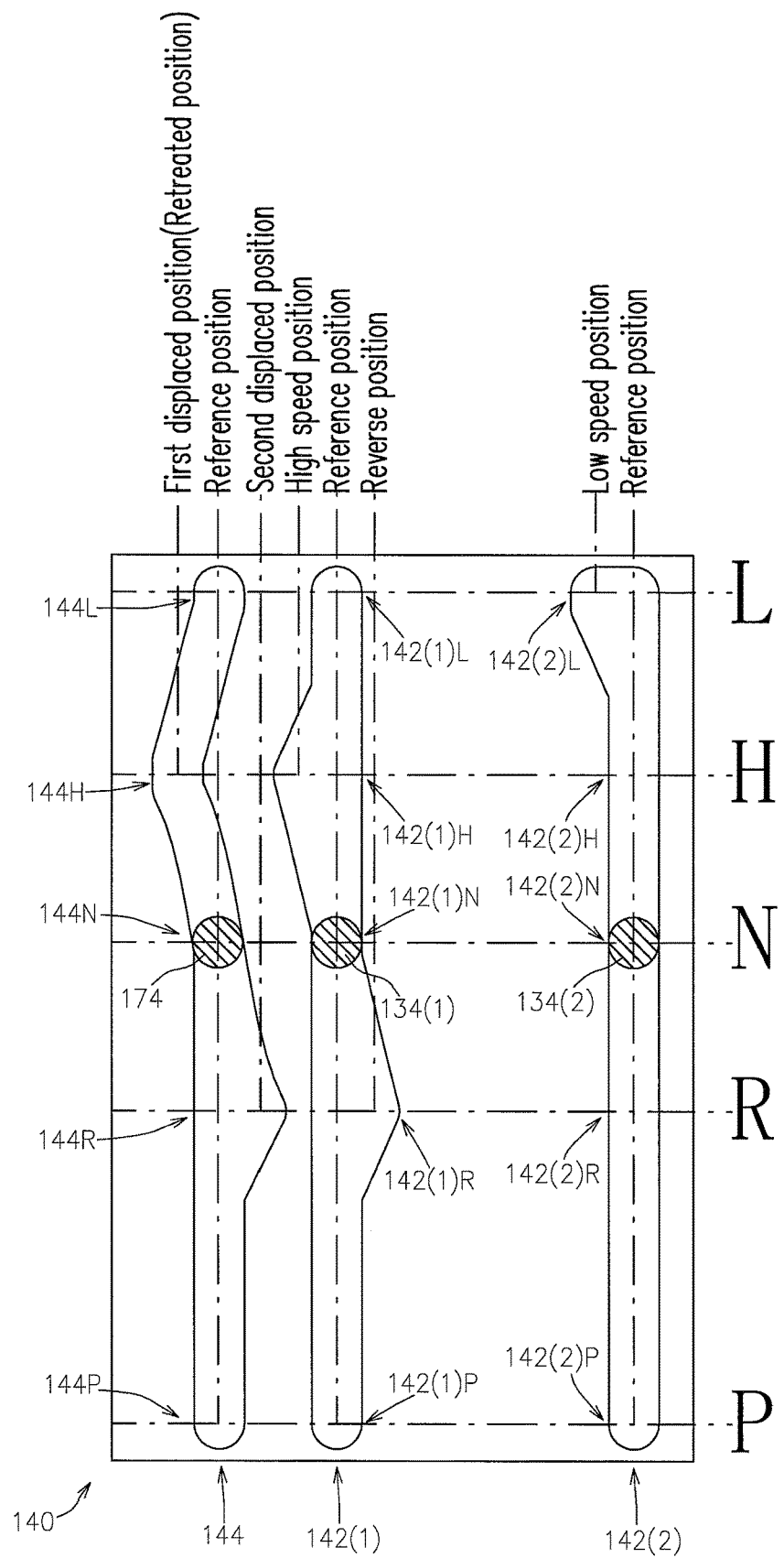
FIG. 5 is a development view of a drum member provided in the shift-drum speed change apparatus according to the first embodiment, and shows a state in which the drum member is placed in a neutral position.

FIG. 5 shows a development view of the drum member 140.

The drum member 140 is configured to take operational positions around the axis corresponding to the speed change stages (including a neutral stage) that the shift-drum speed change apparatus 1A can take.

In this embodiment, the shift-drum speed change apparatus 1A is configured to be capable of taking a neutral stage, a forward high speed stage, a forward low speed stage, and a reverse stage. Accordingly, the drum member 140 is configured to take a neutral position N, a high speed position H, a low speed position L, and a reverse position R around the axis.

Specifically, in this embodiment, the drum member 140 is configured to take the high speed position H when rotated from the neutral position N toward one side around the axis, take the low speed position L when further rotated from the high speed position H toward one side around the axis, and take the reverse position R when rotated from the neutral position N toward the other side around the axis.

The shift-drum speed change apparatus 1A can further take a parking stage, and the drum member 140 can take a parking position P in addition to the aforementioned operational positions.

As shown in FIG. 5, in this embodiment, the drum member 140 is configured to take the parking position P when further rotated from the reverse position R toward the other side around the axis.

The configuration for providing this parking state will be described below.

As shown in FIG. 5, the first fork guide groove 142(1), the slider guide groove 144, and the second fork guide groove 142(2) have a neutral engagement part, a high speed engagement part, a low speed engagement part, a reverse engagement part, and a parking engagement part where they are engaged with the corresponding engagement pin parts 134(1), 174, and 134(2), respectively, when the drum member 140 is placed in the neutral position N, the high speed position H, the low speed position L, the reverse position R, and the parking position P.

First, the groove shape of the first fork guide groove 142(1) will now be described.

As shown in FIG. 5, the neutral engagement part 142(1)N of the first fork guide groove 142(1) has a groove shape holding the first engagement pin part 134(1) so as to secure the first shift fork 130(1) in the reference position.

The high speed engagement part 142(1)H has a groove shape guiding the first engagement pin part 134(1) such that the moving end of the first shift fork 130(1) toward the first side in the axial direction is in the high speed position, and the moving end toward the second side in the axial direction is in the reference position.

The transitional part located between the neutral engagement part 142(1)N and the high speed engagement part 142(1)H has such a groove shape that the moving end of the first shift fork 130(1) toward the second side in the axial direction is secured in the reference position, and the moving end of the first shift fork 130(1) toward the first side in the axial direction is shifted from the reference position to the high speed position in accordance with the rotation of the drum member 140 from the neutral position N to the high speed position H.

The low speed engagement part 142(1)L has a groove shape holding the first engaging pin part 134(1) so as to secure the first shift fork 130(1) in the reference position.

The transitional part between the high speed engagement part 142(1)H and the low speed engagement part 142(1)L has such a groove shape that the moving end of the first shift fork 130 (1) toward the second side in the axial direction is secured in the reference position, and the moving end of the first shift fork 130(1) toward the first side in the axial direction is shifted from the high speed position to the reference position in accordance with the rotation of the drum member 140 from the high speed position H to the low speed position L.

The reverse engagement part 142(1)R has such a groove shape that the moving end of the first shift fork 130(1) toward the first side in the axial direction is in the reference position, and the moving end toward the second side in the axial direction is in the reverse position.

The transitional part located between the neutral engagement part 142(1)N and the reverse engagement part 142(1)R has such a groove shape that the moving end of the first shift fork 130(1) toward the first side in the axial direction is secured in the reference position, and the moving end of the first shift fork 130(1) toward the second side in the axial direction is shifted from the reference position to the reverse position in accordance with the rotation of the drum member 140 from the neutral position N to the reverse position R.

The parking engagement part 142(1)P has a groove shape securing the first shift fork 130(1) in the reference position.

The transitional part between the reverse engagement part 142(1)R and the parking engagement part 142(1)P has such a groove shape that the moving end of the first shift fork 130(1) toward the first side in the axial direction is secured in the reference position, and the moving end of the first shift fork 130(1) toward the second side in the axial direction is shifted from the reverse position to the reference position in accordance with the rotation of the drum member 140 from the reverse position R to the parking position P.

Next, the groove shape of the slider guide groove 144 will now be described.

The slider guide groove 144 is configured so as to secure the slider member 170 in a retreated position that does not limit the range of axial movement of the first shift fork 130(1) permitted by the high speed engagement part 142(1)H of the first fork guide groove 142(1) when the first drum member 140 is placed in the high speed position H.

Specifically, the axial positions of the slider member 170 placed when the first shift fork 130(1) is placed in the reference position, the high speed position, and the reverse position in a state where the slider member 170 remains in contact with the stopper part 133, are referred to as a reference position, a first displaced position, and a second displaced position, respectively (see FIG. 5).

In this embodiment, as shown in FIG. 5, a high speed engagement part 144H of the slider guide groove 144 is configured to secure the slider member 170 in the first displaced position.

That is to say, in this embodiment, the slider guide groove 144 is configured to secure the slider member 170 in the first displaced position as the retreated position when the drum member 140 is placed in the high speed position H.

In this embodiment, the slider guide groove 144 further has the following groove shape.

That is to say, as shown in FIG. 5, the neutral engagement part 144N has a groove shape holding the slider engagement pin part 174 so as to secure the slider member 170 in the reference position.

The transitional part between the neutral engagement part 144N and the high speed engagement part 144H has such a groove shape that the slider member 170 is guided from the reference position to the first displaced position in accordance with the rotation of the drum member 140 from the neutral position N to the high speed position H.

The low speed engagement part 144L has a groove shape holding the slider engagement pin part 174 so as to secure the slider member 170 in the reference position.

The transitional part between the high speed engagement part 144H and the low speed engagement part 144L has such a groove shape that the slider member 170 is guided from the first displaced position to the reference position in accordance with the rotation of the drum member 140 from the high speed position H to the low speed position L.

The reverse engagement part 144R has such a groove shape that the moving end of the slider member 170 on the first side in the axial direction is in the reference position, and the moving end on the second side in the axial direction is in the second displaced position.

The transitional part between the neutral engagement part 144N and the reverse engagement part 144R has such a groove shape that the moving end of the slider member 170 toward the first side in the axial direction is secured in the reference position, and the moving end of the slider member 170 toward the second side in the axial direction is shifted from the reference position to the second displaced position in accordance with the rotation of the drum member 140 from the neutral position N to the reverse position R.

The parking engagement part 144P has such a groove shape that the slider member 170 is secured in the reference position.

The transitional part between the reverse engagement part 144R and the parking engagement part 144P has such a groove shape that the moving end of the slider member 170 toward the first side in the axial direction is secured in the reference position, and the moving end of the slider member 170 toward the second side in the axial direction is shifted from the second displaced position to the reference position in accordance with the rotation of the drum member 140 from the reverse position R to the parking position P.

Next, the groove shape of the second fork guide groove 142(2) will now be described.

The second fork guide groove 142(2) has a groove shape allowing the second shift fork 130(2) to axially move between the reference position and the low speed position when the drum member 140 is placed in the low speed position L and, on the other hand, securing the second shift fork 130(2) in the reference position when the drum member 140 is placed in operational positions other than the low speed position L.

That is to say, as shown in FIG. 5, the region from a high speed engagement part 142(2)H to a parking engagement part 142(2)P has a groove shape holding the second engagement pin part 134(2) so as to secure the second shift fork 130(2) in the reference position.

On the other hand, a low speed engagement part 142(2)L has such a groove shape that the moving end of the second shift fork 130(2) toward the first side in the axial direction is in the low speed position, and the moving end toward the second side in the axial direction is in the reference position.

The transitional part between the high speed engagement part 142(2)H and the low speed engagement part 142(2)L has such a groove shape that the moving end of the second shift fork 130 (2) toward the second side in the axial direction is secured in the reference position, and the moving end of the second shift fork 130(2) toward the first side in the axial direction is shifted from the reference position to the low speed position in accordance with the rotation of the drum member 140 from the high speed position H to the low speed position L.

The shift-drum speed change operation mechanism 100A having such a configuration can execute a lost-motion function during speed change movement.

First, the lost-motion function in speed change movement to a high speed stage will now be described.

When the drum member 140 is placed in the neutral position N, the first shift fork 130(1) and the second shift fork 130(2) are secured in the reference position as described above (see FIG. 5).

Accordingly, the first and second shifter members 110(1), 110(2) are both placed in the reference positions, and the shift-drum speed change apparatus 1A is at a neutral stage (see FIG. 4).

When the drum member 140 is operated from the neutral position N to the high speed position H, as described above, the moving end on the first side in the axial direction of the first shift fork 130(1) regulated by the first fork guide groove 142(1) shifts from the reference position to the high speed position in accordance with the rotation of the drum member 140 from the neutral position N to the high speed position H, and once the drum member 140 is placed in the high speed position H, the first shift fork 130(1) becomes axially movable between the reference position and the high speed position.

On the other hand, when the drum member 140 is placed in the high speed position H, the slider member 170 is secured in the retreated position (the first displaced position in this embodiment) by the slider guide groove 144.

In this state, the force of the slider member pressing spring 180, which presses the slider member 170 toward the second side in the axial direction, does not act on the first boss part 132(1), and only the biasing force toward the second side in the axial direction by the first shift fork pressing spring 160(1) acts on the first boss part 132(1).

Accordingly, when the drum member 140 is placed in the high speed position H, the first shift fork 130(1) and the first shifter member 110(1) become movable to the high speed position by the biasing force of the first shift fork pressing spring 160(1).

Here, assuming that when the drum member 140 is placed in the high speed position H, the relative positions around the axis of the high speed depression and projection part 112H of the first shifter member 110(1) and the speed change depression and projection part 12H of the speed change gear 10H are at positions enabling depression and projection engagement, the high speed depression and projection part 112H and the speed change depression and projection part 12H are immediately depression and projection-engaged, bringing the speed change gear 10H into a power transmitting state, and the shift-drum speed change apparatus 1A is thus immediately brought into a high speed stage engaged state.

Figure 6:
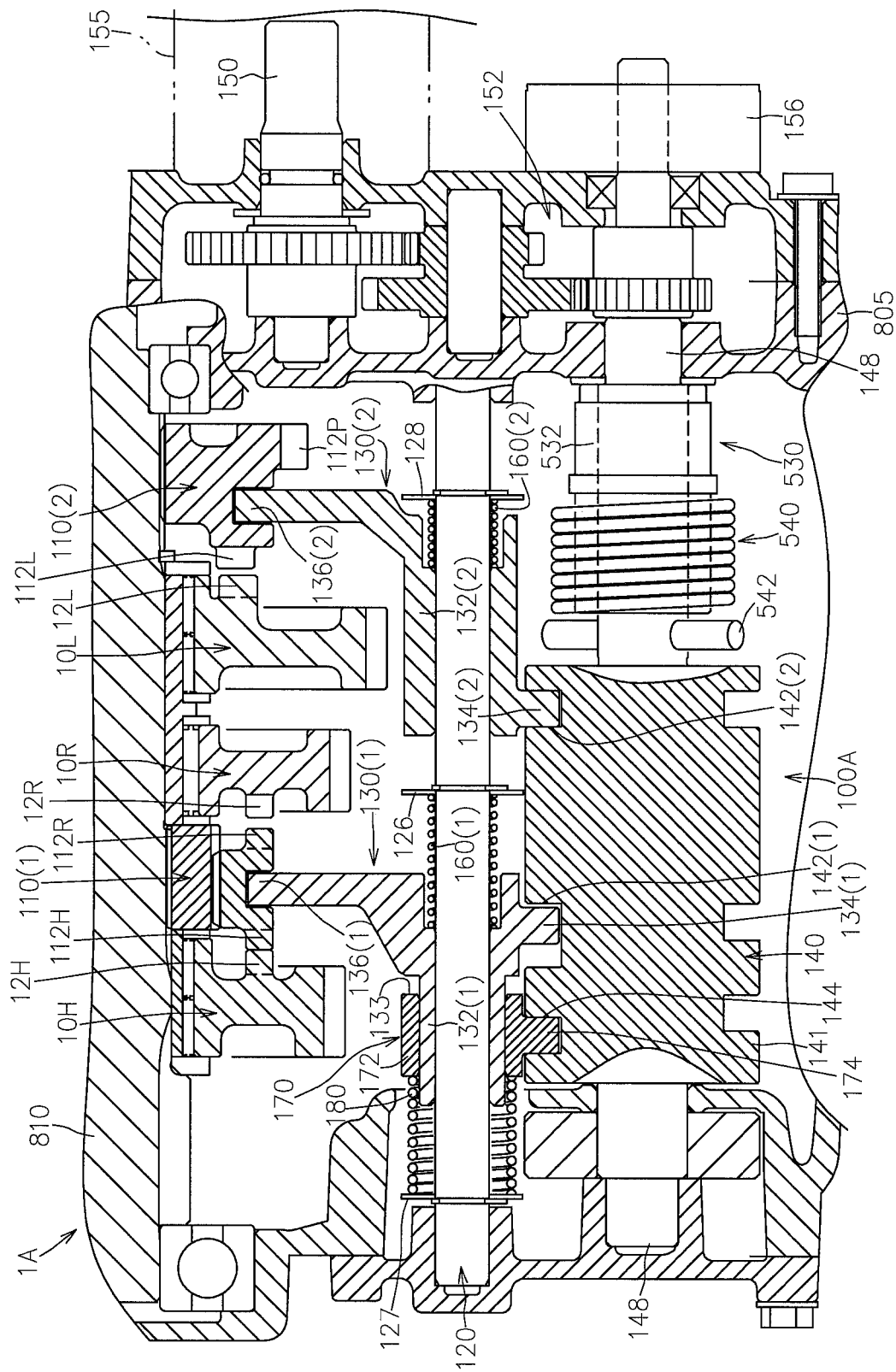
FIG. 6 is a cross-sectional view of the same cross-section as FIG. 4, and shows a lost-motion state in speed change movement to a high speed gear.

However, depending on the relative positions around the axis of the first shifter member 110(1) and the speed change gear 10H, a situation may arise where the projection of the high speed depression and projection part 112H of the first shifter member 110(1) and the projection of the speed change depression and projection part 12H of the speed change gear 10H abut against each other (see FIG. 6).

In this case, the first shifter member 110(1) cannot immediately move to the high speed position.

Even when such a situation arises, in this embodiment, the drum member 140 can be rotated to the high speed position H in advance (see FIG. 7), then the first shift fork 130(1) and the first shifter member 110(1) are moved to the high speed positions by the biasing force of the first shift fork pressing spring 160(1), and thereby the speed change movement of the shift-drum speed change apparatus 1A to the high speed stage can be completed.

Figure 7:
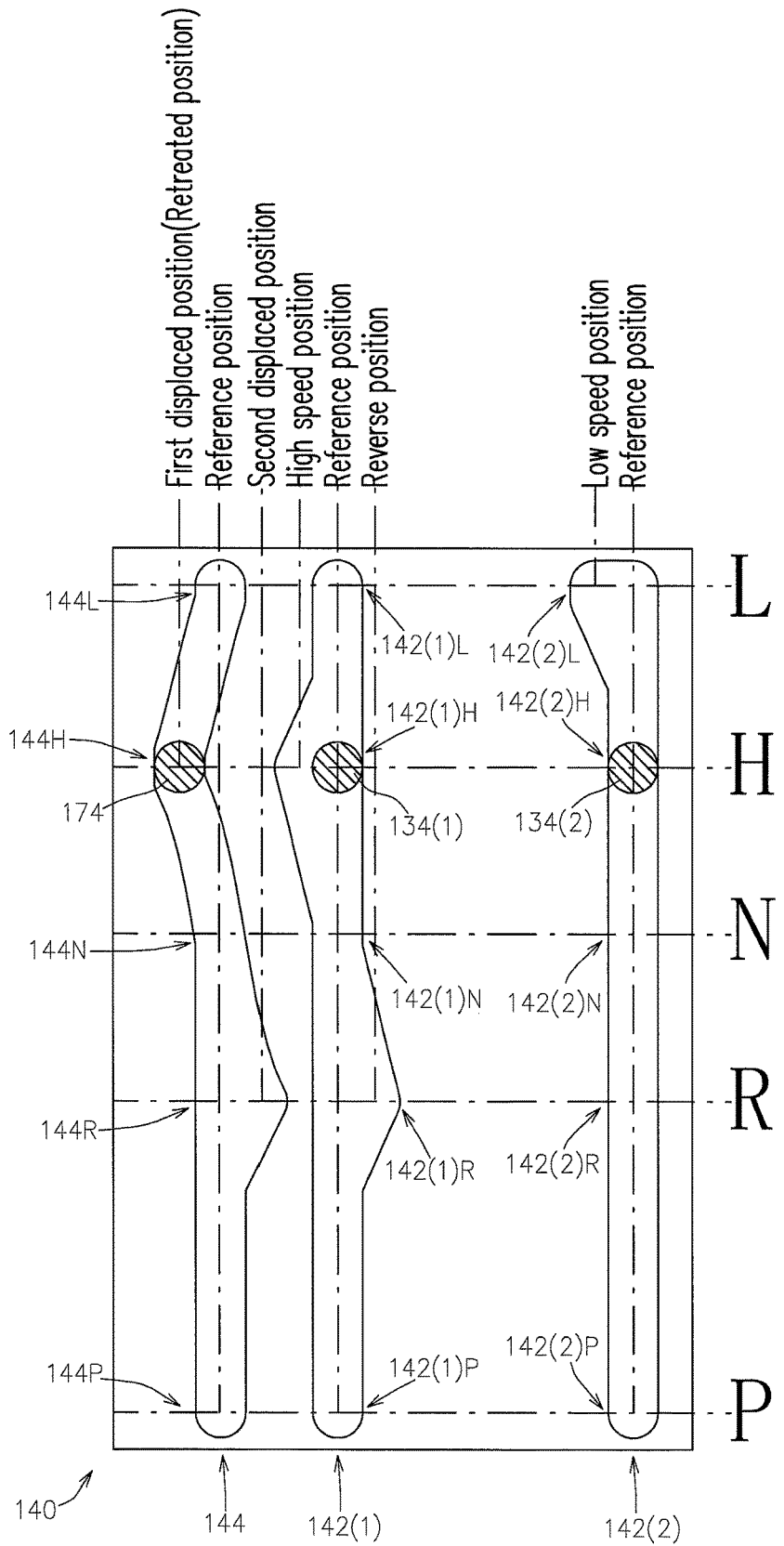
FIG. 7 is a development view of the drum member placed in a high speed position.

That is to say, when a situation arises where the projections abut against each other, the first shifter member 110(1) and the first shift fork 130(1) are secured in the reference position by the abutment of the projections while continuously receiving the biasing force toward the first side in the axial direction by the first shift fork pressing spring 160(1) as shown in FIGS. 6 and 7.

Accordingly, when the first shifter member 110(1) and the speed change gear 10H rotate relative to each other around the axis, and the abutment of the projections is eliminated, the first shifter member 110(1) is pressed to the high speed position via the first shift fork 130(1) by the biasing force of the first shift fork pressing spring 160(1) and depression and projection-engaged with the speed change gear 10H, and the speed change movement of the shift-drum speed change apparatus 1A to the high speed stage is completed (the lost-motion function to the high speed stage).

When the drum member 140 is placed in the high speed position H, as described above, the second shift fork 130(2) and the second shifter member 110(2) are secured in the reference position, and the speed change gear 10L is in a non-power transmitting state.

Next, the lost-motion function in the speed change operation to a low speed stage will now be described.

When the drum member 140 is placed in the low speed position L, the second shift fork 130(2) (and the second shifter member 110(2)) becomes axially movable between the reference position and the low speed position while being biased toward the low speed position on the first side in the axial direction by the second shift fork pressing spring 160(2).

Here, assuming that when the drum member 140 is placed in the low speed position L, the relative positions around the axis of the low speed depression and projection part 112L of the second shifter member 110(2) and the speed change depression and projection part 12L of the speed change gear 10L are at positions enabling depression and projection engagement, the low speed depression and projection part 112L and the speed change depression and projection part 12L are immediately depression and projection-engaged, bringing the speed change gear 10L into a power transmitting state, and the shift-drum speed change apparatus 1A is thus immediately brought into a low speed stage engaged state.

Figure 8:
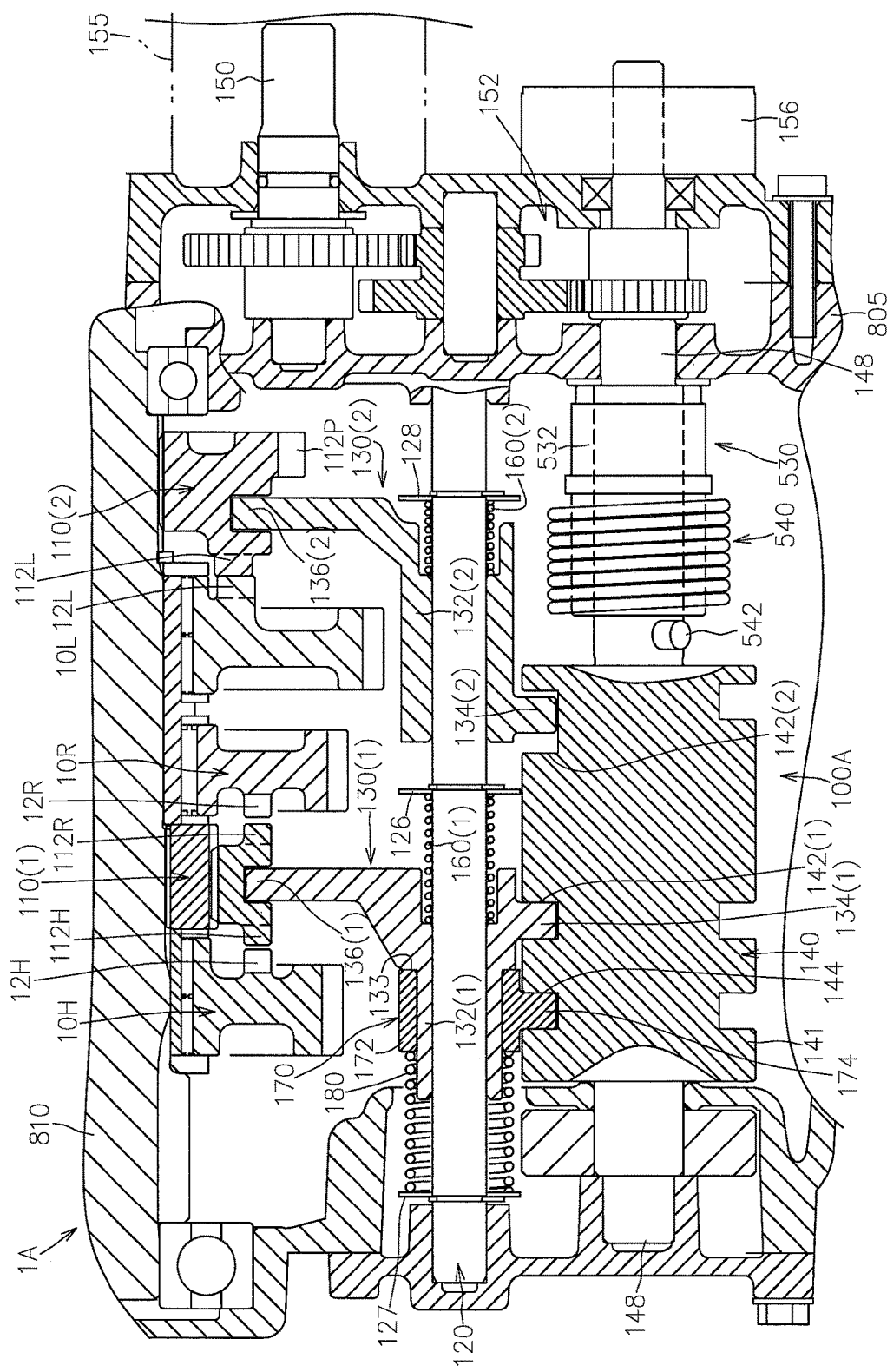
FIG. 8 is a cross-sectional view of the same cross-section as FIG. 4, and shows a lost-motion state in speed change movement to a low speed gear.
Figure 9:
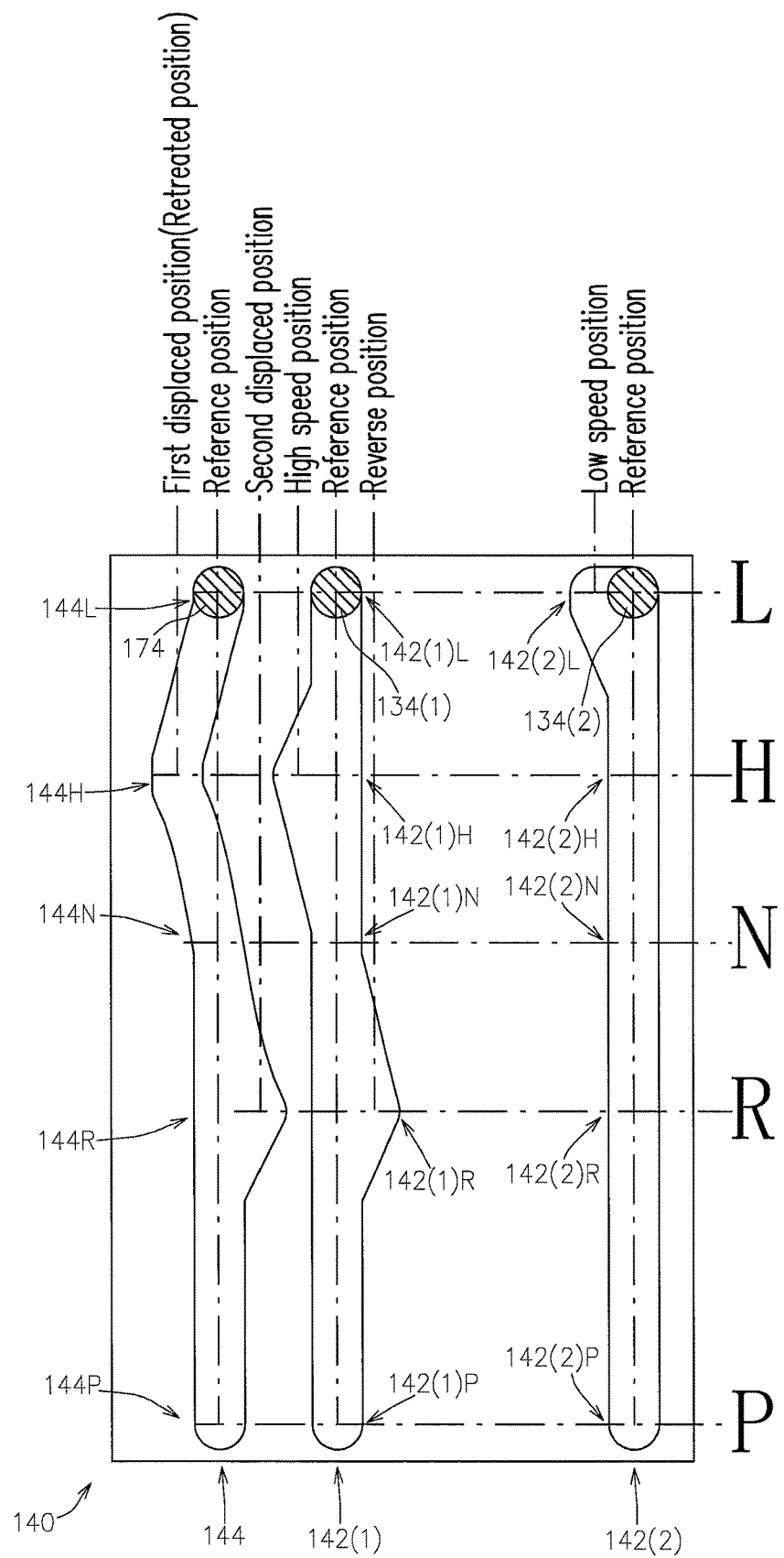
FIG. 9 is a development view of the drum member placed in a low speed position.

On the other hand, when a situation arises where the projection of the low speed depression and projection part 112L of the second shifter member 110(2) and the projection of the speed change depression and projection part 12L of the speed change gear 10L abut against each other (see FIG. 8), the second shifter member 110(2) (and the second shift fork 130(2)) is stopped in the reference position while continuously receiving the biasing force toward the first side in the axial direction by the second shift fork pressing spring 160(2) (see FIG. 8), and only the drum member 140 can be rotated to the low speed position L in advance (see FIG. 9).

Then, when the second shifter member 110(2) and the speed change gear 10L rotate relative to each other around the axis, the abutment of the projections is eliminated, the second shifter member 110(2) is pressed to the low speed position by the biasing force of the second shift fork pressing spring 160(2) and depression and projection-engaged with the speed change gear 10L, and the speed change movement of the shift-drum speed change apparatus 1A to the low speed stage is completed (the lost-motion function to the low speed stage).

When the drum member 140 is placed in the low speed position L, as described above, the first shift fork 130(1) and the first shifter member 110(1) are secured in the reference position, and the speed change gear 10H and the speed change gear 10R are in a non-power transmitting state.

Next, the lost-motion function in speed change movement to a reverse stage will now be described.

When the drum member 140 is placed in the reverse position R, the first shift fork 130(1) becomes axially movable between the reference position and the reverse position while being biased toward the first side in the axial direction by the first shift fork pressing spring 160(1).

On the other hand, the slider member 170 becomes axially movable between the reference position and the second displaced position while being biased toward the second side in the axial direction by the slider member pressing spring 180.

As described above, the biasing force of the slider member pressing spring 180 is greater than the biasing force of the first shift fork pressing spring 160(1) and, accordingly, when the drum member 140 is placed in the reverse position R, the first shift fork 130(1) becomes movable to the reverse position on the second side in the axial direction by a biasing force corresponding to the difference between the biasing force of the slider member pressing spring 180 and the biasing force of the first shift fork pressing spring 160(1).

Here, assuming that when the drum member 140 is placed in the reverse position R, the relative positions around the axis of the reverse depression and projection part 112R of the first shifter member 110(1) and the speed change depression and projection part 12R of the speed change gear 10R are at positions enabling depression and projection engagement, the reverse depression and projection part 112R and the speed change depression and projection part 12R are immediately depression and projection-engaged, bringing the speed change gear 10R into a power transmitting state, and the shift-drum speed change apparatus 1A is thus immediately brought into a reverse stage engaged state.

Figure 10:
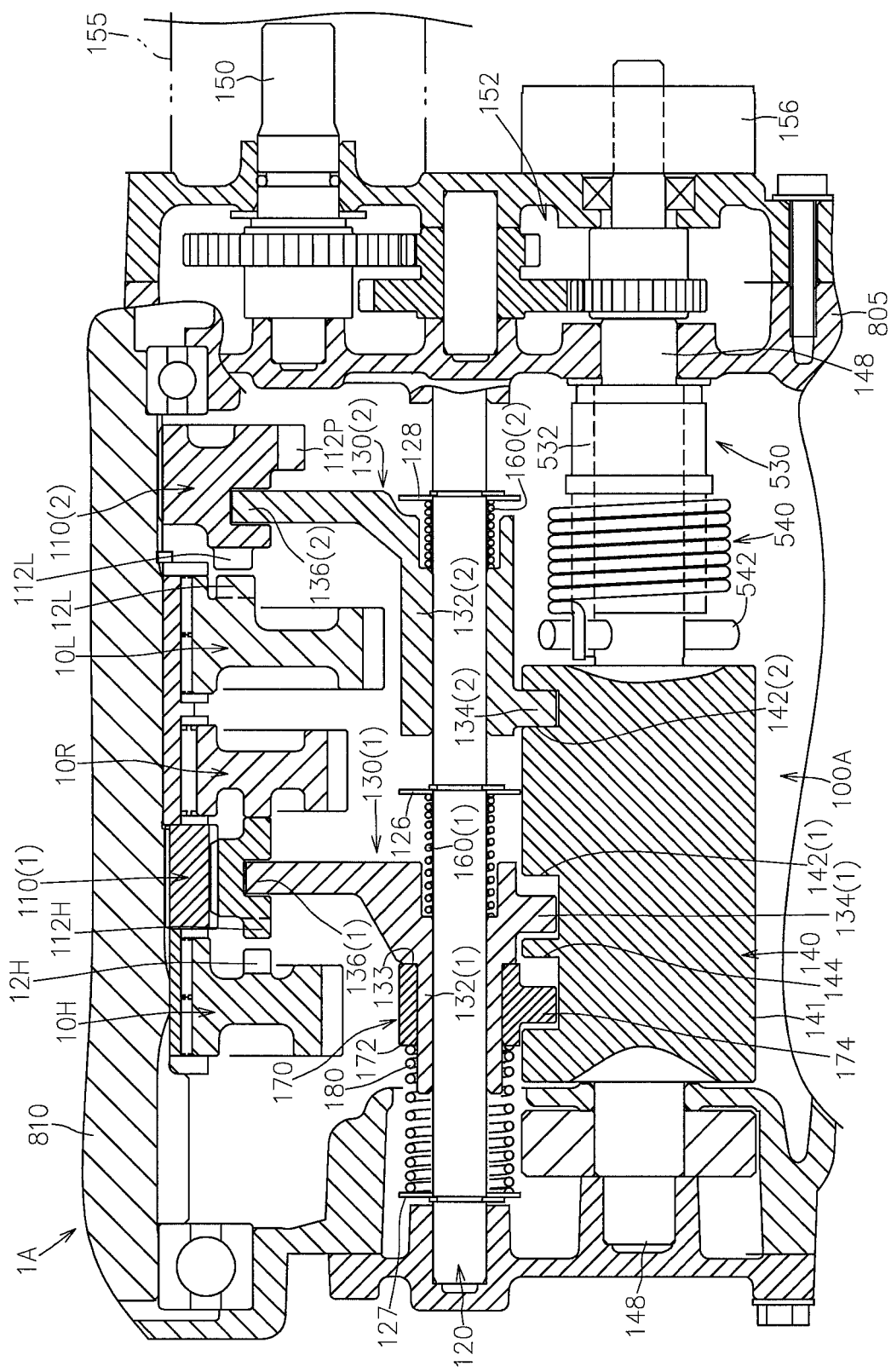
FIG. 10 is a cross-sectional view of the same cross-section as FIG. 4, and shows a lost-motion state in speed change movement to a reverse gear.
Figure 11:
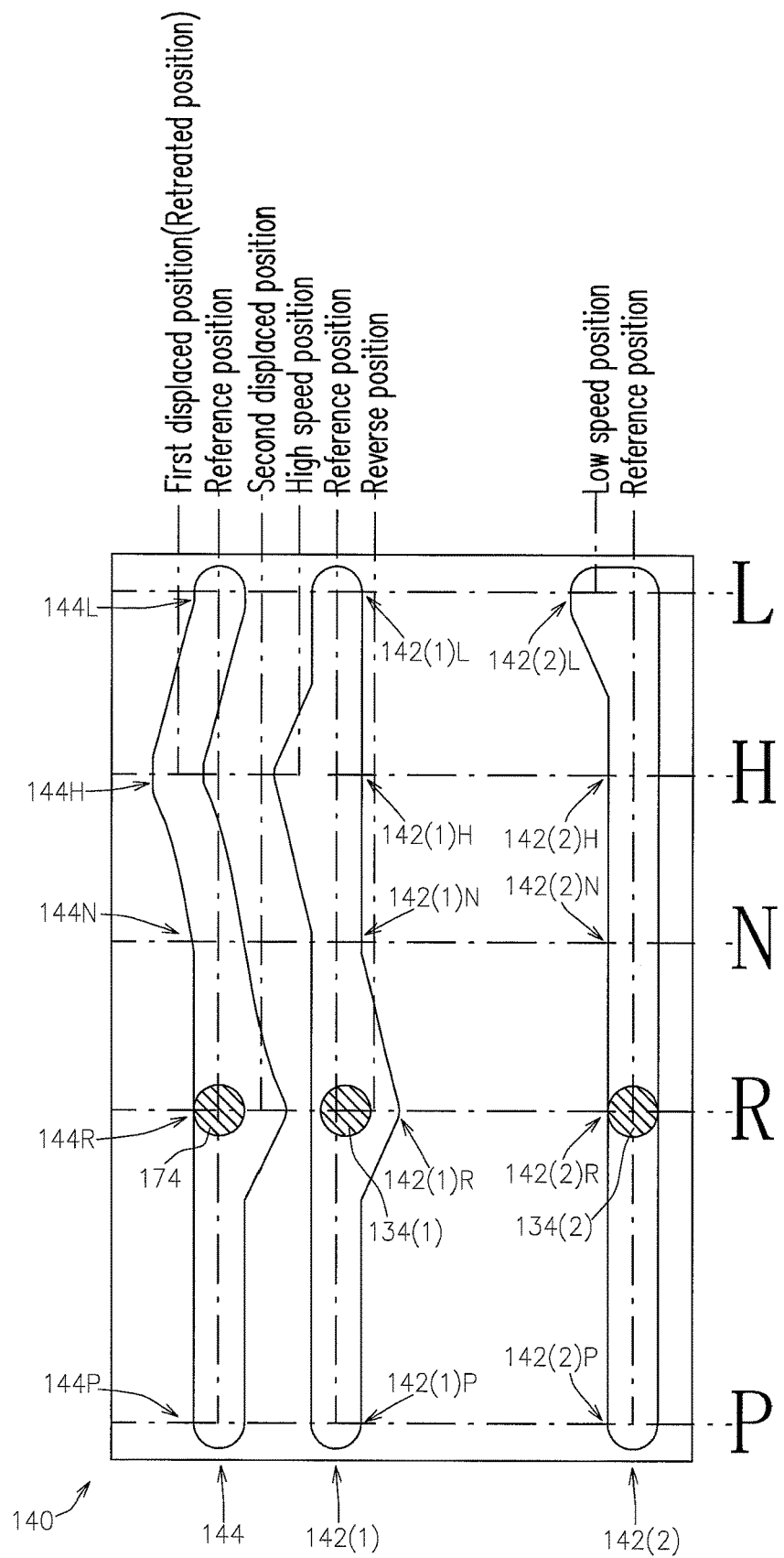
FIG. 11 is a development view of the drum member placed in a reverse position.

On the other hand, when a situation arises where the projection of the reverse depression and projection part 112R of the first shifter member 110(1) and the projection of the speed change depression and projection part 12R of the speed change gear 10R abut against each other, the first shifter member 110(1) (and the first shift fork 130(1)) is secured in the reference position while remaining biased toward the second side in the axial direction by a biasing force corresponding to the difference between the biasing force of the slider member pressing spring 180 and the biasing force of the first shift fork pressing spring 160(1) (see FIG. 10), and only the drum member 140 can be rotated to the reverse position R in advance (see FIG. 11).

When the first shifter member 110(1) and the speed change gear 10R rotate relative to each other around the axis, and the abutment of the projections is eliminated, the first shifter member 110(1) is pressed to the reverse position via the first shift fork 130(1) by the biasing force corresponding to the difference between the biasing force of the slider member pressing spring 180 and the biasing force of the first shift fork pressing spring 160(1) and depression and projection-engaged with the speed change gear 10R, and the speed change movement of the shift-drum speed change apparatus 1A to the reverse stage is completed (the lost-motion function to the reverse stage).

Thus, the shift-drum speed change operation mechanism 100A is configured such that the first shift fork 130(1) is biased toward the high speed position on the first side in the axial direction by the first shift fork pressing spring 160(1), and the first shift fork 130(1) is biased toward the reverse position on the second side in the axial direction via the slider member 170 axially biased toward the second side by the slider member pressing spring 180 having a greater biasing force than the first shift fork pressing spring 160(1) and, in addition, when the drum member 140 is placed in the high speed position, the slider member 180 is secured in the retreated position by the slider guide groove 144 of the drum member 140 so as not to cause the biasing force of the slider member pressing spring 180 to act on the first shift fork 130(1), and, thus, the lost-motion function to the high speed stage is provided by the biasing force of the first shift fork pressing spring 160(1).

The slider guide groove 144 and the first fork guide groove 142(1) of the drum member 140 are formed such that when the drum member 140 is placed in the reverse position, the first shifter member 110(1) and the first shift fork 130(1) become axially movable between the reference position and the reverse position, with the slider member pressing spring 180 and the first shift fork pressing spring 160(1) both acting on the first shift fork 130(1), and, thus, the lost-motion function to the reverse stage is provided by the difference between the biasing forces of both pressing springs 180, 160(1).

Accordingly, the size in the axial direction and the operational force can be smaller than those of conventional configurations in which the lost-motion function is attained by axially moving the fork shaft itself.

In this embodiment, the slider guide groove 144 is configured such that the slider member 170 is secured in the reference position when the drum member 140 is placed in the neutral position N, the slider member 170 is secured in the first displaced position when the drum member 140 is placed in the high speed position H, the slider member 170 is secured in the reference position when the drum member 140 is placed in the low speed position L, the slider member 170 is axially movable between the reference position and the second displaced position when the drum member 140 is placed in the reverse position R, and the slider member 170 is secured in the reference position when the drum member 140 is placed in the parking position P; however, the present invention is not limited to such a configuration.

For example, it is also possible to employ a slider guide groove 145 formed so as to secure the slider member 170 in a retreated position (e.g., the first displaced position) when the drum member 140 is placed in the high speed position H, and, on the other hand, allow the slider member 170 axially biased toward the second side by the slider member pressing spring 180 to axially move by following the axial movement of the first shift fork 130(1) while remaining in contact with the stopper part 133 when the drum member 140 is placed in positions other than the high speed position H.

Figure 12:
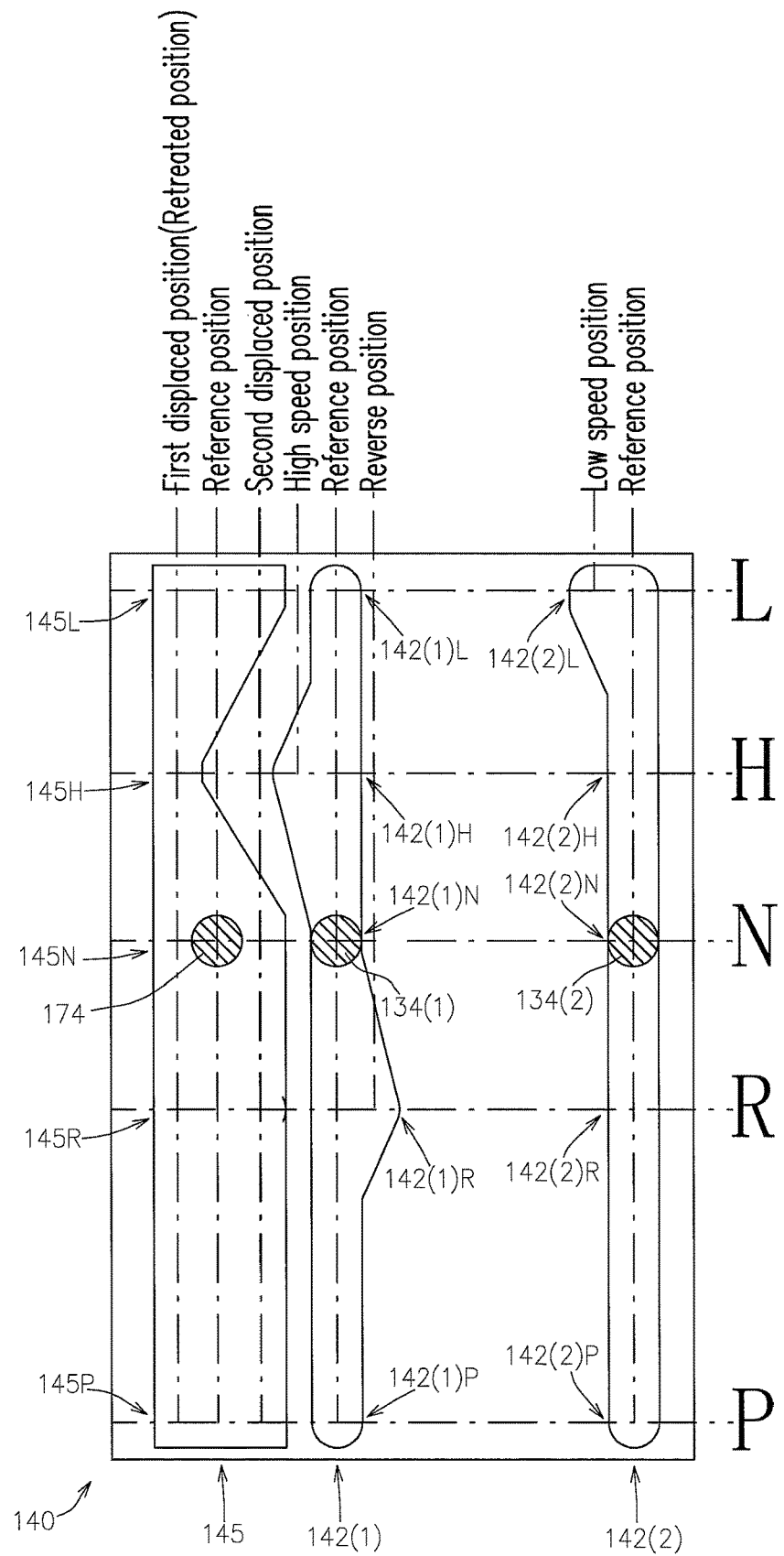
FIG. 12 is a development view of a modified example of the drum member shown in FIG. 5, and shows a state where the modified drum member is placed in a neutral position.

FIG. 12 shows a development view of the drum member 140 having one example of the slider guide groove 145.

In the example shown in FIG. 12, the slider guide groove 145 has such a groove shape that a high speed engagement part 145H secures the slider member 170 in a retreated position (e.g., the first displaced position), and others, i.e., a neutral engagement part 145N, a low speed engagement part 145L, a reverse engagement part 145R, and a parking engagement part 145P, allow the slider member 170 to axially move between the first displaced position and the second displaced position.

The shift-drum speed change operation mechanism 100A further includes a detent mechanism 700 for locking the drum member 140 in the aforementioned operational positions.

Figure 13:
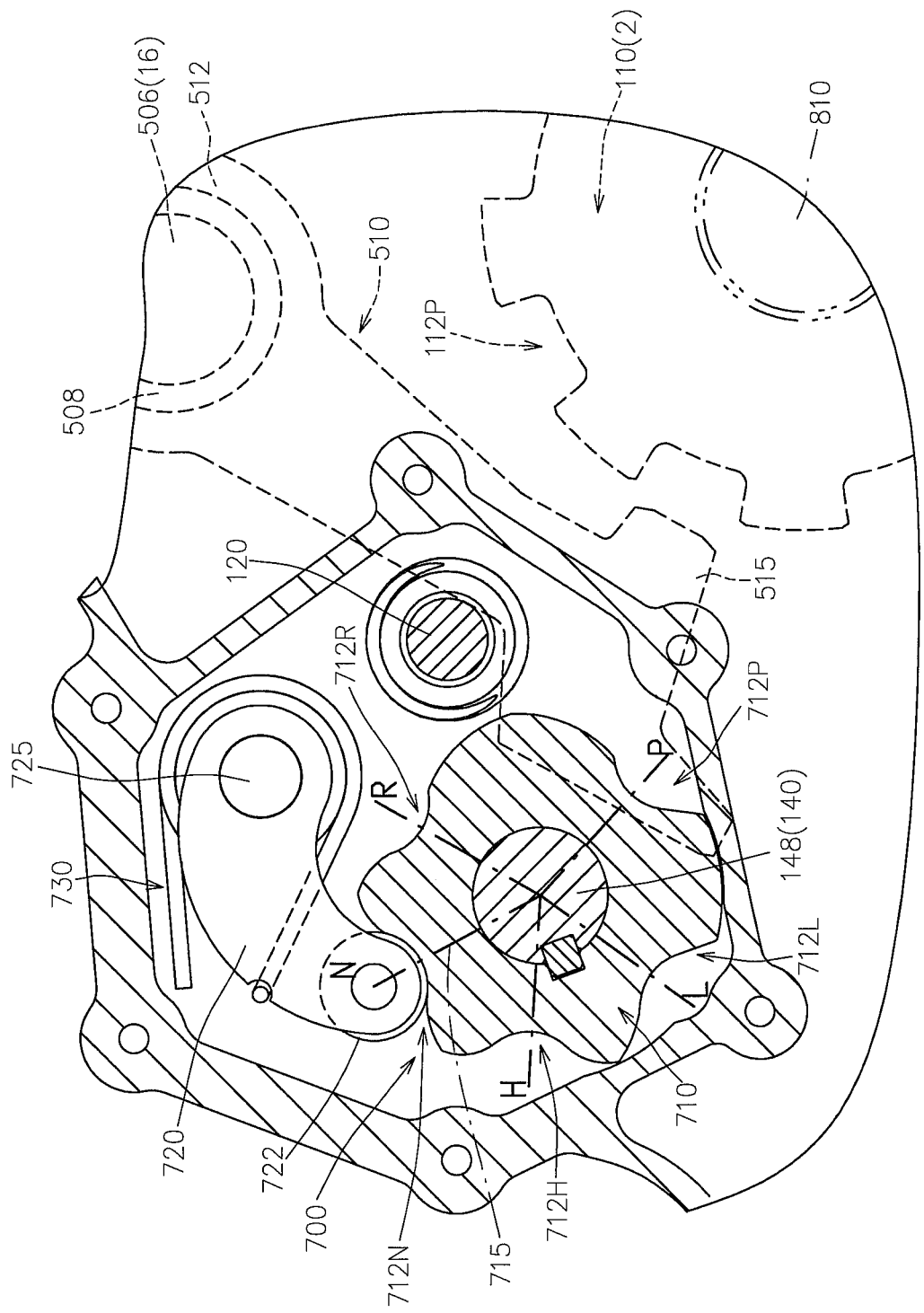
FIG. 13 is a cross-sectional view taken along the line XIII-XIII in FIG. 4.

FIG. 13 shows a cross-sectional view taken along the line XIII-XIII in FIG. 4.

As shown in FIGS. 4 and 13, the detent mechanism 700 has a detent plate 710 supported by the drum member 140 so as to be incapable of relative rotation, a detent arm 720 supported so as to be rotatable around a detent shaft 725 parallel to the drum member 140, and a detent spring 730.

The detent plate 710 has a plurality of detent depressions 712 that are open radially outward and correspond to the operational positions that the drum member 140 can take.

As described above, in this embodiment, the drum member 140 can take the neutral position N, the high speed position H when operated from the neutral position N toward one side around the axis, the low speed position L when operated from the high speed position H toward one side around the axis, the reverse position R when operated from the neutral position N toward the other side around the axis, and the parking position P when operated from the reverse position R toward the other side around the axis.

Accordingly, the plurality of detent depressions 712 include a neutral position depression 712N, a high speed position depression 712H, a low speed position depression 712L, a reverse position depression 712R, and a parking position depression 712P.

The plurality of detent depressions 712 are disposed in the circumferential direction such that a depression corresponding to the operational position of the drum member 140 is placed in a detent position 715 around the axis so as to face the free end of the detent arm 720.

FIG. 13 shows a state where the drum member 140 is placed in the neutral position N and, accordingly, the corresponding neutral position depression 712N is placed in the detent position 715.

Specifically, the neutral position depression 712N, the high speed position depression 712H, the low speed position depression 712L, the reverse position depression 712R, and the parking position depression 712P are each disposed so as to be placed in the detent position 715 when the drum member 140 is placed in the neutral position N, the high speed position H, the low speed position L, the reverse position R, and the parking position P.

Of the detent arm 720, the proximal end is supported by the detent shaft 725 so as to be rotatable, and the free end has an engagement part 722 that can be received by the detent depression 712 placed in the detent position 715.

In this embodiment, the free end of the detent arm 720 has a roller rotatable around the rotational axis parallel to the detent shaft 725, and the roller acts as the engagement part 722.

The detent spring 730 biases the detent arm 720 around the detent shaft 725 such that the engagement part 722 of the detent arm 720 is pressed toward the detent depression 712 placed in the detent position 715.

With the detent mechanism 700, it is possible to effectively prevent unintentional rotation of the drum member 140 from the operational position.

Below, the parking structure of the shift-drum speed change apparatus 1A will now be described.

Figure 14:
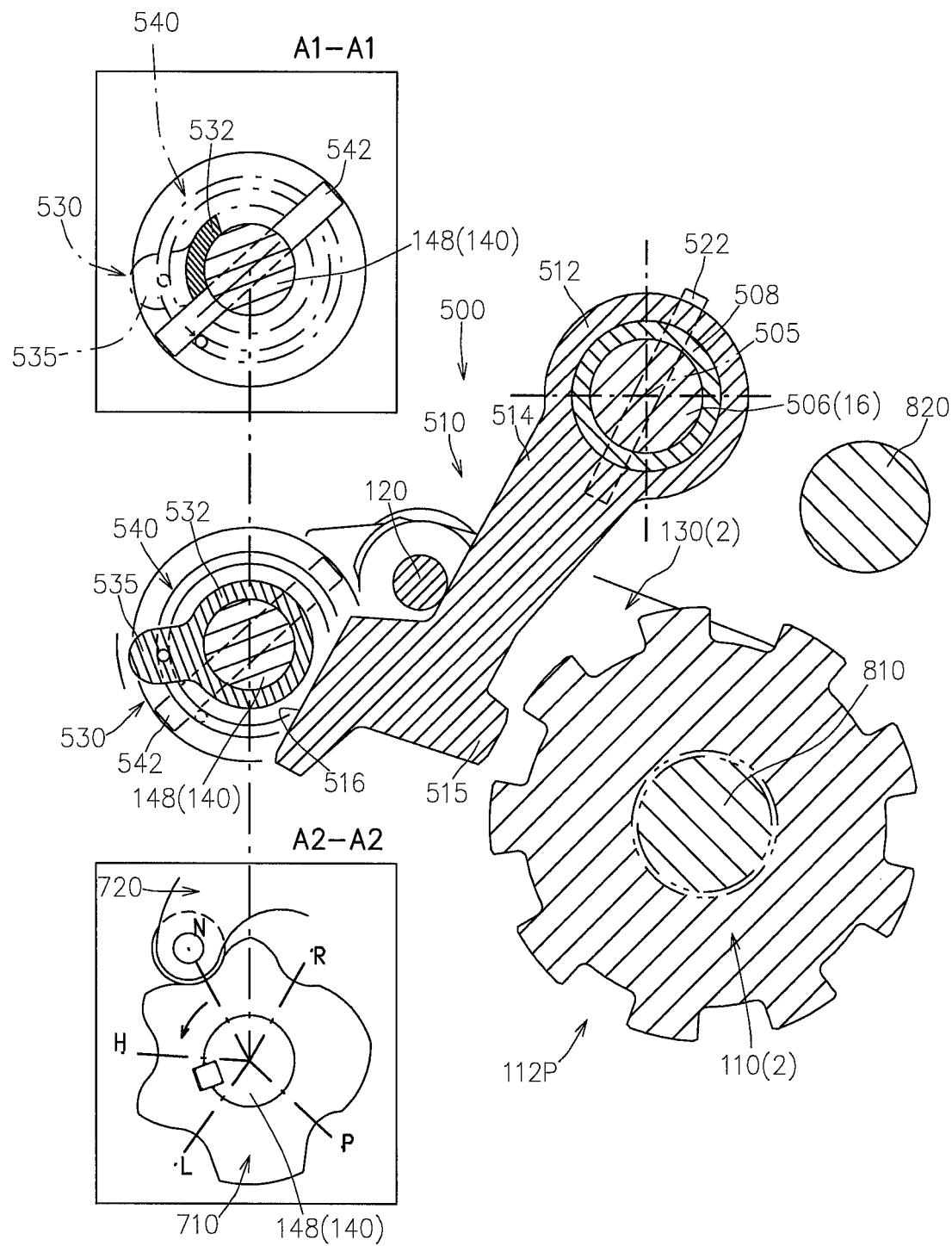
FIG. 14 is a cross-sectional view taken along the line XIV-XIV in FIG. 4, and shows a neutral state.

FIG. 14 shows a cross-sectional view taken along the line XIV-XIV in FIG. 4.

FIG. 14 also shows a diagram taken along the line A1-A1 and a diagram taken along the line A2-A2 in FIG. 4.

As shown in FIGS. 4 and 14, in the shift-drum speed change apparatus 1A, a parking depression and projection part 112P facing radially outward is provided on a shifter member (the second shifter member 110(2)) axially moved by a shift fork (the second shift fork 130(2)) and depression and projection-engaged with the corresponding speed change gear (the speed change gear 10 L) to thus bring the speed change gear into a power transmitting state.

In addition, the shift-drum speed change apparatus 1A includes a locking mechanism 500 for depression and projection engagement with the parking depression and projection part 112P to forcibly bring the shifter member (the second shifter member 130(2)) into a rotation suspended state.

Thus, the shift-drum speed change apparatus 1A is configured such that the shifter member (the second shifter member 110(2)) that enables and disables power transmission by the corresponding speed change gear (the speed change gear 10L) also serves as a parking gear, and it is thereby possible to reduce cost by reducing the number of components and reduce the size in the axial direction.

That is to say, conventionally, as a structure for attaining a parking stage in a shift-drum speed change apparatus that includes a speed change gear supported by a first power transmission rotating shaft so as to be relatively rotatable, a power transmission gear supported by a second power transmission rotating shaft so as to be incapable of relative rotation and meshed directly or indirectly with the speed change gear, a shifter member supported by the first power transmission rotating shaft so as to be incapable of relative rotation and so as to be axially movable, a drum member operated to rotate around the axis, a fork shaft parallel to the drum member, and a shift fork supported by the fork shaft so as to be axially movable, and that is configured such that the shift fork whose axial position is regulated by a fork guide groove formed in the drum member is axially moved in accordance with the rotation of the drum member to cause the shifter member to be depression and projection-engaged with the speed change gear and, thereby, power transmission is carried out between the first and second power transmission rotating shafts via the speed change gear and the power transmission gear, it is common practice to provide a parking gear, which is a component separate from the shifter member, on the first power transmission rotating shaft so as to be incapable of relative rotation and forcibly bring the parking gear into a rotation suspended state.

However, this conventional configuration requires that the parking gear, which is a component separate from the speed change gear and the shifter member, is provided on the first power transmission rotating shaft in a place axially displaced from the speed change gear and the shifter member, thus resulting in a large size in the axial direction.

On the other hand, the shift-drum speed change apparatus 1A according to the present embodiment does not require a parking gear that is a component separate from the shifter member (the second shifter member 110(2)), and, accordingly, it is possible to reduce the size of the apparatus in the axial direction and also reduce cost by reducing the number of components because no parking gear is required.

As shown in FIG. 14, the locking mechanism 500 has a parking operation arm 510 that is capable of swinging around a swing axis 505 parallel to the first power transmission rotating shaft 810 supporting the second shifter member 110(2) and that has at the free end an engagement part 515 capable of engagement with the parking depression and projection part 112P, a parking cancelling spring 520 (see FIG. 3) biasing the parking operation arm 510 in the parking cancelling direction around the swing axis 505, and a parking pressing member 530.

Around the swing axis 505, the parking operation arm 510 can take a parking position where the engagement part 515 is engaged with the parking depression and projection part 112P to forcibly bring the second shifter member 110(2) into a rotation suspended state and a parking cancelling position where the engagement part 515 is moved radially outward and away from the parking depression and projection part 112P.

The parking pressing member 530 presses the parking operation arm 510 toward the parking position against the biasing force of the parking cancelling spring 520 by utilizing the rotational movement of the drum member 140 around the axis to the parking position P.

In this embodiment, as shown in FIGS. 4 and 14, the parking pressing member 530 has a main body part 532 supported by the drum member 140 and a cam pressing part 535 extending radially outward from the main body part 532.

Figure 15:
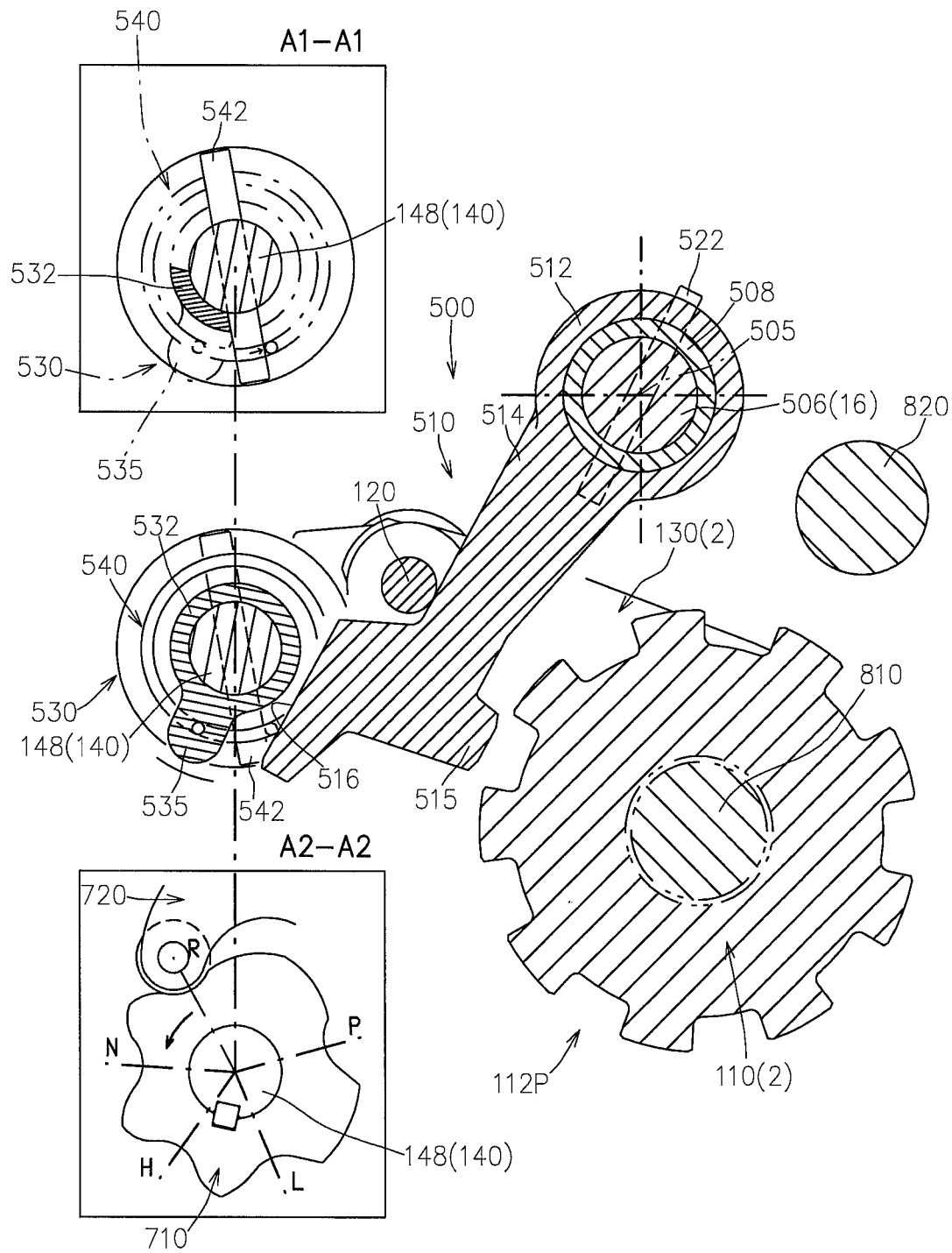
FIG. 15 is a cross-sectional view of the same cross-section as FIG. 14, and shows a rear stage engagement state.
Figure 16:
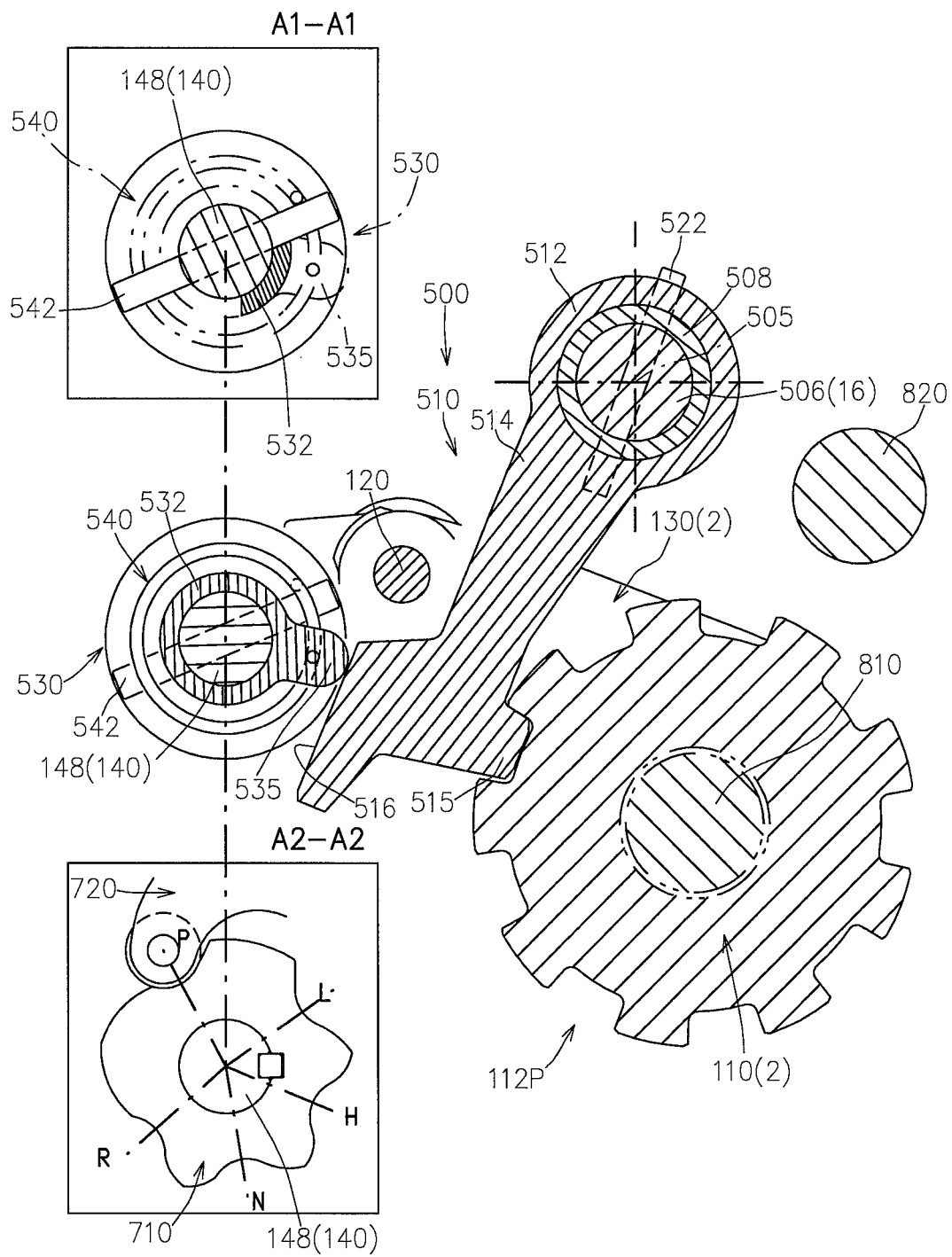
FIG. 16 is a cross-sectional view of the same cross-section as FIG. 14, and shows a parking stage engagement state.

FIGS. 15 and 16 are cross-sectional views of the same cross-section as FIG. 14, showing a state where the drum member 140 is placed in a speed change position (the reverse position R) and a state where the drum member 140 is placed in the parking position P, respectively.

Figure 17:
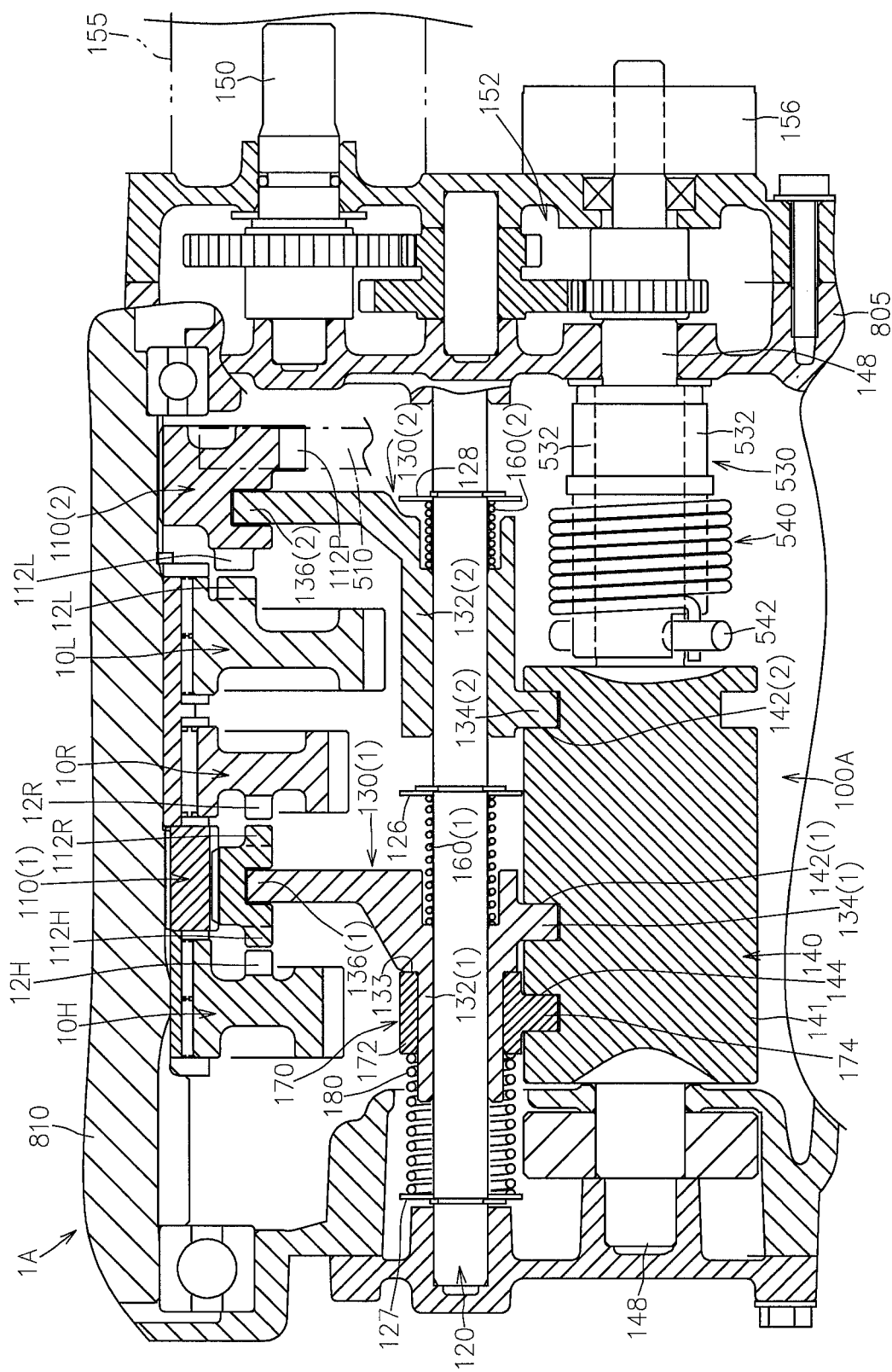
FIG. 17 is a cross-sectional view of the same cross-section as FIG. 4, and shows the parking stage engagement state.

FIG. 17 is a cross-sectional view of the same cross-section as FIG. 4, showing a parking stage engaged state.

Figure 18:
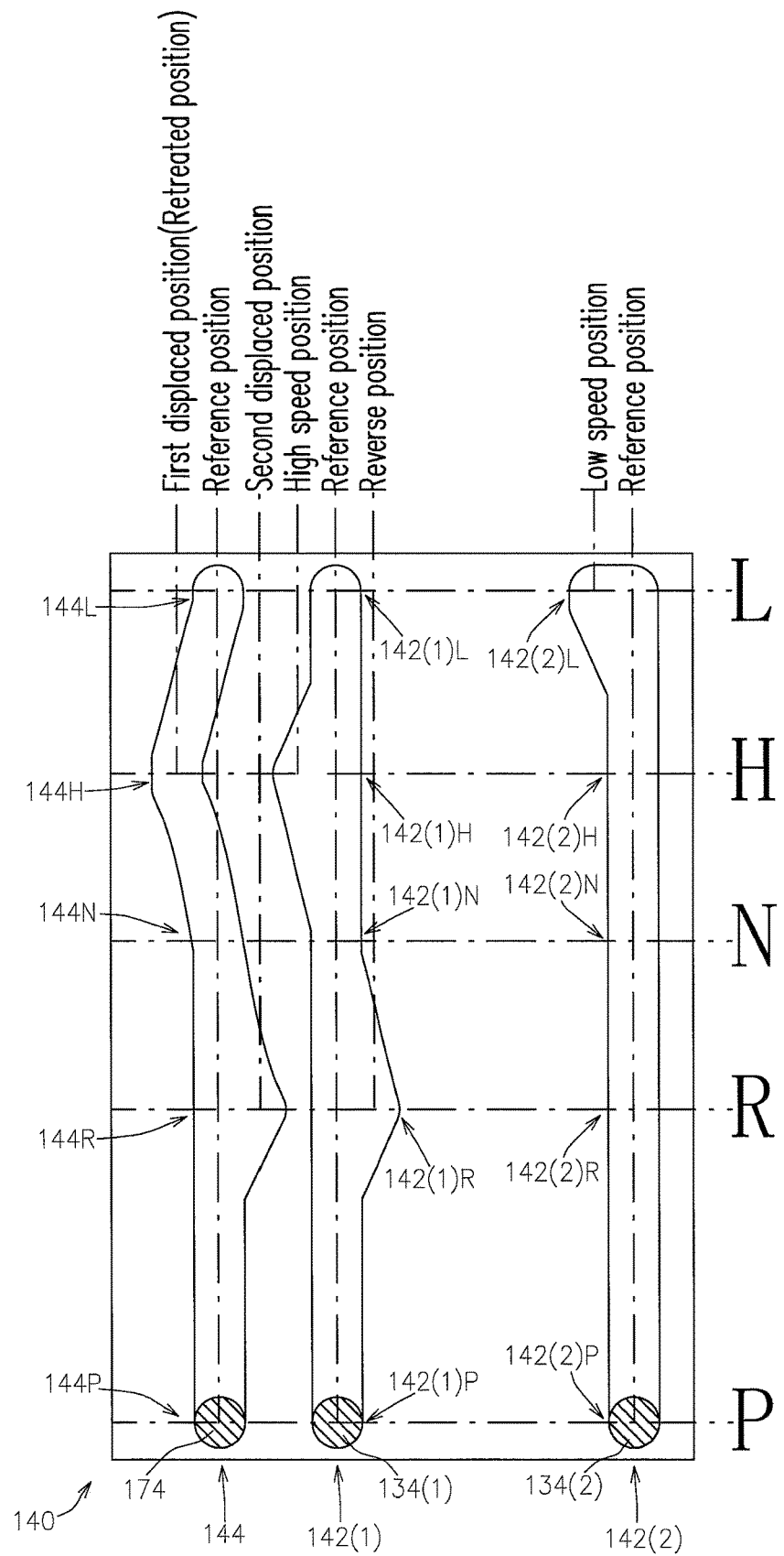
FIG. 18 is a development view of the drum member placed in a parking position.

Also, FIG. 18 is a development view showing a state where the drum member 140 is placed in the parking position P.

The cam pressing part 530 is configured not to act on the parking operation arm 510 when the drum member 140 is placed in the neutral position N and speed change positions (the reverse position R in the depicted embodiment) as shown in FIGS. 14 and 15, and is configured to press the parking operation arm 510 toward the parking position against the biasing force of the parking release spring 520 (see FIG. 3) by utilizing the rotational movement of the drum member 140 to the parking position P as shown in FIG. 16.

In this embodiment, as shown in FIGS. 3 and 14-16, the parking operation arm 510 has a boss part 512 fitted over a pivotal support shaft 506 defining the swing axis 505 so as to be relatively rotatable and an arm part 514 extending radially outward from the boss part 512. The engagement part 515 is provided on a side of the free end of the arm part 514 that faces the parking depression and projection part 112P, and a pressure receiving surface 516 for engagement with the cam pressing part 535 is provided on the opposite side of the arm part 514 from the parking depression and projection part 112P.

In FIGS. 3 and 14-16, reference number 508 is a bush for causing the boss part 512 to be relatively rotatable relative to the pivotal support shaft 506.

In this embodiment, as shown in FIG. 3, an idle shaft 16 supporting the reverse idle gear 15 constituting the reverse gear train is utilized as the pivotal support shaft 506 supporting the parking operation arm 510 so as to be swingable.

As shown in, for example, FIG. 3, the parking cancelling spring 520 is a coil spring fitted over the pivotal support shaft 506, with one end side being operatively connected to the parking operation arm 510 and the other end side being operatively connected to the pivotal support shaft 506 (via a pin 522 in this embodiment).

In this embodiment, as described above, the drum member 140 takes the reverse position R when rotated from the neutral position N toward the other side around the axis, and takes the parking position P when further rotated toward the other side around the axis from the reverse position R.

Accordingly, when the drum member 140 is placed in the neutral position N (FIG. 14) and the reverse position R (FIG. 16), the cam pressing part 535 is not engaged with the pressure receiving surface 516, and when the drum member 140 is rotated from the reverse position R toward the parking position P, the cam pressing part 535 is engaged with the pressure receiving surface 516 and presses the parking operation arm 510 toward the parking position against the biasing force of the parking cancelling spring 520.

Thus, in this embodiment, the parking pressing member 530 is supported by the drum member 140, and it is thereby possible to reduce the size of the locking mechanism 500 that presses the parking operation arm 510 toward the parking position by utilizing the rotation of the drum member 140 to the parking position P.

The shift-drum speed change apparatus 1 according to this embodiment further has the following configuration to execute the lost-motion function in the speed change movement to the parking stage.

That is to say, in this embodiment, the main body part 532 of the parking pressing member 530 is fitted over the drum member 140 so as to be relatively rotatable.

In addition, as shown in FIGS. 4 and 14-16, the parking pressing member 530 and the drum member 140 are connected via a parking coil spring 540 fitted over the drum member 140, with one end side being operatively connected to the parking pressing member 530 and the other end side being operatively connected to the drum member 140 (via a pin 542 in this embodiment).

The parking coil spring 540 is configured to connect the drum member 140 and the parking pressing member 530 so as to be incapable of relative rotation such that the parking pressing member 530 is integrally rotated in accordance with the rotation of the drum member 140 around the axis when the circumferential load on the cam pressing part 535 is equal to or less than a predetermined value, and, on the other hand, is configured to be elastically deformed so as to allow the drum member 140 to relatively rotate around the axis in advance relative to the parking pressing member 530 when the circumferential load on the cam pressing part 535 exceeds the predetermined value.

In this embodiment, the parking coil spring 540 is configured to be elastically deformed in the diameter reducing direction when the drum member 140 is relatively rotated in advance relative to the parking pressing member 530.

With such a configuration, it is possible to attain the lost-motion function in the speed change movement to the parking stage.

Figure 19:
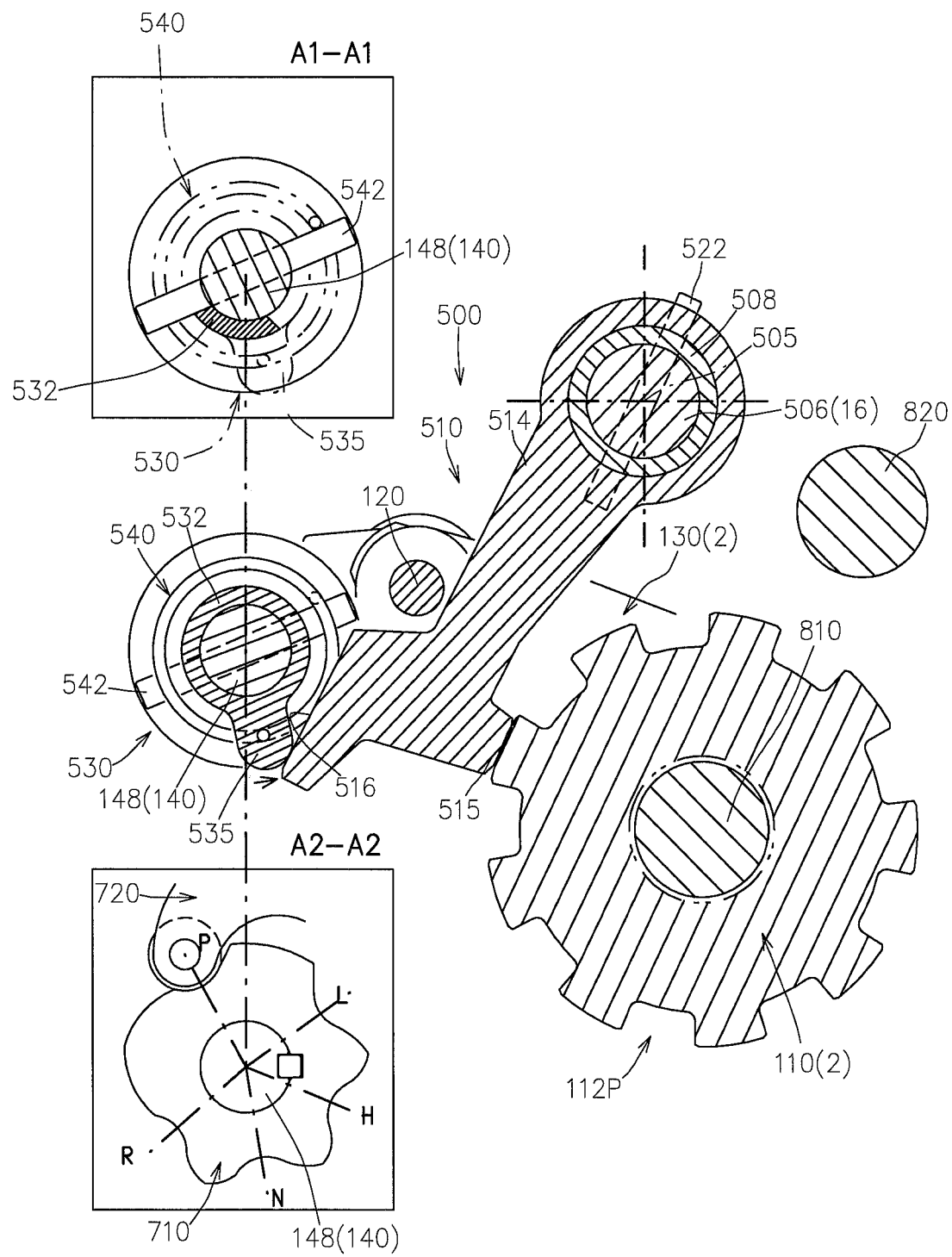
FIG. 19 is a cross-sectional view of the same cross-section as FIG. 14, and shows a lost-motion state in speed change movement to a parking stage.

That is to say, when the cam pressing part 535 swings the parking operation arm 510 toward the parking position in accordance with the rotation of the drum member 140 to the parking position P, a situation may arise where the engagement part 515 of the parking operation arm 510 abuts against the projection of the parking depression and projection part 112P of the second shifter member 110(2), and the parking operation arm 510 cannot swing to the parking position (See FIG. 19).

In this case, a circumferential load exceeding the predetermined value is applied to the cam pressing part 535.

Accordingly, as shown in FIG. 19, the drum member 140 is relatively rotated around the axis to the parking position P in advance relative to the parking pressing member 530 while elastically deforming the parking coil spring 540.

The elastically deformed parking coil spring 540 has an elastic force biasing the parking pressing member 530 in a direction in which the parking pressing member 530 follows the drum member 140, then the parking operation arm 510 swings to the parking position against the biasing force of the parking cancelling spring 520 by the elastic force when the engagement part 515 and the parking depression and projection part 112P are positionally adjusted, the engagement part 515 and the parking depression and projection part 112P are depression and projection-engaged with each other, and thus the speed change movement to the parking stage is completed (see FIG. 16).

In this embodiment, as shown in FIG. 16, when the cam pressing part 535 places the parking operation arm 510 in the parking position to bring the shift-drum speed change apparatus 1A into a parking stage engaged state, the direction of the reaction force acting on the cam pressing part 535 from the pressure receiving surface 516 is substantially opposite the direction in which the cam pressing part 535 extends radially outward in reference to the axis of the drum member 140 (hereinafter, this configuration is referred to as "blocking" by the cam pressing part 535).

With the "blocking" by the cam pressing part 535, it is possible to effectively prevent or reduce unintentional cancellation of the depression and projection engagement between the engagement part 515 of the parking operation arm 510 and the parking depression and projection part 112P.

Specifically, a case is assumed where the shift-drum speed change apparatus 1A is used in the travel-system power transmission path of a working vehicle, the working vehicle is on a slope, and the drum member 140 is placed in the parking position P to bring the shift-drum speed change apparatus 1A into a parking stage engaged state.

In such a situation, the gravitational force exerted on the working vehicle is inversely transmitted from the drive wheels to the first power transmission rotating shaft 810, and a rotational driving force around the axis acts on the first power transmission rotating shaft 810.

Generally, by forming the depressions of a depression and projection engagement structure (the depressions of the parking depression and projection part 112P in this embodiment) in a tapered shape in which the width decreases toward the center in the radial direction as viewed in a cross-sectional view, and by forming the projections (the engagement part 515 of the parking operation arm 510 in this embodiment) for insertion into the depressions in a tapered shape corresponding to the depressions as viewed in a cross-sectional view, it is possible to ensure "ease" of depression and projection engagement.

On the other hand, with the depressions of the parking depression and projection part 112P and the engagement part 515 being formed in a tapered cross-sectional shape, when the inverted driving force from the drive wheels is transmitted to the first power transmission rotating shaft 810, the inverted driving force acts as a force that causes the parking operation arm 510 to swing in the parking cancelling direction. Accordingly, a situation may arise where the parking operation arm 510 placed in the parking position unintentionally swings in the parking cancelling direction, and the depression and projection engagement between the parking operation arm 510 and the parking depression and projection part 112P is cancelled.

In this regard, with the "blocking" by the cam pressing part 535, it is possible to effectively prevent or reduce situations where the parking operation arm 510 unintentionally swings in the cancelling direction from the parking position.

Also, in this embodiment, as shown in, for example, FIGS. 14 and 15, in a state where the cam pressing part 535 is not engaged with the parking operation arm 510, i.e., the state where the drum member 140 is placed in operational positions from the low speed position L to the reverse position R, the fork shaft 120 is configured to be brought into contact with the parking operation arm 510 biased in the parking cancelling direction around the swing axis 505 by the parking cancelling spring 520 to define the extent of swinging movement of the parking operation arm 510 in the parking cancelling direction.

With this configuration, in a situation where the drum member 140 is placed in operational positions between the low speed position L and the reverse position R, it is possible to effectively prevent without additional components the parking operation arm 510 biased in the parking cancelling direction by the parking cancelling spring 520 from being pressed against the parking pressing member 530 so that the biasing force of the parking cancelling spring 520 affects the operation of the drum member 140 around the axis.

Preferably, it is possible to provide a parking cancelling structure for smoothly carrying out the cancelling movement from the parking stage.

Figure 20:
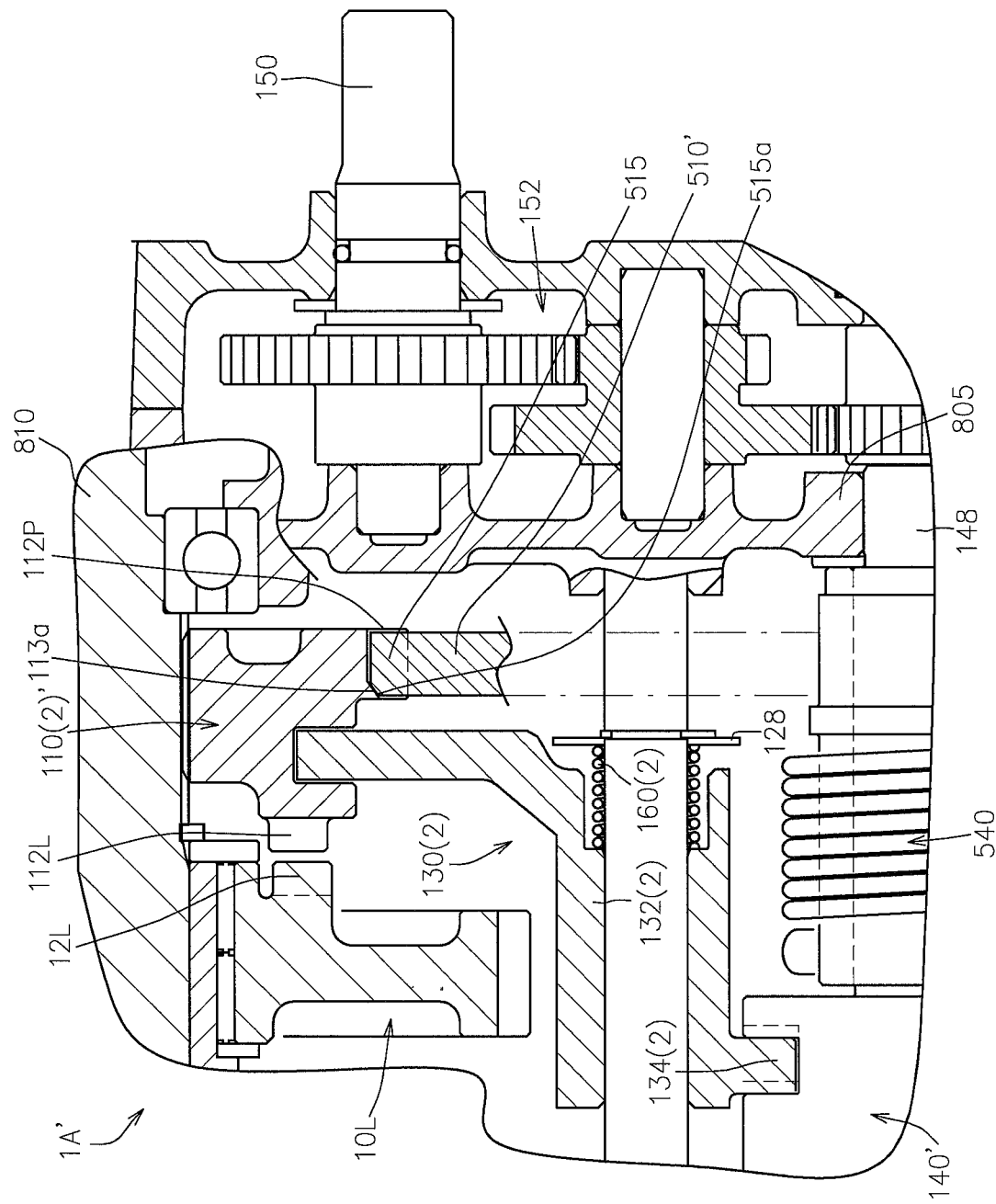
FIG. 20 is a partial cross-sectional view of a shift-drum speed change apparatus according to a modification of the first embodiment, and shows a cross section corresponding to the cross section shown in FIG. 4.

FIG. 20 shows a partial cross-sectional view of a shift-drum speed change apparatus 1A' having a parking cancelling mechanism according to a modification of the above embodiment.

In the drawing, the same components as those in the above embodiment are given the same reference numbers.

Compared with the shift-drum speed change apparatus 1A according to the above embodiment, the shift-drum speed change apparatus 1A' has a drum member 140', a second shifter member 110(2)', and a parking operation arm 510' in place of the drum member 140, the second shifter member 110(2), and the parking operation arm 510.

Figure 21:
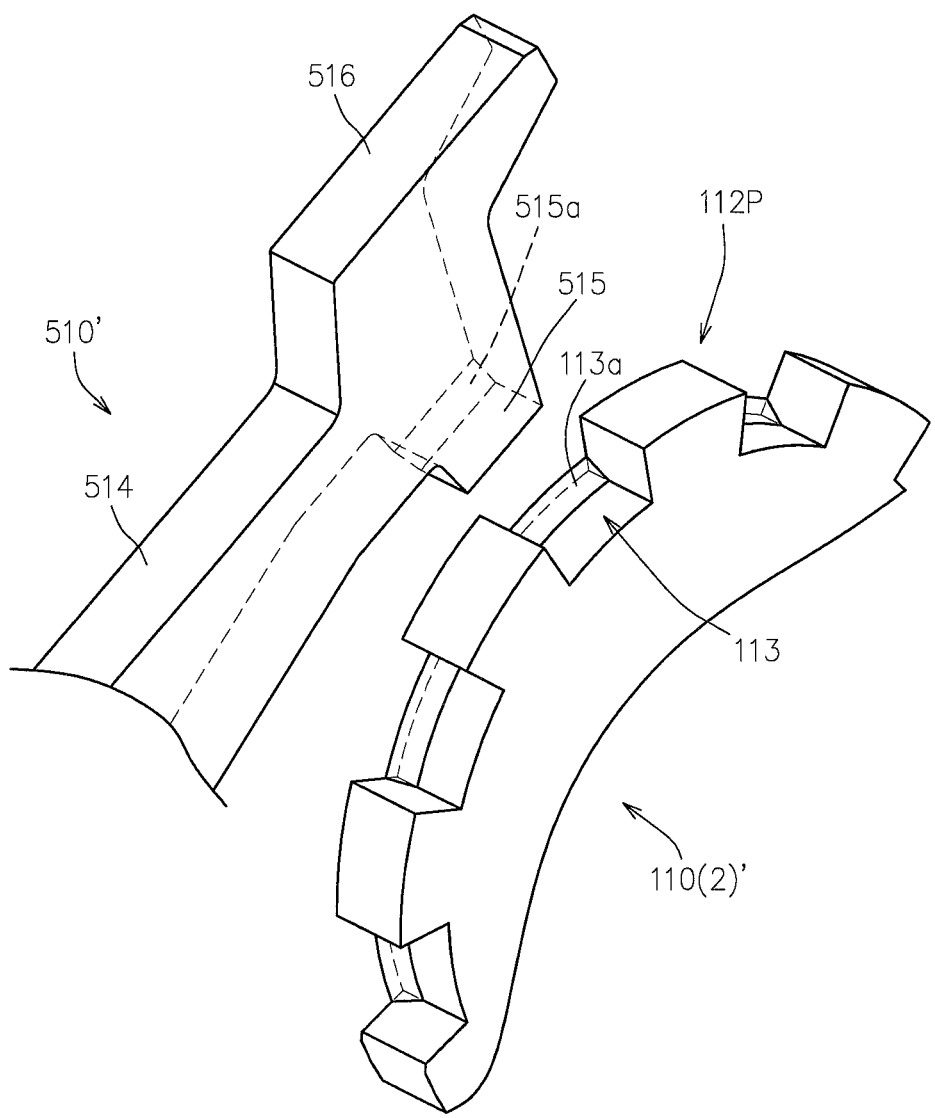
FIG. 21 is a partial perspective view of a parking operation arm and a second shifter member in the shift-drum speed change apparatus shown in FIG. 20.

FIG. 21 shows a partial perspective view of the parking operation arm 510' and the second shifter member 110(2)'.

Figure 22:
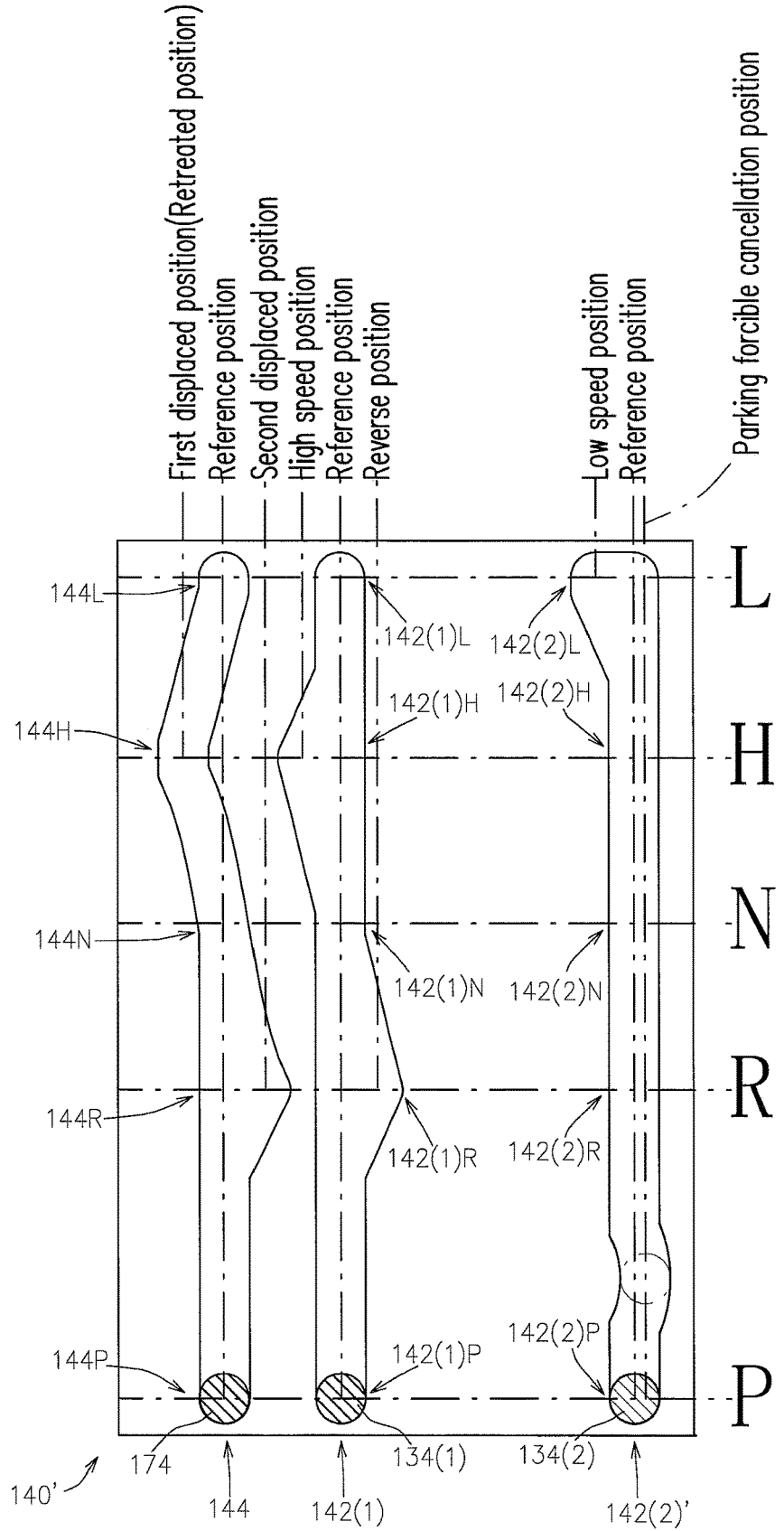
FIG. 22 is a development view of a drum member in the shift-drum speed change apparatus shown in FIG. 20, and shows a state where the drum member is placed in a parking position.

FIG. 22 is a development view showing a state where the drum member 140' is placed in the parking position P.

The second shift fork 130(2) and the second shifter member 110(2)' with respect to axial positions are capable of taking a low speed position where the low speed depression and projection part 112L of the second shifter member 110(2)' and the speed change depression and projection part 12L of the speed change gear 10L are depression and projection-engaged, a reference position where the engagement of the low speed depression and projection part 112L with the speed change depression and projection part 12L is cancelled (see FIG. 20) and, in addition, a parking forcible cancellation position displaced from the reference position toward the side opposite the low speed position.

The second shifter member 110(2)' is different from the second shifter member 110(2) in that a depression 113 of the parking depression and projection part 112P has a pressing-side cam inclined surface 113*a*.

Specifically, as shown in FIGS. 20 and 21, the pressing-side cam inclined surface 113*a* is provided at the end of the depression 113 of the parking depression and projection part 112P on one side in the axial direction toward the speed change gear 10L, and is an inclined surface that descends radially inward in reference to the center of the second shifter member 110(2)' (the center of rotation of a rotating shaft (the first power transmission rotating shaft 810) supporting the second shifter member 110(2)') from one side toward the other side in the axial direction.

The parking operation arm 510' is different from the parking operation arm 510 in that the engagement part 515 for engagement with the depression 113 has a follower-side cam inclined surface 515*a*.

As shown in FIGS. 20 and 21, the follower-side cam inclined surface 515*a* is provided at the end of the engagement part 515 on one side in the axial direction and is an inclined surface corresponding to the cam inclined surface 113*a*.

The pressing-side cam inclined surface 113*a* and the follower-side cam inclined surface 515*a* are disposed so as to be brought into contact with each other when the second shifter member 110(2)' is placed in the reference position via the second shift fork 130(2), and the parking operation arm 510' is placed in the parking position around the swing axis 505 via the parking pressing member 530, in accordance with the operation of the drum member 140' to the parking position P.

Accordingly, when the second shifter member 110(2)' is moved from the reference position to the parking forcibly cancelling position, the pressing-side cam inclined surface 113*a* presses the follower-side cam inclined surface 515*a*, and the engagement part 515 of the parking operation arm 510' is pressed radially outward in reference to the center of the second shifter member 110(2)' (the center of rotation of the first power transmission rotating shaft 810).

The drum member 140' is different from the drum member 140 in that the second fork guide groove 142(2) is changed to the second fork guide groove 142(2)'.

As shown in FIG. 22, the second fork guide groove 142(2)' has a parking forcibly cancelling part 143 between a parking engagement part 142(2)P for engagement with the corresponding engagement pin part (the second engagement pin part 134(2)) when the drum member 140' is placed in the parking position P and a part (a reverse engagement part 142(2)R) for engagement with the engagement pin part (the second engagement pin part 134(2)) when the drum member 140' is placed in another operational position (the reverse position R in this modification and in the above embodiment) adjacent to the parking position P.

The parking forcibly cancelling part 143 has a groove shape guiding the engagement pin part (the second engagement pin part 134(2)) such that the second shift fork 130(2)

moves from the reference position back to the reference position via the parking forcibly cancelling position during the course of operation of the drum member 140' from the parking position P toward an operation position (the reverse position R) adjacent to the parking position P.

According to the shift-drum speed change apparatus 1A' having such a configuration, it is possible to smoothly carry out the parking cancelling operation even when there is "torque containment" between the engagement part 515 of the parking operation arm 510' and the parking depression and projection part 112P of the second shifter member 110(2)' during the parking stage engaged state.

That is to say, as with the parking operation arm 510, the parking operation arm 510' is always biased in the parking cancelling direction by the parking cancelling spring 520 (see FIG. 3).

Accordingly, in theory, when the drum member 140' is operated from the parking position P, and the cam pressing part 535 of the parking pressing member 530 is moved away from the pressure receiving surface 516 of the parking operation arm 510', the parking operation arm 510' as with the parking operation arm 510 swings around the swing axis 505 such that the engagement part 515 is moved away from the parking depression and projection part 112P by the biasing force of the parking cancelling spring 520 (see FIGS. 14 and 15).

However, there may be "torque containment" involving a greater force than the biasing force of the parking cancelling spring 520 between the engagement part 515 of the parking operation arm 510' and the parking depression and projection part 112P of the second shifter member 110(2)'.

In this case, even when the drum member 140' is operated from the parking position P to another operational position, the engagement part 515 of the parking operation arm 510' remains engaged with the parking depression and projection part 112P of the second shifter member 110(2)'.

In this state, the first power transmission rotating shaft 810 is forcibly brought into a rotation suspended state by the locking mechanism 500 while rotary power is transmitted to the first power transmission rotating shaft 810 via any of the speed change gears.

Regarding this point, according to the modification 1A', when a cancelling operation is performed on the drum member 140' from the parking position P, the second shift fork 130(2) and the second shifter member 110(2)' are moved from the reference position to the parking forcibly cancelling position by the parking forcibly cancelling part 143.

Then, due to the movement of the second shifter member 110(2)' to the parking forcibly cancelling position, the parking operation arm 510 is forcibly swung in the parking cancelling direction via the pressing-side cam inclined surface 113a and the follower-side cam inclined surface 515a.

Accordingly, even when there is "torque containment" between the engagement part 515 of the parking operation arm 510' and the parking depression and projection part 112P of the second shifter member 110(2)', it is possible to smoothly carry out the parking cancelling operation in accordance with the operation of the drum member 140' from the parking position P to another operational position.

The locking mechanism 500, which includes the parking pressing member 530 supported by the drum member 140, the parking operation arm 510 capable of swinging around the swing axis 505 parallel to the first power transmission rotating shaft 810 and having the engagement part 515 at the free end, and the parking cancelling spring 520 biasing the parking operation arm 510 in the cancelling direction around the swing axis 505 and which provides a parking stage engaged state by swinging the parking operation arm 510 with the use of the parking pressing member 530 by utilizing the rotational movement of the drum member 140 to the parking position P, is applicable to not only an embodiment where the depression and projection part 112P is provided on a shifter member (the second shifter member 110(2)) but also an embodiment where a dedicated parking gear 10P that is a component separate from a shifter member (the second shifter member 110(2)) is provided on the first power transmission rotating shaft 510.

Figure 23:
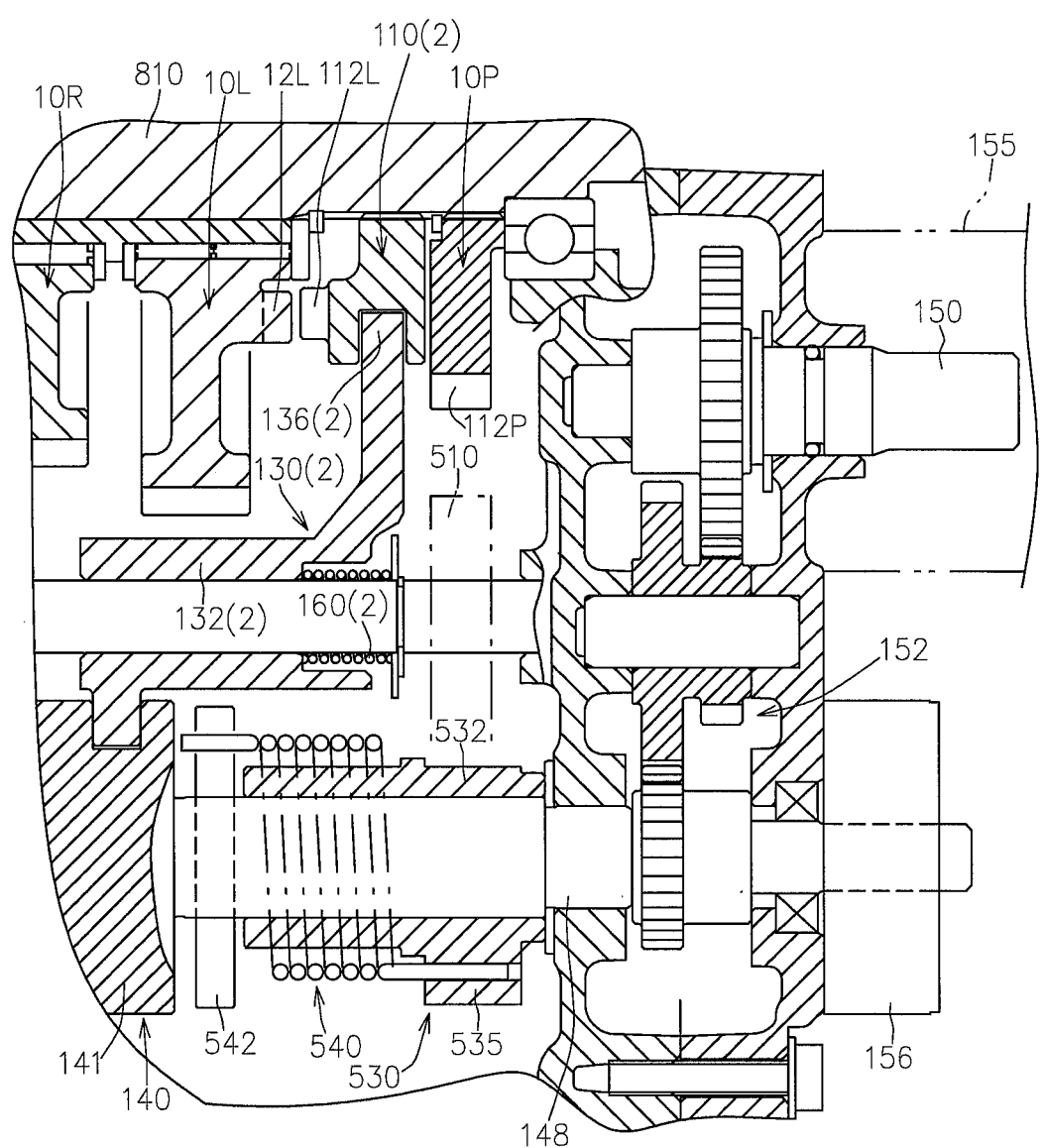
FIG. 23 is a cross-sectional view of a shift-drum speed change apparatus according to another modification of the first embodiment, and shows a cross section corresponding to the cross section shown in FIG. 4.

FIG. 23 is a cross-sectional view showing a modification wherein the locking mechanism 500 is applied to a configuration involving the parking gear 10P that is a component separate from a shifter member (the second shifter member 110(2)).

Second Embodiment

Below, another embodiment of the present invention will now be described with reference to the attached drawings.

Figure 24:
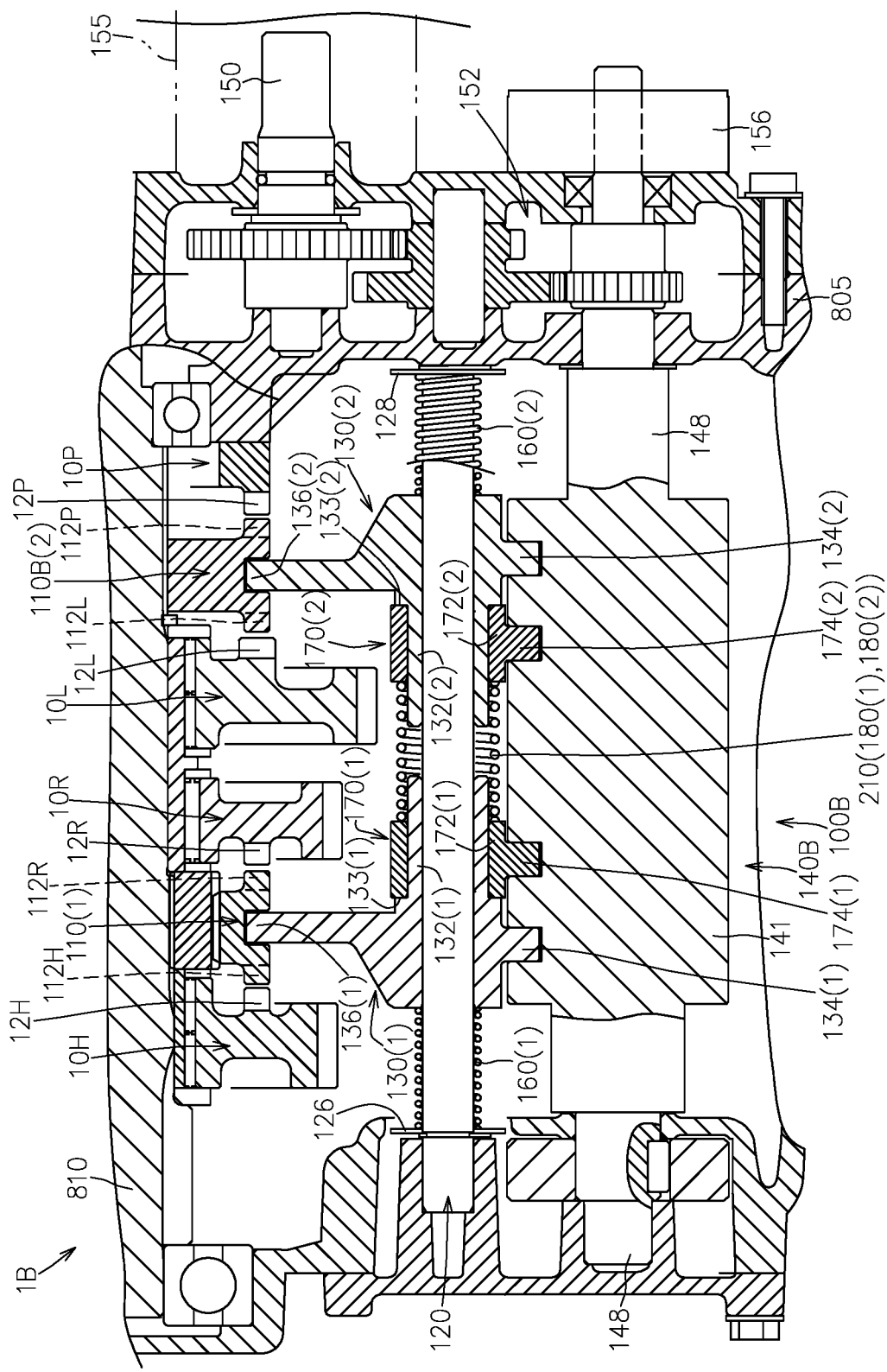
FIG. 24 is a cross-sectional view of a shift-drum speed change apparatus according to a second embodiment of the present invention, and shows a neutral state.

FIG. 24 shows a cross-sectional view of a shift-drum speed change apparatus 1B according to this embodiment, which corresponds to FIG. 4 of the first embodiment.

In the drawing, the same components as those in the first embodiment are given the same reference numbers, and detailed descriptions thereof are omitted as appropriate.

The shift-drum speed change apparatus 1B according to this embodiment is different from the shift-drum speed change apparatus 1A according to the first embodiment in including a shift-drum speed change operation mechanism 100B in place of the shift-drum speed change operation mechanism 100A.

As shown in FIG. 24, the shift-drum speed change operation mechanism 100B includes the first shifter member 110(1), a second shifter member 110B(2), the fork shaft 120, the first shift fork 130(1), the second shift fork 130(2), and a drum member 140B.

The first shifter member 110(1) is supported by the first power transmission rotating shaft 810 so as to be incapable of relative rotation and so as to be axially movable between the speed change gear 10H and the speed change gear 10R and is axially moved by the first shift fork 130(1).

The first shifter member 110(1) has the high-speed depression and projection part 112H capable of depression and projection engagement with the speed change depression and projection part 12H of the speed change gear 10H on the end face on one side in the axial direction where the end face faces the speed change gear 10H, and the reverse depression and projection part 112R capable of depression and projection engagement with the speed change depression and projection part 12R of the speed change gear 10R on the end face on the other side in the axial direction where the end face faces the speed change gear 10R.

With respect to the axial direction, the first shifter member 110(1) and the first shift fork 130(1) are capable of taking a reference position (see FIG. 24) where the first shifter member 110(1) is not depression and projection-engaged with any of the speed change gear 10H and the speed change gear 10R, a high speed position where the first shifter member 110(1) is depression and projection-engaged with the speed change gear 10H, and a reverse position where the first shifter member 110(1) is depression and projection-engaged with the speed change gear 10R.

In the shift-drum speed change apparatus 1B according to this embodiment, the speed change gear 10 has a parking gear for forming a parking stage (the speed change gear 10P)

in addition to the speed change gear 10H, the speed change gear 10L, and the speed change gear 10R.

The parking gear (the speed change gear 10P) is secured by a securing member such as the transmission case 805 so as to be incapable of rotation.

That is to say, in this embodiment, the parking gear (the speed change gear 10P) is a component separate from the shifter member.

In such a configuration, the second shifter member 110B(2) is supported by the first power transmission rotating shaft 810 so as to be incapable of relative rotation and so as to be axially movable between the speed change gear 10L and the speed change gear 10P and is axially moved by the second shift fork 130(2).

The second shifter member 110B(2) has the low speed depression and projection part 112L capable of depression and projection engagement with the speed change depression and projection part 12L of the speed change gear 10L on the end face on one side in the axial direction where the end face faces the speed change gear 10L, and the parking depression and projection part 112P capable of depression and projection engagement with the speed change depression and projection part 12P of the speed change gear 10P on the end face on the other side in the axial direction where the end face faces the speed change gear 10P.

With respect to the axial direction, the second shifter member 110B(2) and the second shift fork 130(2) are capable of taking a reference position (see FIG. 24) where the second shifter member 110B(2) is not depression and projection-engaged with any of the speed change gear 10L and the speed change gear 10P, a low speed position where the second shifter member 110B(2) is depression and projection-engaged with the speed change gear 10L, and a parking position where the second shifter member 110B(2) is depression and projection-engaged with the speed change gear 10P.

As shown in FIG. 24, the shift-drum speed change operation mechanism 100B further includes the first shift fork pressing spring 160(1) pressing the first boss part 132(1) of the first shift fork 130(1) toward the second side in the axial direction, the second shift fork pressing spring 160(2) pressing the second boss part 132(2) of the second shift fork 130(2) toward the first side in the axial direction, the first slider member 170(1) supported by the first boss part 132(1) so as to be axially movable, with the moving end toward the first side in the axial direction being defined by the first stopper part 133(1) provided on the first boss part 132(1), the second slider member 170(2) supported by the second boss part 132(2) so as to be axially movable, with the moving end toward the second side in the axial direction being defined by the second stopper part 133(2) provided on the second boss part 132(2), the first slider member pressing spring 180(1) pressing the first slider member 170(1) toward the first side in the axial direction, and the second slider member pressing spring 180(2) pressing the second slider member 170(2) toward the second side in the axial direction.

The axial position of the first slider member 170(1) is regulated by a first slider guide groove 144B(1) provided in the drum member 140B.

That is to say, the first slider member 170(1) has a first slider main body 172(1) fitted over the first boss part 132(1) so as to be axially movable and a first slider engagement pin part 174(1) received by the first slider guide groove 144B(1) of the drum member 140B.

The axial position of the second slider member 170(2) is regulated by a second slider guide groove 144B(2) provided in the drum member 140B.

That is to say, the second slider member 170(2) has a second slider main body 172(2) fitted over the second boss part 132(2) so as to be axially movable and a second slider engagement pin part 174(2) received by the second slider guide groove 144B(2) of the drum member 140B.

The first slider member pressing spring 180(1) has a greater biasing force than the first shift fork pressing spring 160(1).

The second slider member pressing spring 180(2) has a greater biasing force than the second shift fork pressing spring 160(2).

As shown in FIG. 24, in this embodiment, the first and second slider member pressing springs 180(1), 180(2) are formed of a single spring 210, one end side of which is engaged with the first slider member 170(1) and the other end side of which is engaged with the second slider member 170(2).

Here, the guide grooves formed in the drum member 140B will now be described.

Figure 25:
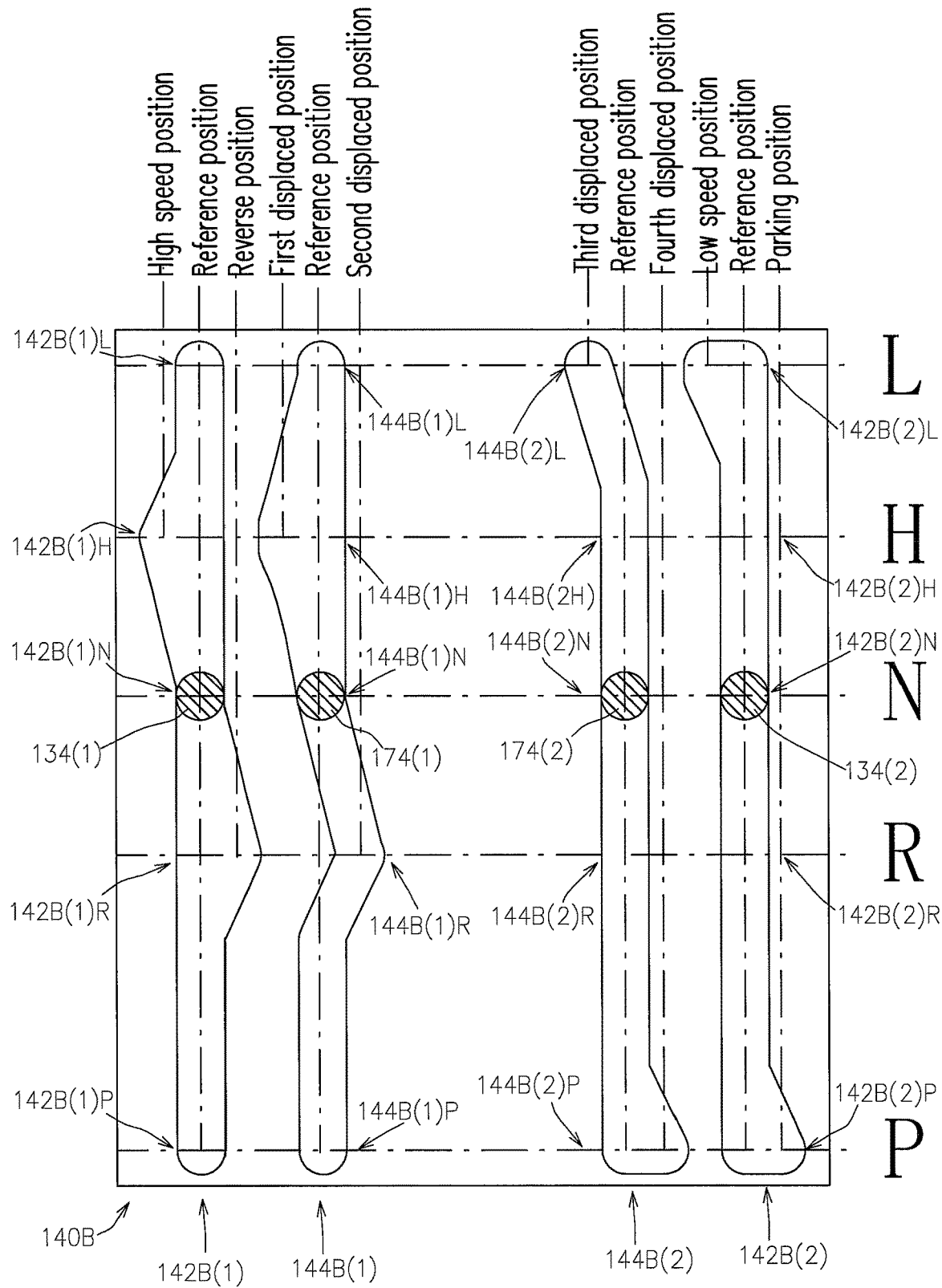
FIG. 25 is a development view of a drum member provided in the shift-drum speed change apparatus according to the second embodiment, and shows a state in which the drum member is placed in a neutral position.

FIG. 25 shows a development view of the drum member 140B.

As shown in FIG. 25, the drum member 140B has a first fork guide groove 142B(1) receiving the first engagement pin part 134(1) of the first shift fork 130(1), a second fork guide groove 142B(2) receiving the second engagement pin part 134(2) of the second shift fork 130(2), the first slider guide groove 144B(1) receiving the first slider engagement pin part 174(1) of the first slider member 170(1), and the second slider guide groove 144B(2) receiving the second slider engagement pin part 174(2) of the second slider member 170(2).

First, the groove shape of the first fork guide groove 142B(1) will now be described.

As shown in FIG. 25, a neutral engagement part 142B(1)N of the first fork guide groove 142B(1) has a groove shape holding the first engagement pin part 134(1) so as to secure the first shift fork 130(1) in the reference position.

The high speed engagement part 142B(1)H has a groove shape guiding the first engagement pin part 134(1) such that the moving end of the first shift fork 130(1) toward the first side in the axial direction is in the high speed position, and the moving end toward the second side in the axial direction is in the reference position.

The transitional part located between the neutral engagement part 142B(1)N and the high speed engagement part 142B(1)H has such a groove shape that the moving end of the first shift fork 130(1) toward the second side in the axial direction is secured in the reference position, and the moving end of the first shift fork 130(1) toward the first side in the axial direction is shifted from the reference position to the high speed position in accordance with the rotation of the drum member 140B from the neutral position N to the high speed position H.

The low speed engagement part 142B(1)L has a groove shape holding the first engaging pin part 134(1) so as to secure the first shift fork 130(1) in the reference position.

The transitional part between the high speed engagement part 142B(1)H and the low speed engagement part 142B(1)L has such a groove shape that the moving end of the first shift fork 130(1) toward the second side in the axial direction is secured in the reference position, and the moving end of the first shift fork 130(1) toward the first side in the axial direction is shifted from the high speed position to the reference position in accordance with the rotation of the drum member 140B(1) from the high speed position H to the low speed position L.

The reverse engagement part 142B(1)R has a groove shape guiding the first engagement pin part 134(1) such that the moving end of the first shift fork 130(1) toward the first side in the axial direction is in the reference position, and the moving end toward the second side in the axial direction is in the reverse position.

The transitional part located between the neutral engagement part 142B(1)N and the reverse engagement part 142B(1)R has such a groove shape that the moving end of the first shift fork 130(1) toward the first side in the axial direction is secured in the reference position, and the moving end of the first shift fork 130(1) toward the second side in the axial direction is shifted from the reference position to the reverse position in accordance with the rotation of the drum member 140B from the neutral position N to the reverse position R.

The parking engagement part 142B(1)P has a groove shape holding the first engaging pin part 134(1) so as to secure the first shift fork 130(1) in the reference position.

The transitional part between the reverse engagement part 142B(1)R and the parking engagement part 142B(1)P has such a groove shape that the moving end of the first shift fork 130(1) toward the first side in the axial direction is secured in the reference position, and the moving end of the first shift fork 130(1) toward the second side in the axial direction is shifted from the reverse position to the reference position in accordance with the rotation of the drum member 140B from the reverse position R to the parking position P.

Next, the groove shape of the first slider guide groove 144B(1) will now be described.

A high speed engagement part 144B(1)H of the first slider guide groove 144B(1) defines the axially movable range of the first slider member 170(1) such that the first shift fork 130(1) can axially move between the reference position and the first speed change position as regulated by the first fork guide groove 142B(1), with the first slider member 170(1) pressing the first shift fork 130(1) toward the first side in the axial direction.

Specifically, the axial positions of the first slider member 170(1) placed when the first shift fork 130(1) is placed in the reference position, the high speed position, and the reverse position, with the first slider member 170(1) remaining in contact with the first stopper part 133(1), are referred to as a reference position, a first displaced position, and a second displaced position, respectively.

In this embodiment, as shown in FIG. 25, the high speed engagement part 144B(1)H of the first slider guide groove 144B(1) guides the first slider member 170(1) such that the first slider member 170(1) is movable between the reference position and the first displaced position.

A reverse engagement part 144B(1)R secures the first slider member 170(1) in a retreated position that does not limit the range of axial movement of the first shift fork 130(1) permitted by the reverse engagement part 142B(1)R of the first shift fork guide groove 142B(1) when the drum member 140B is placed in the reverse position R.

In this embodiment, as shown in FIG. 25, a reverse engagement part 144B(1)R of the first slider guide groove 144B(1) is configured to secure the first slider member 170(1) in the second displaced position.

That is to say, in this embodiment, the first slider guide groove 144B(1) is configured to secure the first slider member 170(1) in the second displaced position as the retreated position when the drum member 140B is placed in the high speed position.

In this embodiment, the slider guide groove 144B(1) further has the following groove shape.

That is to say, as shown in FIG. 25, a neutral engagement part 144B(1)N has a groove shape holding the first slider engagement pin part 174(1) so as to secure the first slider member 170(1) in the reference position.

The transitional part between the neutral engagement part 144B(1)N and the high speed engagement part 144B(1)H has such a groove shape that the moving end of the first slider member 170(1) toward the second side in the axial direction is secured in the reference position, and the moving end of the first slider member 170(1) toward the first side in the axial direction is shifted from the reference position to the first displaced position in accordance with the rotation of the drum member 140B from the neutral position N to the high speed position H.

The low speed engagement part 144B(1)L has a groove shape holding the first slider engagement pin part 174(1) so as to secure the first slider member 170(1) in the reference position.

The transitional part between the high speed engagement part 144B(1)H and the low speed engagement part 144B(1)L has such a groove shape that the moving end of the first slider member 170(1) toward the second side in the axial direction is secured in the reference position, and the moving end of the first slider member 170(1) toward the first side in the axial direction is shifted from the first displaced position to the reference position in accordance with the rotation of the drum member 140B from the high speed position H to the low speed position L.

The transitional part between the neutral engagement part 144B(1)N and the reverse engagement part 144B(1)R has such a groove shape that the first slider member 170(1) is guided from the reference position to the second displaced position in accordance with the rotation of the drum member 140B from the neutral position N to the reverse position R.

The parking engagement part 144B(1)P has a groove shape holding the slider engagement pin part 174(1) so as to secure the first slider member 170(1) in the reference position.

The transitional part between the reverse engagement part 144B(1)R and the parking engagement part 144B(1)P has such a groove shape that the first slider member 170(1) is guided from the second displaced position to the reference position in accordance with the rotation of the drum member 140B from the reverse position R to the parking position P.

Next, the groove shape of the second fork guide groove 142B(2) will now be described.

The second fork guide groove 142B(2) has a groove shape allowing the second shift fork 130(2) to axially move between the reference position and the low speed position when the drum member 140B is placed in the low speed position L, allowing the second shift fork 130(2) to axially move between the reference position and the parking position when the drum member 140B is placed in the parking position P, and, on the other hand, securing the second shift fork 130(2) in the reference position when the drum member 140B is placed in other operational positions.

That is to say, as shown in FIG. 25, the region from the high speed engagement part 142B(2)H to the reverse engagement part 142B(2)R has a groove shape holding the second engagement pin part 134(2) so as to secure the second shift fork 130(2) in the reference position.

On the other hand, the low speed engagement part 142B(2)L has a groove shape guiding the second engagement pin part 134(2) such that the moving end of the second shift fork 130(2) toward the first side in the axial direction is in the low speed position, and the moving end toward the second side in the axial direction is in the reference position.

The transitional part between the high speed engagement part 142B(2)H and the low speed engagement part 142B(2)L has such a groove shape that the moving end of the second shift fork 130(2) toward the second side in the axial direction is secured in the reference position, and the moving end of the second shift fork 130(2) toward the first side in the axial direction is shifted from the reference position to the low speed position in accordance with the rotation of the drum member 140B from the high speed position H to the low speed position L.

The parking engagement part 142B(2)P has a groove shape guiding the second engagement pin part 134(2) such that the moving end of the second shift fork 130(2) toward the first side in the axial direction is in the reference position, and the moving end toward the second side in the axial direction is in the parking position.

The transitional part between the reverse engagement part 142B(2)R and the parking engagement part 142B(2)P has such a groove shape that the moving end of the second shift fork 130(2) toward the first side in the axial direction is secured in the reference position, and the moving end of the second shift fork 130(2) toward the second side in the axial direction is shifted from the reference position to the parking position in accordance with the rotation of the drum member 140B from the reverse position R to the parking position P.

Next, the groove shape of the second slider guide groove 144B(2) will now be described.

A low speed engagement part 144B(2)L of the second slider guide groove 144B(2) secures the second slider member 170(2) in a retreated position that does not limit the range of axial movement of the second shift fork 130(2) permitted by the low speed engagement part 142B(2)L of the second shift fork guide groove 142B(2) when the drum member 140B is placed in the low speed position L.

Specifically, the axial positions of the second slider member 170(2) placed when the second shift fork 130(2) is placed in the reference position, the low speed position, and the parking position, with the second slider member 170(2) remaining in contact with the second stopper part 133(2), are referred to as a reference position, a third displaced position, and a fourth displaced position, respectively.

In this embodiment, as shown in FIG. 25, the low speed engagement part 144B(2)L of the second slider guide groove 144B(2) is configured to secure the second slider member 170(2) in the third displaced position.

That is to say, in this embodiment, the second slider guide groove 144B(2) is configured to secure the second slider member 170(2) in the third displaced position as the retreated position when the drum member 140B is placed in the low speed position L.

A parking engagement part 144B(2)P of the second slider guide groove 144B(2) defines the axially movable range of the second slider member 170(2) such that the second shift fork 130(2) can axially move between the reference position and the parking position as regulated by the second fork guide groove 142B(2), with the second sliding member 170(2) pressing the second shift fork 130(2) toward the second side in the axial direction.

In this embodiment, as shown in FIG. 25, the parking engagement part 144B(2)P of the second slider guide groove 144B(2) guides the second slider member 170(2) such that the second slider member 170(2) is movable between the reference position and the fourth displaced position.

The shift-drum speed change apparatus 1B having such a configuration can execute a lost-motion function in speed change movement.

First, the lost-motion function in speed change movement to a high speed stage will now be described.

When the drum member 140B is placed in the neutral position N, the first shift fork 130(1) and the second shift fork 130(2) are secured in the reference position as described above (see FIG. 25).

Accordingly, the first and second shifter members 110(1), 110B(1) are both placed in the reference positions, and the shift-drum speed change apparatus 1B is in a neutral state (see FIG. 24).

When the drum member 140B is operated from the neutral position N to the high speed position H, as described above, the moving end on the first side in the axial direction of the first shift fork 130(1) regulated by the first fork guide groove 142B(1) shifts from the reference position to the high speed position in accordance with the rotation of the drum member 140B from the neutral position N to the high speed position H, and once the drum member 140B is placed in the high speed position H, the first shift fork 130(1) becomes axially movable between the reference position and the high speed position.

As described above, the biasing force of the first slider member pressing spring 180(1) (the single spring 210 in this embodiment) biasing the first slider member 170(1) toward the first side in the axial direction is greater than the biasing force of the first shift fork pressing spring 160(1) biasing the first shift fork 130(1) toward the second side in the axial direction and, accordingly, when the drum member 140B is placed in the high speed position H, the first shift fork 130(1) and the first shifter member 170(1) becomes movable to the high speed position on the first side in the axial direction by a biasing force corresponding to the difference between the biasing force of the first slider member pressing spring 180(1) and the biasing force of the first shift fork pressing spring 160(1).

Here, assuming that when the drum member 140B is placed in the high speed position H, the relative positions around the axis of the high speed depression and projection part 112H of the first shifter member 110(1) and the speed change depression and projection part 12H of the speed change gear 10H are at positions enabling depression and projection engagement, the high speed depression and projection part 112H and the speed change depression and projection part 12H are immediately depression and projection-engaged, bringing the speed change gear 10H into a power transmitting state, and the shift-drum speed change apparatus 1B is thus immediately brought into a high speed stage engaged state.

On the other hand, when a situation arises where the projection of the high speed depression and projection part 112H of the first shifter member 110(1) and the projection of the speed change depression and projection part 12H of the speed change gear 10H abut against each other, only the drum member 140B can be rotated to the high speed position H in advance while the first shift fork 130(1) and the first shifter member 110(1) remain in the reference positions.

With the drum member 140B being rotated to the high speed position H in advance, the first shift fork 130(1) is axially movable between the reference position and the high speed position, and the first slider member 170(1) is axially movable between the reference position and the first displaced position.

Accordingly, when the first shifter member 110(1) and the speed change gear 10H rotate relative to each other around the axis, and the abutment of the projections is eliminated, the first shifter member 110(1) is pressed to the high speed position via the first shift fork 130(1) by a biasing force corresponding to the difference between the biasing force of the first slider member pressing spring 180(1) (the single spring 210 in this embodiment) and the biasing force of the first shift fork pressing spring 160(1) and depression and projection-engaged with the speed change gear 10H, and the speed change movement of the shift-drum speed change apparatus 1B to the high speed stage is completed (the lost-motion function to the high speed stage).

When the drum member 140B is placed in the high speed position H, as described above, the second shift fork 130(2) and the second shifter member 110B(2) are secured in the reference position, and the second shifter member 110B(2) is not depression and projection-engaged with any of the speed change gear 10L and the speed change gear 10P.

Next, the lost-motion function in speed change movement to a low speed stage will now be described.

When the drum member 140B is placed in the low speed position L, the first shift fork 130(1) is secured in the reference position, and the first shifter member 110(1) is not depression and projection-engaged with any of the high speed gear 10H and the reverse gear 10R.

On the other hand, the second shift fork 110(2) becomes axially movable between the reference position and the low speed position, and the second slider member 170(2) is secured in the retreated position (the third displaced position in this embodiment).

In this state, the biasing force of the second slider member pressing spring 180(2) does not act on the second shift fork 110(2), and only the biasing force toward the first side in the axial direction by the second shift fork pressing spring 160(2) acts on the second shift fork 110(2).

Accordingly, when the drum member 140B is placed in the low speed position L, the second shift fork 130(2) and the second shifter member 110B(2) become movable to the low speed position by the second shift fork pressing spring 160(2).

Here, assuming that when the drum member 140B is placed in the low speed position L, the relative positions around the axis of the low speed depression and projection part 112L of the second shifter member 110B(2) and the speed change depression and projection part 12L of the speed change gear 10L are at positions enabling depression and projection engagement, the low speed depression and projection part 112L and the speed change depression and projection part 12L are immediately depression and projection-engaged, bringing the speed change gear 10L into a power transmitting state, and the shift-drum speed change apparatus 1B is thus immediately brought into a low speed stage engaged state.

On the other hand, when a situation arises where the projection of the low speed depression and projection part 112L of the second shifter member 110B(2) and the projection of the speed change depression and projection part 12L of the speed change gear 10L abut against each other, only the drum member 140B is rotated to the low speed position L in advance while the second shift fork 130(2) and the second shifter member 110B(2) are retained in the reference positions.

Accordingly, when the second shifter member 110B(2) and the speed change gear 10L rotate relative to each other around the axis, and the abutment of the projections is eliminated, the second shifter member 110B(2) is pressed to the low speed position by the biasing force of the second shift fork pressing spring 160(2) and depression and projection-engaged with the speed change gear 10L, and the speed change movement of the shift-drum speed change apparatus 1B to the low speed stage is completed (the lost-motion function to the low speed stage).

Next, the lost-motion function in speed change movement to a reverse stage will now be described.

When the drum member 140B is placed in the reverse position R, the second shift fork 130(2) is secured in the reference position, and the second shifter member 110B(2) is not depression and projection-engaged with any of the speed change gear 10L and the speed change gear 10P.

On the other hand, the first shift fork 130(1) becomes axially movable between the reference position and the reverse position, and the first slider member 170(1) is secured in the retreated position (the second displaced position in this embodiment).

In this state, the biasing force of the first slider member pressing spring 180(1) does not act on the first shift fork 130(1), and only the biasing force toward the second side in the axial direction by the first shift fork pressing spring 160(1) acts on the first shift fork 130(1).

Accordingly, when the drum member 140B is placed in the reverse position R, the first shift fork 130(1) and the first shifter member 110(1) become movable to the reverse position by the first shift fork pressing spring 160(1).

Here, assuming that when the drum member 140B is placed in the reverse position R, the relative positions around the axis of the reverse depression and projection part 112R of the first shifter member 110(1) and the speed change depression and projection part 12R of the speed change gear 10R are at positions enabling depression and projection engagement, the reverse depression and projection part 112R and the speed change depression and projection part 12R are immediately depression and projection-engaged, bringing the speed change gear 10R into a power transmitting state, and the shift-drum speed change apparatus 1B is thus immediately brought into a reverse stage engaged state.

On the other hand, when a situation arises where the projection of the reverse depression and projection part 112R of the first shifter member 110(1) and the projection of the speed change depression and projection part 12R of the speed change gear 10R abut against each other, only the drum member 140B is rotated to the reverse position R in advance while the first shift fork 130(1) and the first shifter member 110(1) are retained in the reference positions.

Then, when the first shifter member 110(1) and the speed change gear 10R rotate relative to each other around the axis, and the abutment of the projections is eliminated, the first shifter member 110(1) is pressed to the reverse position by the biasing force of the first shift fork pressing spring 160(1) and depression and projection-engaged with the speed change gear 10R, and the speed change movement of the shift-drum speed change apparatus 1B to the reverse stage is completed (the lost-motion function to the reverse stage).

Finally, the lost-motion function in speed change movement to a parking stage will now be described.

When the drum member 140B is placed in the parking position P, the first shift fork 130(1) is secured in the reference position, and the first shifter member 110(1) is not depression and projection-engaged with any of the speed change gear 10H and the speed change gear 10R.

On the other hand, the second shift fork 130(2) becomes axially movable between the reference position and the parking position, and the second slider member 170(2) becomes axially movable between the reference position and the fourth displaced position.

As described above, the biasing force of the second slider member pressing spring 180(2) (the single spring 210 in this embodiment) biasing the second slider member 170(2) toward the second side in the axial direction is greater than the biasing force of the second shift fork pressing spring 160(2) biasing the second shift fork 130(2) toward the first side in the axial direction and, accordingly, when the drum member 140B is placed in the parking position P, the second shift fork 130(2) and the second shifter member 110B(2) become axially movable to the parking position on the second side by a biasing force corresponding to the difference between the biasing force of the second slider member pressing spring 180(2) and the biasing force of the second shift fork pressing spring 160(2).

Here, assuming that when the drum member 140B is placed in the parking position P, the relative positions around the axis of the parking depression and projection part 112P of the second shifter member 110B(2) and the speed change depression and projection part 12P of the speed change gear 10P are at positions enabling depression and projection engagement, the parking depression and projection part 112P and the speed change depression and projection part 12P are immediately depression and projection-engaged, bringing the shift-drum speed change apparatus 1B immediately into a parking stage engaged state.

On the other hand, when a situation arises where the projection of the parking depression and projection part 112P of the second shifter member 110B(2) and the projection of the speed change depression and projection part 12P of the speed change gear 10P abut against each other, only the drum member 140B is rotated to the parking position P in advance while the second shift fork 130(2) and the second shifter member 110B(2) remain in the reference positions.

When the second shifter member 110B(2) and the speed change gear 10P rotate relative to each other around the axis, and the abutment of the projections is eliminated, the second shifter member 110B(2) is pressed to the parking position by a biasing force corresponding to the difference between the biasing force of the second slider member pressing spring 180(2) and the biasing force of the second shift fork pressing spring 160(2) and depression and projection-engaged with the speed change gear 10P, and the speed change movement of the shift-drum speed change apparatus 1B to the parking stage is completed (the lost-motion function to the parking stage).

Thus, the shift-drum speed change apparatus 1B according to the present embodiment can also carry out a lost-motion function on all speed change stages including the parking stage.

Moreover, the lost-motion function is provided by axially moving the first and second slider members 170(1), 170(2) movably supported by the first boss part 132(1) of the first shift fork 130(1) and the second boss part 132(2) of the second shift fork 130(2), respectively, as well as the first and second shift forks 130(1), 130(2).

Accordingly, the size in the axial direction and the operational force can be smaller than those of conventional configurations in which the lost-motion function is attained by axially moving the fork shaft.

In this embodiment, the first slider guide groove 144B(1) is configured such that the first slider member 170(1) is secured in the reference position when the drum member 140B is placed in the neutral position N, the first slider member 170(1) is axially movable between the reference position and the first displaced position when the drum member 140B is placed in the high speed position H, the first slider member 170(1) is secured in the reference position when the drum member 140B is placed in the low speed position L, the first slider member 170(1) is secured in the second displaced position when the drum member 140B is placed in the reverse position R, and the first slider member 170(1) is secured in the reference position when the drum member 140B is placed in the parking position P; however, the present invention is not limited to such a configuration.

For example, it is also possible to employ a first slider guide groove 145B(1) formed so as to secure the first slider member 170(1) in a retreated position (e.g., the second displaced position) when the drum member 140B is placed in the reverse position R, and, on the other hand, allow the first slider member 170(1) biased toward the first side in the axial direction by the first slider member pressing spring 180(1) to axially move by following the axial movement of the first shift fork 130(1) while remaining in contact with the first stopper part 133(1) when the drum member 140B(1) is placed in positions other than the reverse position R.

Figure 26:
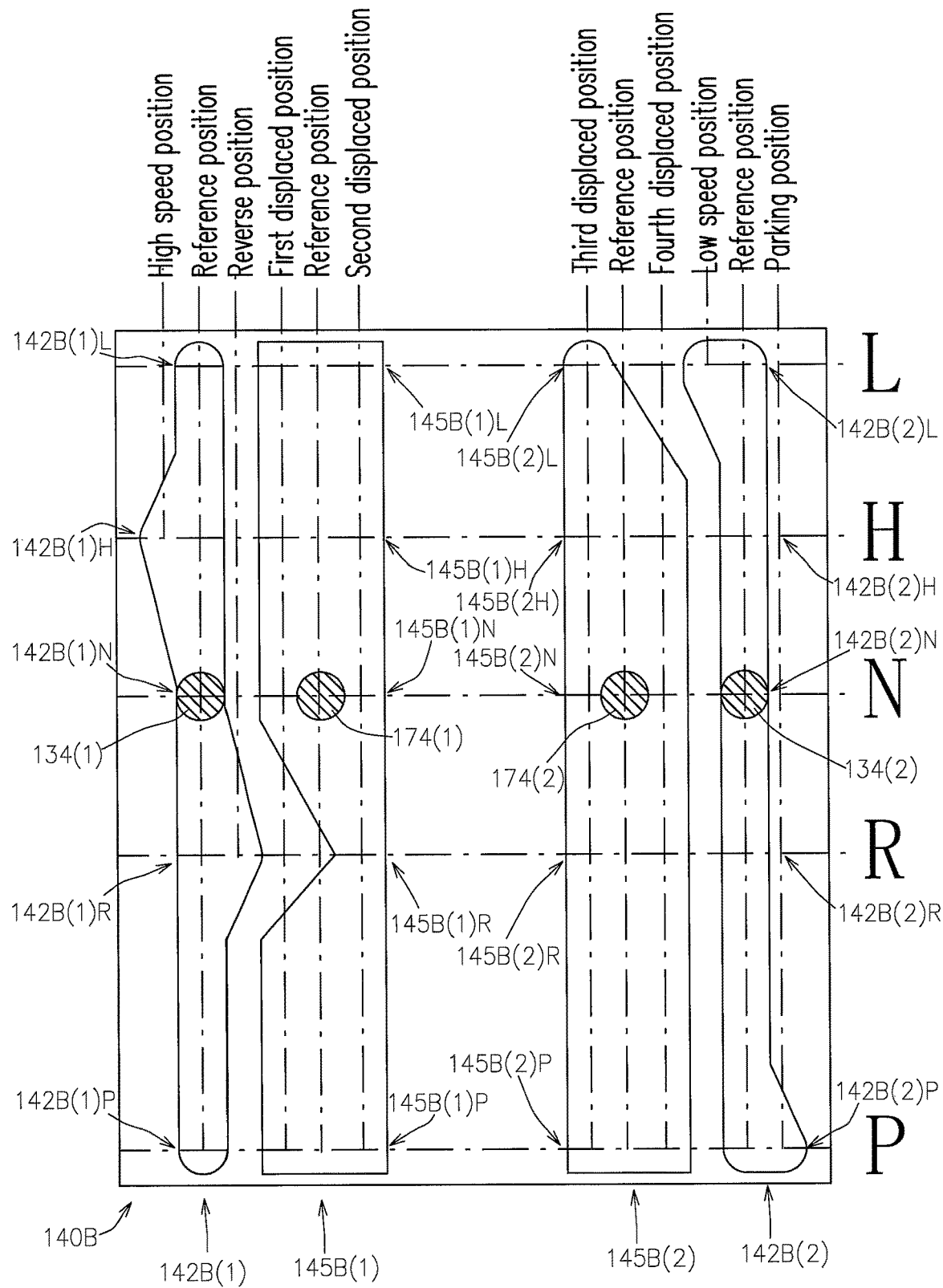
FIG. 26 is a development view of a drum member according to a modification of the drum member shown in FIG. 25, and shows the drum member placed in a neutral position.

FIG. 26 shows a development view of the drum member 140B having the first slider guide groove 145B(1).

As shown in FIG. 26, the first slider guide groove 145B(1) has such a groove shape that a reverse engagement part 145B(1)R secures the first slider member 170(1) in a retreated position (e.g., the second displaced position), and others, i.e., a neutral engagement part 145B(1)N, a high speed engagement part 145B(1)H, a low speed engagement part 145B(1)L, and a parking engagement part 145B(1)P, allow the first slider member 170(1) to axially move between the first displaced position and the second displaced position.

The second slider guide groove 144B(2) also is not limited to the groove shape in this embodiment.

That is to say, in this embodiment, the second slider guide groove 144B(2) is configured such that the second slider member 170(2) is secured in the reference position when the drum member 140B is placed in the neutral position N, the high speed position H, and the reverse position R, the second slider member 170(2) is secured in the third displaced position when the drum member 140B is placed in the low speed position L, and the second slider member 170(2) is axially movable between the reference position and the fourth displaced position when the drum member 140B is placed in the parking position P.

Alternatively, it is also possible to employ a second slider guide groove 145B(2) formed so as to secure the second slider member 170(2) in a retreated position (e.g., the third displaced position) when the drum member 140B is placed in the low speed position L, and, on the other hand, allow the second slider member 170(2) axially biased toward the second side by the second slider member pressing spring 180(2) to axially move by following the axial movement of the second shift fork 130(2) while remaining in contact with the second stopper part 133(2) when the drum member 140B is placed in positions other than the low speed position L.

As shown in FIG. 26, the second slider guide groove 145B(2) has such a groove shape that a low speed engagement part 145B(2)L secures the second slider member 170(2) in a retreated position (e.g., the third displaced position), and others, i.e., a neutral engagement part 145B(2)N, a high speed engagement part 145B(2)H, a reverse engagement part 145B(2)R, and a parking engagement part 145B(2)P, allow the second slider member 170(2) to axially move between the third displaced position and the fourth displaced position.

Third Embodiment

Below, still another embodiment of the present invention will now be described with reference to the attached drawings.

Figure 27:
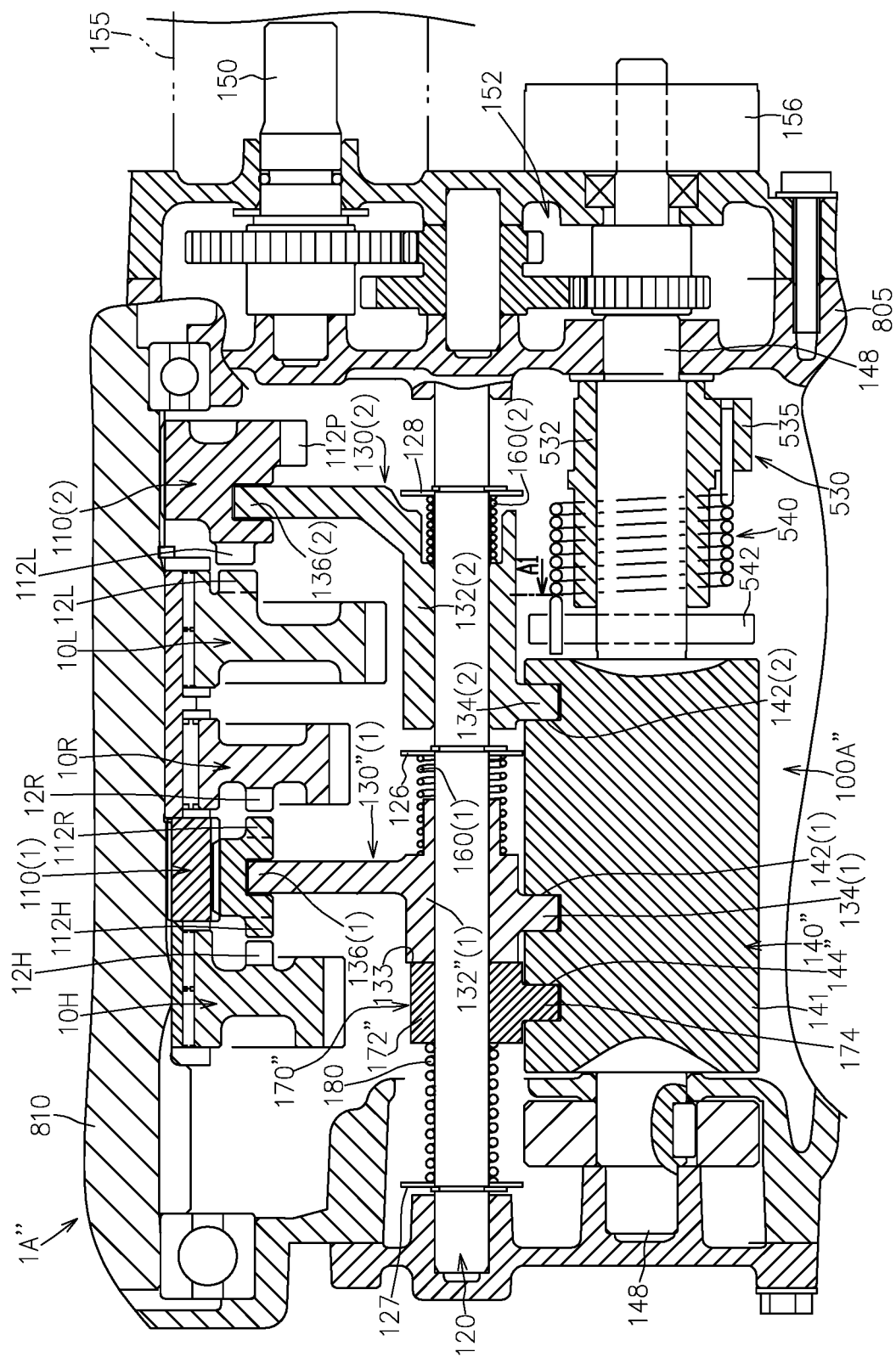
FIG. 27 is a cross-sectional of a shift-drum speed change apparatus according to a third embodiment of the present invention.

FIG. 27 shows a cross-sectional view of a shift-drum speed change apparatus 1A" according to this embodiment, which corresponds to FIG. 4 of the first embodiment.

In the drawing, the same components as those in the first and second embodiments are given the same reference numbers, and detailed descriptions thereof are omitted as appropriate.

The shift-drum speed change apparatus 1A" according to this embodiment is different from the shift-drum speed change apparatus 1A according to the first embodiment in that the shift-drum speed change operation mechanism 100A is replaced with a shift-drum speed change operation mechanism 100A".

The shift-drum speed change operation mechanism 100A" is different from the shift-drum speed change operation mechanism 100A in that the slider member 170 is replaced with a slider member 170".

The slider member 170" has a slider main body 172" fitted over the fork shaft 120 so as to be axially movable. Slider member 170" also has the slider engagement pin part 174.

In the shift-drum speed change operation mechanism 100A, the slider member 170 is supported by the first boss part 132(1) of the first shifter member 130(1) so as to be movable in the axial direction of the fork shaft 120 (see FIG. 4).

On the other hand, as shown in FIG. 27, in the shift-drum speed change operation mechanism 100A", the slider member 170" is directly supported by the fork shaft 120 so as to be movable in the axial direction of the fork shaft 120.

The configuration makes it possible to smooth the axial movement of the slider member 170".

Further, the shift-drum speed change operation mechanism 100A" includes a first shift fork 130"(1) in place of the first shift fork 130(1) in comparison with the shift-drum speed change operation mechanism 100A.

The first shift fork 130"(1) has a first boss part 132"(1) in place of the first boss part 132(1) in comparison with the first shift fork 130(1).

The first boss part 132"(1) is different from the first boss part 132(1) in that a portion supporting the slider member 170 is omitted and also in that the first boss part 132"(1) has a portion supporting the movable end of the first shift fork pressing spring 160(1).

That is, in the present embodiment, the movable end of the first shift fork pressing spring 160(1) is fitted over the first boss part 132"(1).

The configuration makes it possible to ensure the axial length of the first boss part 132"(1) to stabilize the support of the first shift fork 130"(1).

Specifically, although the first boss part 132"(1) is shorter in the axial direction than the first boss part 132 by the length of the portion supporting the slider member 170 that is omitted, the first boss part 132"(1) is longer in the axial direction than the first boss part 132 by the length of the portion supporting the movable end of the first shift fork pressing spring 160(1) so that ensure the axial length of the first boss part 132"(1).

Furthermore, the shift-drum speed change operation mechanism 100A" includes a drum member 140" in place of the drum member 140 in comparison with the shift-drum speed change operation mechanism 100A.

Figure 28:
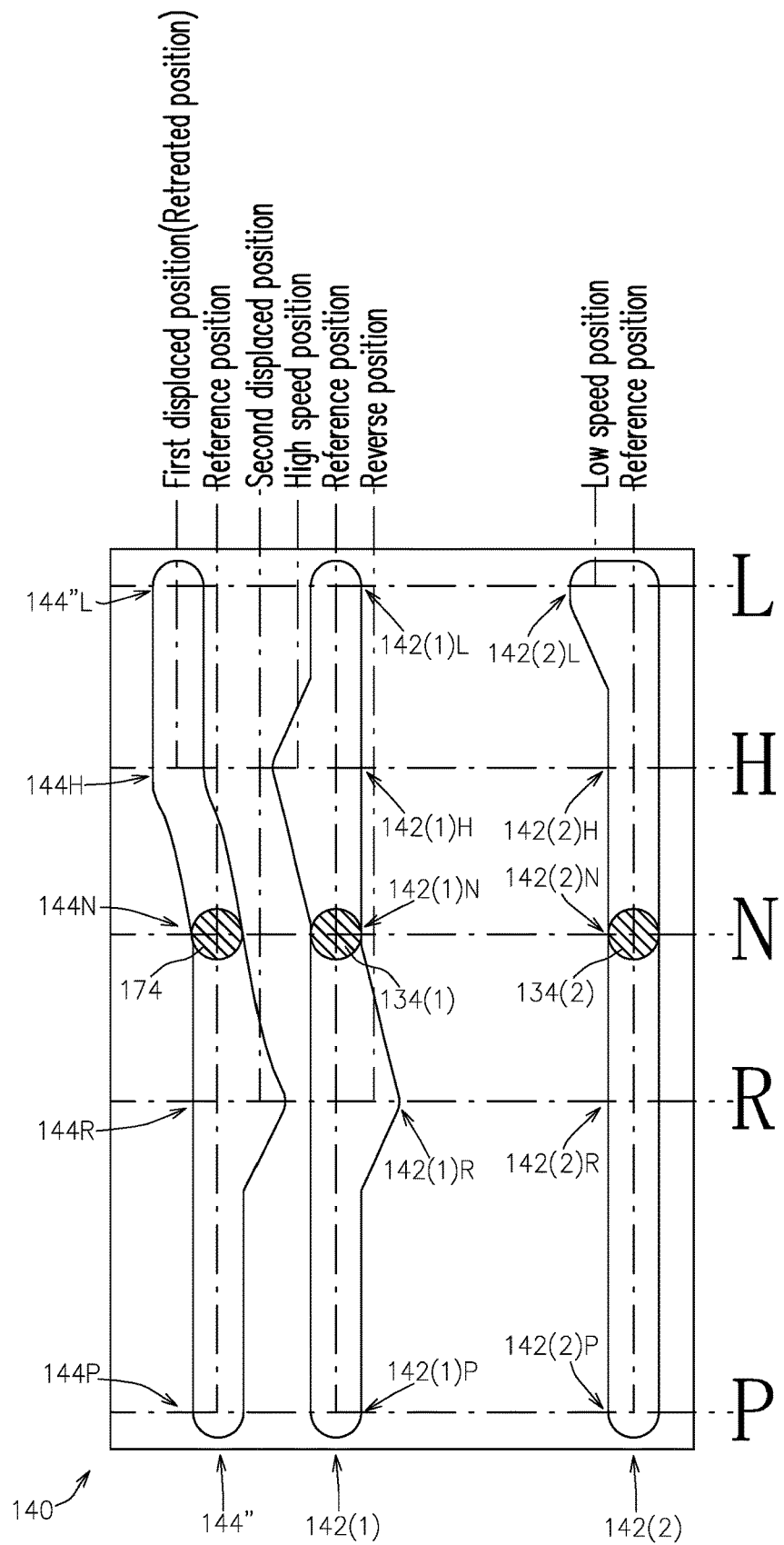
FIG. 28 is a development view of a drum member provided in the shift-drum speed change apparatus according to the third embodiment, and shows a state in which the drum member is placed in a neutral position.

FIG. 28 is a development view of the drum member 140".

As shown in FIG. 28, the drum member 140" is different from the drum member 140 only in that the slider guide groove 144 is replaced with a slider guide groove 144".

The slider guide groove 144" is different from the slider guide groove 144 only in that the low speed engagement part 144L is replaced with a low speed engagement part 144L".

Specifically, the low speed engagement part 144L of the slider guide groove 144 is configured to secure the slider member 170 in the reference position when the drum member 140 is placed in the low speed position L.

Here, the high speed engagement part 144H of the slider guide groove 144 that regulates the axial position of the slider member 170 when the drum member 140 is placed in the high speed position H is configured to secure the slider member 170 in the first displaced position (the retreated position). Therefore, when operating the drum member 140 in the first embodiment from the low speed position L to the high speed position H, it is necessary to move the slider member 170 from the reference position to the first displaced position (the retreated position) toward the first side in the axial direction while compressing the slider member pressing spring 180, which requires a large operating force.

On the other hand, the slider guide groove 144" is configured to secure the slider member 170 in the first displaced position (the retreated position) when the drum member 140" is placed in the low speed position L and the high speed position H.

According to the configuration, it is not necessary to compress the slider member pressing spring 180 when operating the drum member 140" from the low speed position L to the high speed position H, thereby realizing a reduction in operating force.

The configuration where the slider member 170" is directly supported by the fork shaft 120 and/or the configuration where the movable end of the first shift fork pressing spring 160(1) is supported by the first boss part 132"(1) of the first shift fork 130"(1) can be applied to the shift-drum speed change operation mechanism 100B of the shift-drum speed change apparatus 1B according to the second embodiment.

Figure 29:
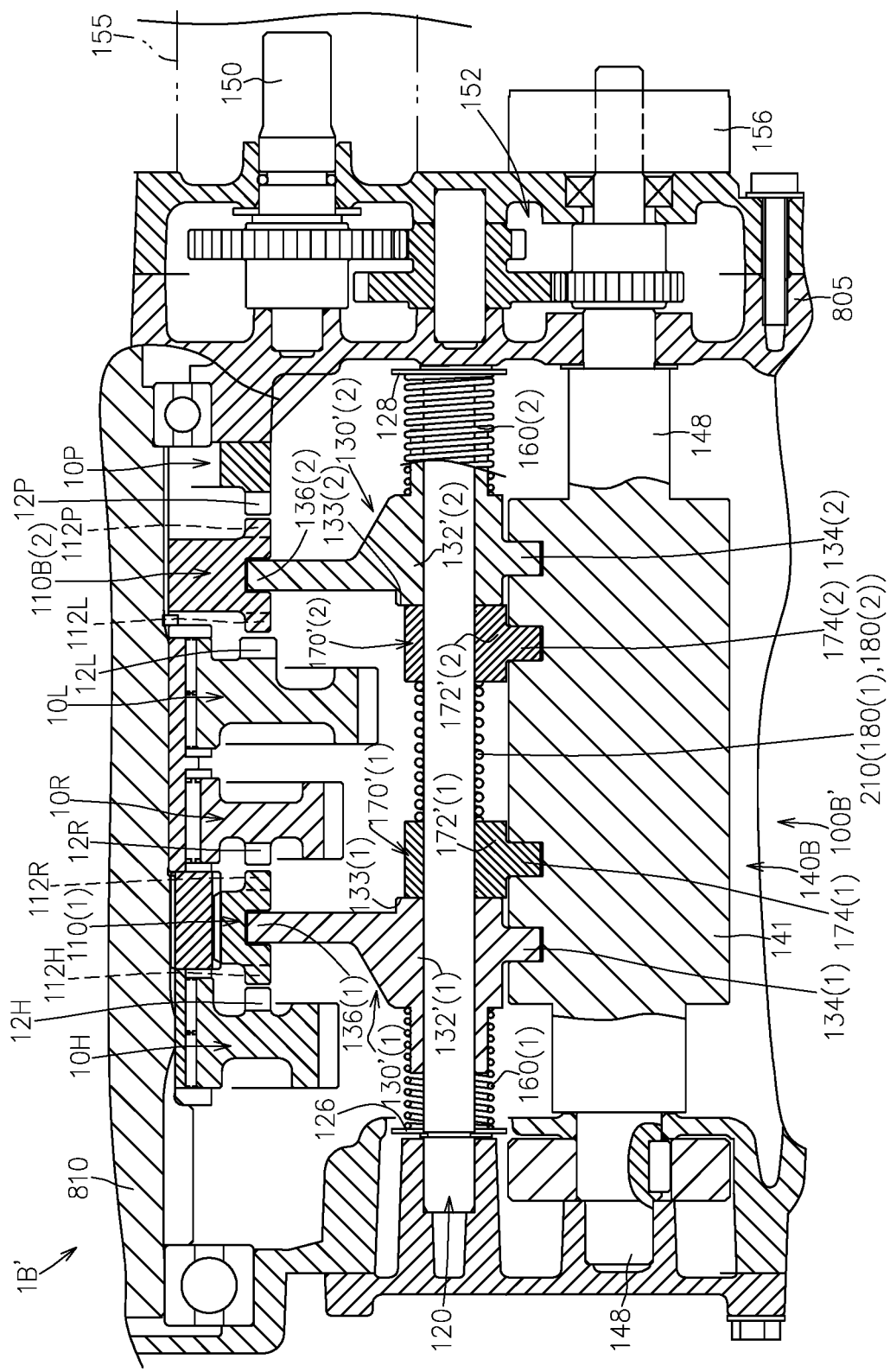
FIG. 29 is a cross-sectional of a shift-drum speed change apparatus according to a modification of the third embodiment.

FIG. 29 shows a cross-sectional view of the shift-drum speed change apparatus 1B' to which the above configurations are applied.

In the drawing, the same components as those in the above-explained embodiments are given the same reference numbers, and detailed descriptions thereof are omitted as appropriate.

As shown in FIGS. 24 and 29, in comparison with the drum speed change operation mechanism 100B, the shift-drum speed change operation mechanism 100B' of the shift-drum speed change apparatus 1B ' includes first and second slider members 170'(1), 170'(2) in place of the first and second slider members 170(1), 170(2), and also includes first and second shift forks 130'(1), 130'(2) in place of the first and second shift forks 130(1), 130(2).

The first slider member 170'(1) has a slider main body 172'(1) fitted over the fork shaft 120 so as to be axially movable. The first slider member 170'(1) also has the slider engagement pin part 174(1).

The second slider member 170'(2) has a slider main body 172'(2) fitted over the fork shaft 120 so as to be axially movable. The second slider member 170'(2) also has the slider engagement pin part 174(2).

The first shift fork 130'(1) has a first boss part 132'(1) supported by the fork shaft 120 such that first shift fork 130'(1) is axially movable. First shift fork 130'(1) also includes the first engagement pin part 134(1) and the first fork part 136(1).

The first boss part 132'(1) is configured to support the movable end of the first shift fork pressing spring 160(1).

The second shift fork 130'(2) has a second boss part 132'(2) supported by the fork shaft 120 so as to be axially movable. The second shift fork 130'(2) also has the second engagement pin part 134(2) and the second fork part 136(2).

The second boss part 132'(2) is configured to support the movable end of the second shift fork pressing spring 160(2).

The invention claimed is:

1. A shift-drum speed change operation mechanism, comprising:
   a power transmission shaft;
   a first speed change member disposed on the power transmission shaft so as to be capable of rotation relative to the power transmission shaft;
   a second speed change member disposed on the power transmission shaft so as to be capable of rotation relative to the power transmission shaft;
   a first shifter member disposed on the power transmission shaft so as to be incapable of rotation relative to the power transmission shaft and so as to be axially movable between the first speed change member and the second speed change member, wherein the first shifter member may be depression and projection-engaged with the first speed change member or the second speed change member, the engagement bringing the first speed change member or the second speed change member into a power transmitting state;
   a drum member having a first fork guide groove and operated to rotate around an axis;
   a fork shaft disposed parallel to the power transmission shaft;
   a first shift fork having a first boss part supported by the fork shaft so as to be axially movable, a first fork part engaged with the first shifter member and a first engagement pin part received by the first fork guide groove;
   a first shift fork pressing spring biasing the first shift fork toward a first side in the axial direction of the fork shaft;
   a slider member supported by the fork shaft so as to be axially movable, with a moving end toward a second side in the axial direction of the fork shaft being defined by a stopper part provided on the first shift fork, wherein an axial position of the slider member is regulated by a slider guide groove provided in the drum member;
   a slider member pressing spring biasing the slider member toward the second side in the axial direction by a greater biasing force than the first shift fork pressing spring;
   the first shift fork and the first shifter member, with respect to axial positions, being capable of selectively taking a reference position where the first shifter member is not depression and projection-engaged with any of the first and second speed change members, and being capable of taking first and second speed change positions where the first shifter member is depression and projection-engaged with the first and second speed change members, respectively;
   the first fork guide groove having a groove shape securing the first shift fork in the reference position when the drum member is placed in a neutral position around the axis, allowing the first shift fork to move between the reference position and the first speed change position when the drum member is placed from the neutral position to a first operational position on one side around the axis of the fork shaft, and allowing the first shift fork to move between the reference position and a second speed change position when the drum member is placed from the neutral position to a second operational position on the other side around the axis; and
   the slider guide groove having a groove shape guiding the slider member so as not to obstruct movement of the first shift fork between the reference position and the first speed change position when the drum member is placed in the first operational position, and allowing axial movement of the slider member so that the slider member biased by the slider member pressing spring is capable of pressing the first shift fork from the reference position to the second speed change position when the drum member is placed in the second operational position.

2. The shift-drum speed change operation mechanism according to claim 1, wherein the slider member is supported by the first boss part.

3. The shift-drum speed change operation mechanism according to claim 1, wherein the slider member is supported by the fork shaft.

4. The shift-drum speed change operation mechanism according to claim 1, wherein when axial positions of the slider member, which is in contact with the stopper part, placed when the first shift fork is placed in the reference position, the first speed change position and the second speed change position, are referred to as a reference position, a first displaced position and a second displaced position, respectively, the slider guide groove has a groove shape securing the slider member in the reference position when the drum member is placed in the neutral position, securing the slider member in the first displaced position when the drum member is placed in the first operational position, and allowing the slider member to move between the reference position and the second displaced position when the drum member is placed in the second operational position.

5. The shift-drum speed change operation mechanism according to claim 1, wherein the slider guide groove has a groove shape allowing the slider member biased toward the second side in the axial direction of the fork shaft by the slider member pressing spring to axially move by following axial movement of the first shift fork while remaining in contact with the stopper part, when the drum member is placed in positions other than the first operational position.

6. The shift-drum speed change operation mechanism according to claim 1, further comprising:
   a third speed change member disposed on the power transmission shaft so as to be capable of rotation relative to the power transmission shaft;
   a second shifter member supported by the power transmission shaft so as to be incapable of relative rotation and so as to be axially movable, wherein the second shifter member is capable of depression and projection-engagement with the third speed change member;
   a second shift fork supported by the fork shaft so as to be axially movable, wherein the second shift fork has a second engagement pin part received by a second fork guide groove provided in the drum member and a second fork part engaged with the second shifter member;
   a second shift fork pressing spring biasing the second shift fork in a direction in which the second shifter member is pressed toward the third speed change member;
   the second shift fork and the second shifter member, with respect to axial positions, being capable of selectively taking a reference position where the second shifter member is not engaged with the third speed change member and a third speed change position where the second shifter member is depression and projection-engaged with the third speed change member;

the first fork guide groove having a groove shape securing the first shift fork in the reference position when the drum member is placed in a third operational position displaced around the axis from the neutral position and the first and second operational positions; and the second fork guide groove having a groove shape allowing the second shift fork to move between the reference position and the third speed change position when the drum member is placed in the third operational position, and securing the second shift fork in the reference position when the drum member is placed in operational positions other than the third operational position.

7. The shift-drum speed change operation mechanism according to claim 6, wherein the drum member is placed in the third operational position when the drum member is rotated predetermined degrees from the first operational position toward one side around the axis.

8. The shift-drum speed change operation mechanism according to claim 7, wherein the slider guide groove has a groove shape that secures the slider member in the reference position when the drum member is placed in the neutral position, and that secures the slider member in a first displaced position when the drum member is placed in the first operational position and the third operational position, and that allows the slider member to move between the reference position and a second displaced position when the drum member is placed in the second operational position.

9. The shift-drum speed change operation mechanism according to claim 6, further comprising:

a parking pressing member having a main body part fitted over the drum member so as to be relatively rotatable and a cam pressing part extending radially outward from the main body part;

a parking coil spring fitted over the drum member, with one end side being operatively connected to the parking pressing member and the other end side being operatively connected to the drum member, wherein the parking coil spring connects the drum member and the parking pressing member so as to be incapable of relative rotation such that the parking pressing member is integrally rotated around the axis in accordance with rotation of the drum member around the axis when a circumferential load on the cam pressing part is equal to or less than a predetermined value, and, when the circumferential load on the cam pressing part exceeds the predetermined value, the parking coil spring is elastically deformed so as to allow the drum member to relatively rotate around the axis in advance relative to the parking pressing member;

a parking operation arm capable of swinging around a swing axis parallel to the power transmission shaft and having an engagement part on a free end side, wherein the parking operation arm is capable of taking a parking position where the engagement part is engaged, around the swing axis, with a depression and projection part provided on the second shifter member so as to face radially outward, and the second shifter member is forcibly brought into a rotation suspended state;

a parking cancelling spring biasing the parking operation arm around the swing axis in a direction in which the engagement part is moved away from the depression and projection part;

the cam pressing part being disposed so as to swing the parking operation arm to the parking position around the swing axis in accordance with rotational movement of the drum member to the parking position;

when the engagement part of the parking operation arm is brought into contact with a projection of a depression and projection part of the second shifter member in a swinging movement of the parking operation arm by the cam pressing part toward the parking position in accordance with the rotational movement of the drum member to the parking position so that a circumferential load exceeding the predetermined value is applied to the cam pressing part, the drum member being relatively rotated to the parking operational position in advance relative to the parking pressing member while elastically deforming the parking coil spring; and when the second shifter member is rotated around the axis so that the engagement part and the depression and projection part are positionally adjusted, the parking coil spring swinging the parking operation arm to the parking position against the biasing force of the parking cancelling spring due to resilience resulting from elastic deformation so that engagement of the engagement part and the depression and projection part is completed.

10. A shift-drum speed change operation mechanism, comprising:

a power transmission shaft;

first and second speed change members disposed in series on the power transmission shaft so as to be capable of rotation relative to the power transmission shaft;

a first shifter member disposed on the power transmission shaft so as to be incapable of rotation relative to the power transmission shaft and so as to be axially movable between the first speed change member and the second speed change member, wherein the first shifter member is depression and projection-engaged with the first and second speed change members in accordance with movement toward a first side on one side and a second side on the other side in an axial direction, respectively;

a second shifter member disposed on the power transmission shaft so as to be incapable of relative rotation to the power transmission shaft and so as to be axially movable between the third and fourth speed change members, wherein the second shifter member is depression and projection-engaged with the third and fourth speed change members in accordance with movement toward the first side and the second side in the axial direction, respectively;

a drum member having first and second fork guide grooves and operated to rotate around an axis;

a fork shaft disposed parallel to the power transmission shaft;

a first shift fork having a first boss part supported by the fork shaft so as to be axially movable, a first fork part engaged with the first shifter member and a first engagement pin part received by the first fork guide groove;

a second shift fork having a second boss part supported by the fork shaft so as to be axially movable, a second fork part engaged with the second shifter member and a second engagement pin part received by the second fork guide groove;

a first shift fork pressing spring biasing the first shift fork toward the second side in the axial direction;

a second shift fork pressing spring biasing the second shift fork toward the first side in the axial direction;

a first slider member directly or indirectly supported by the fork shaft so as to be axially movable, with a moving end toward the first side in the axial direction being defined by a stopper part provided on the first shift fork, wherein an axial position of the first slider member is regulated by a first slider guide groove provided in the drum member;

a second slider member directly or indirectly supported by the fork shaft so as to be axially movable, with a moving end toward the second side in the axial direction being defined by a stopper part provided on the second shift fork, wherein an axial position of the second slider member is regulated by a second slider guide groove provided in the drum member;

a first slider member pressing spring biasing the first slider member toward the first side in the axial direction by a greater biasing force than the first shift fork pressing spring;

a second slider member pressing spring biasing the second slider member toward the second side in the axial direction by a greater biasing force than the second shift fork pressing spring;

the first shift fork and the first shifter member, with respect to axial positions, being capable of selectively taking a reference position where the first shifter member is not depression and projection-engaged with any of the first and second speed change members, and being capable of taking first and second speed change positions where the first shifter member is depression and projection-engaged with the first and second speed change members, respectively;

the second shift fork and the second shifter member, with respect to axial positions, being capable of selectively taking a reference position where the second shifter member is not depression and projection-engaged with any of the third and fourth speed change members, and being capable of taking third and fourth speed change positions where the second shifter member is depression and projection-engaged with the third and fourth speed change members, respectively;

the first fork guide groove having a groove shape securing the first shift fork in the reference position when the drum member is placed in a neutral position around the axis, allowing the first shift fork to move between the reference position and the first speed change position when the drum member is placed from the neutral position to a first operational position on one side around the axis, securing the first shift fork in the reference position when the drum member is placed from the first operational position to a third operational position on one side around the axis, allowing the first shift fork to move between the reference position and the second speed change position when the drum member is placed from the neutral position to a second operational position on the other side around the axis, and securing the first shift fork in the reference position when the drum member is placed from the second operational position to the fourth operational position on the other side around the axis;

the first slider guide groove having a groove shape defining a movable range in the axial direction of the first slider member such that the first shift fork is capable of moving between the reference position and the first speed change position guided by the first fork guide groove, with the first slider member being in contact with the first stopper part by the first slider member pressing spring, when the drum member is placed in the first operational position, and guiding the first slider member so as not to obstruct movement of the first shift fork between the reference position and the second speed change position when the drum member is placed in the second operational position;

the second fork guide groove having a groove shape securing the second shift fork in the reference position when the drum member is placed in the first operational position, the neutral position and the second operational position, allowing the second shift fork to move between the reference position and the third speed change position when the drum member is placed in the third operational position, and allowing the second shift fork to move between the reference position and the fourth speed change position when the drum member is placed in the fourth operational position; and the second slider guide groove having a groove shape guiding the second slider member so as not to obstruct movement of the second shift fork between the reference position and the third speed change position when the drum member is placed in the third operational position, and defining a movable range in the axial direction of the second slider member such that the second shift fork is capable of moving between the reference position and the fourth speed change position guided by the second fork guide groove, with the second slider member being in contact with the second stopper part by the second slider member pressing spring, when the drum member is placed in the fourth operational position.

11. The shift-drum speed change operation mechanism according to claim 10, wherein the first and second slider member pressing springs are a single spring, one end side of which is engaged with the first slider member and the other end side of which is engaged with the second slider member.

12. The shift-drum speed change operation mechanism according to claim 10, wherein when axial positions of the first slider member, which is in contact with the first stopper part, placed when the first shift fork is placed in the reference position, the first speed change position and the second speed change position, are referred to as a reference position, a first displaced position and a second displaced position, respectively, the first slider guide groove has a groove shape securing the first slider member in the reference position when the drum member is placed in the neutral position, allowing the first slider member to move between the reference position and the first displaced position when the drum member is placed in the first operational position, securing the first slider member in the reference position when the drum member is placed in the third operational position, securing the first slider member in the second displaced position when the drum member is placed in the second operational position, and securing the first slider member in the reference position when the drum member is placed in the fourth operational position.

13. The shift-drum speed change operation mechanism according to claim 10, wherein when axial positions of the first slider member, which is in contact with the first stopper part, placed when the first shift fork is placed in the reference position, the first speed change position and the second speed change position, are referred to as a reference position, a first displaced position and a second displaced position, respectively, the first slider guide groove has a groove shape securing the first slider member in the second displaced position when the drum member is placed in the second operational position, and allowing the first slider member biased toward the first side in the axial direction by the first slider member pressing spring to axially move by following axial movement of the first shift fork while remaining in contact with the first stopper part, when the drum member is placed in positions other than the second operational position.

14. The shift-drum speed change operation mechanism according to claim 10, wherein when axial positions of the second slider member, which is in contact with the second stopper part, placed when the second shift fork is placed in the reference position, the third speed change position and the fourth speed change position, are referred to as a reference position, a third displaced position and a fourth displaced position, respectively, the second slider guide groove has a groove shape securing the second slider member in the reference position when the drum member is placed between the first operational position and the second operational position across the neutral position, securing the second slider member in the third displaced position when the drum member is placed in the third operational position, and allowing the second slider member to move between the reference position and the fourth displaced position when the drum member is placed in the fourth operational position.

15. The shift-drum speed change operation mechanism according to claim 10, wherein when axial positions of the second slider member, which is in contact with the second stopper part, placed when the second shift fork is placed in the reference position, the third speed change position and the fourth speed change position, are referred to as a reference position, a third displaced position and a fourth displaced position, respectively, the second slider guide groove has a groove shape securing the second slider member in the third displaced position when the drum member is placed in the third operational position, and allowing the second slider member biased toward the second side in the axial direction by the slider member pressing spring to axially move by following axial movement of the second shift fork while remaining in contact with the second stopper part when the drum member is placed in positions other than the third operational position.

\* \* \* \* \*